United States Patent
Emigh et al.

(10) Patent No.: US 11,005,881 B2
(45) Date of Patent: *May 11, 2021

(54) ANTI-PHISHING

(71) Applicant: HUAWEI TECHNOLOGIES CO., LTD., Guangdong (CN)

(72) Inventors: Aaron T. Emigh, Incline Village, NV (US); James A. Roskind, Redwood City, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/204,135

(22) Filed: Nov. 29, 2018

(65) Prior Publication Data

US 2019/0098042 A1 Mar. 28, 2019

Related U.S. Application Data

(63) Continuation of application No. 14/634,726, filed on Feb. 28, 2015, now Pat. No. 10,270,800, which is a
(Continued)

(51) Int. Cl.
*H04L 29/06* (2006.01)
*G06F 21/56* (2013.01)
(Continued)

(52) U.S. Cl.
CPC .......... *H04L 63/1441* (2013.01); *G06F 21/50* (2013.01); *G06F 21/56* (2013.01);
(Continued)

(58) Field of Classification Search
CPC .. G06F 21/00; G06F 2221/2119; G06F 21/50; G06F 21/56; G06F 2221/03;
(Continued)

(56) References Cited

U.S. PATENT DOCUMENTS 5,191,646 A 3/1993 Naito et al.
5,442,738 A 8/1995 Chapman et al.
(Continued)

OTHER PUBLICATIONS

R. Moats:"URN Syntax", Network Working Group, RFC2141. May 1997. total 153 pages.
(Continued)

*Primary Examiner* — Yogesh Paliwal
(74) *Attorney, Agent, or Firm* — Leydig, Voit & Mayer, Ltd.

(57) ABSTRACT

In some embodiments, techniques for computer security comprise receiving a message, receiving a user-originated request for an action, wherein the action is associated with the message, determining whether the message is trustworthy, and impairing performance of the action, if it is determined that the message is not trustworthy. In some embodiments, techniques for computer security comprise receiving a message, determining whether the message is trustworthy, rendering the message, if it is determined that the message is trustworthy, and rendering a restricted version of the message, if it is determined that the message is not trustworthy.

25 Claims, 38 Drawing Sheets

Related U.S. Application Data continuation of application No. 11/011,870, filed on Dec. 13, 2004, now Pat. No. 8,984,640.

(60) Provisional application No. 60/542,211, filed on Feb. 4, 2004, provisional application No. 60/529,222, filed on Dec. 11, 2003, provisional application No. 60/612,132, filed on Sep. 22, 2004, provisional application No. 60/568,744, filed on May 6, 2004, provisional application No. 60/566,671, filed on Apr. 29, 2004.

(51) Int. Cl.
| | |
|---|---|
| G06F 21/50 | (2013.01) |
| H04B 1/66 | (2006.01) |
| H04N 19/48 | (2014.01) |
| H04N 19/895 | (2014.01) |
| H04L 12/58 | (2006.01) |
| G06Q 30/00 | (2012.01) |

(52) U.S. Cl.
CPC .......... *G06Q 30/018* (2013.01); *H04B 1/667* (2013.01); *H04L 51/12* (2013.01); *H04L 63/14* (2013.01); *H04L 63/1483* (2013.01); *H04L 63/168* (2013.01); *H04L 63/20* (2013.01); *H04N 19/48* (2014.11); *H04N 19/895* (2014.11); *G06F 2221/03* (2013.01); *G06F 2221/2119* (2013.01)

(58) Field of Classification Search
CPC ....... G06Q 30/018; H04L 51/12; H04L 63/14; H04L 63/1441; H04L 63/20; H04L 63/145; H04L 63/1483; H04L 63/1433; H04L 63/168; H04B 1/667; H04N 19/48; H04N 19/895

See application file for complete search history.

(56) References Cited

U.S. PATENT DOCUMENTS

| | | | |
|---|---|---|---|
| 5,748,975 | A | 5/1998 | Van De Vanter |
| 5,813,019 | A | 9/1998 | Van De Vanter |
| 5,832,208 | A | 11/1998 | Chen et al. |
| 6,393,465 | B2 | 5/2002 | Leeds |
| 6,421,709 | B1 | 7/2002 | McCormick et al. |
| 6,615,242 | B1 | 9/2003 | Riemers |
| 6,757,830 | B1 | 6/2004 | Tarbotton et al. |
| 6,779,178 | B1 | 8/2004 | Lloyd et al. |
| 6,910,077 | B2 | 6/2005 | Najork |
| 7,100,049 | B2 | 8/2006 | Gasparini et al. |
| 7,127,704 | B2 | 10/2006 | Van De Vanter et al. |
| 7,216,149 | B1 | 5/2007 | Briscoe et al. |
| 7,216,297 | B1 | 5/2007 | Douglis et al. |
| 7,293,012 | B1 | 11/2007 | Solaro et al. |
| 7,526,730 | B1 * | 4/2009 | Cahill ................... G06F 40/166 715/760 |
| 7,657,838 | B2 | 2/2010 | Daniell et al. |
| 8,200,761 | B1 | 6/2012 | Tevanian |
| 2002/0169954 | A1 | 11/2002 | Bandini et al. |
| 2003/0009698 | A1 | 1/2003 | Lindeman et al. |
| 2003/0036970 | A1 | 2/2003 | Brustoloni et al. |
| 2003/0100320 | A1 | 5/2003 | Ranjan |
| 2003/0195933 | A1 * | 10/2003 | Curren ................. G06Q 10/107 709/206 |
| 2004/0039786 | A1 | 2/2004 | Horvitz et al. |
| 2004/0068695 | A1 * | 4/2004 | Daniell ................ G06Q 10/107 715/234 |
| 2004/0078422 | A1 * | 4/2004 | Toomey .............. G06F 21/6218 709/202 |
| 2004/0080531 | A1 | 4/2004 | Berstis |
| 2004/0123157 | A1 | 6/2004 | Alagna et al. |
| 2004/0243926 | A1 * | 12/2004 | Trenbeath ............... G06F 40/14 715/239 |
| 2005/0022008 | A1 | 1/2005 | Goodman et al. |
| 2005/0050150 | A1 | 3/2005 | Dinkin |
| 2005/0080864 | A1 * | 4/2005 | Daniell ................... H04L 51/04 709/206 |
| 2005/0108639 | A1 | 5/2005 | Fields et al. |
| 2005/0138426 | A1 | 6/2005 | Styslinger |
| 2005/0251863 | A1 | 11/2005 | Sima |
| 2007/0101423 | A1 | 5/2007 | Oliver et al. |

OTHER PUBLICATIONS

Katrina Kerry, "Steve: A Syntax Directed Editor for VHDL." Thesis for Honors Degree in Computer Science, University of Adelaide, Nov. 1996.total 68 pages.

M. Kucherawy,Ed-:Domain-based Message Authentication, Reporting and Conformance(DMARC), Dec. 16, 2011, total 41 pages.

Gunter Ollmann:"URL Embedded Attacks,Attacks using the common web browser", retrieved from the Internet on Dec. 12, 2018:http://web.archive.org/web/20030109054921/http://technicalinfo.net/papers/URLEmbeddedAttacks.html. Jan. 9, 2003. total 11 pages.

Paul Floyd, "Adding Syntax Highlighting to EPM." May 1998. total 6 pages.

Krish Vitaldevara,"Outlook.com increases security with support for DMARC and EV certificates", Office Blogs, Dec. 10, 2012,total 4 pages. webpage: https://blogs.office.com/2012/12/10/outlook-com-increases-security-with-Support-for-dmarc-and-ev-certificates/.

Phpdig.net:"Problems with URL parsing", Nov. 2003. total 5 pages.

International Business Machines, Inc., "LPEX User's Guide and Reference,Exercise 10: Using a Parser." 1996.total 2 pages.

Overview,DMARC,total 4 pages. Webpage: https://dmarc.org/overview/.

Bugzilla:"Bug 184074—Syntax highlighting in url bug", Dec. 2002. total 8 pages.

Paul Floyd, "A Look at EPM 6.0x." Dec. 1995. total 7 pages.

M-Kucherawy, Ed.et al.:"Domain-based Message Authentication, Reporting, and Conformance (DMARC)",Request for Comments: 7489,Mar. 2015,total 73 pages.

Gunter Ollmann:"URL Embedded Attacks,Attacks using the common web browser", retrieved from the internet on Dec. 12, 2018: http://technicalinfo.net/papers/URLEmbeddedAttacks.html. Total 7 pages.

Colin Marquardt, "Syntax Highlighting in WinEdt." Nov. 21, 1999. total 13 pages.

Adrian Holzwarth et al, "Mozilla Bug 157354." Various content contributed from Jul. 13, 2002 to Sep. 22, 2004 (after priority date of the instant appfication).total 9 pages.

Damian Yerrick et al, "Mozilla Bug 228612." Various content contributed from Dec. 15, 2003 to Apr. 19, 2004 (after priority date of the instant appfication). Total 4 pages.

* cited by examiner

```
<CENTER><H1>Suspicious URLs</H1></center>
<P>To go to a surprising place via a cloaked URL, click on
<A HREF="http://security.ebay.com@phisher.com">this link.</A>
<P>To go to a surprising place via a cloaked URL with a password, click on
<A HREF="http://security.ebay.com:password@phisher.com">this link.</A>
<P>To go to a surprising place via an open redirect, click on
<A HREF="http://redirect.yahoo.com?url=phisher.com">this link.</A>
<P>To go to a surprising place via misleading link, click on
<A HREF="http://phisher.com">http://security.ebay.com</A>
```

FIG. 24B

```
<HTML><HEAD><TITLE>URL demonstration</TITLE><HEAD><BODY>
<CENTER><H1>Obfuscated URL display</H1></center>
<P>To go to a surprising place via an obfuscated cloaked URL, click on
<A HREF="http://security.ebay.com
@phisher.com">this link.</A>
</BODY></HTML>
```
— 2601

```
<HTML><HEAD><TITLE>URL demonstration</TITLE></HEAD><BODY>
<CENTER><H1>Protecting information</H1></center>
<P>To go to a surprising, hidden place via a cloaked URL, click on
<A HREF="http://security.ebay.com@phisher.com" onMouseOver="(window.status='Click
here to enter security information'); return true">this link.</A>
</BODY></HTML>
```
3001  3002  3003

ANTI-PHISHING

CROSS-REFERENCE TO RELATED APPLICATIONS

This application is a continuation of U.S. patent application Ser. No. 14/634,726, filed on Feb. 28, 2015. The U.S. patent application Ser. No. 14/634,726 is a continuation of U.S. patent application Ser. No. 11/011,870, filed on Dec. 13, 2004, now U.S. Pat. No. 8,984,640. The U.S. patent application Ser. No. 11/011,870 claims priority to U.S. Provisional Patent Application No. 60/529,222, filed on Dec. 11, 2003 and U.S. Provisional Patent Application No. 60/542,211, filed on Feb. 4, 2004 and U.S. Provisional Patent Application No. 60/566,671, filed on Apr. 29, 2004 and U.S. Provisional Patent Application No. 60/568,744, filed on May 6, 2004 and U.S. Provisional Patent Application No. 60/612,132, filed on Sep. 22, 2004. All of the aforementioned patent applications are hereby incorporated by reference in their entireties.

FIELD OF THE INVENTION

The present invention relates generally to the area of computer security. More specifically, techniques for reducing the deceptiveness of electronic interaction, and for protecting legitimate communications, are disclosed.

BACKGROUND OF THE INVENTION

An increasing volume of sensitive personal and financial information is being stored electronically, in locations accessible through electronic networks such as the internet. This information has value to parties who have illicitly gained access to such information by impersonating parties authorized to access information. Current email and web browser technology does not provide adequate defense against such deception. Furthermore, when defenses are deployed, legitimate communications can be impacted, i.e. by being classified as spam or phishing.

Accordingly, there is a need to protect users from electronic fraud, and to protect legitimate communications.

BRIEF DESCRIPTION OF THE DRAWINGS

Various embodiments of the invention are disclosed in the following detailed description and the accompanying drawings.

FIG. 24A is an example of HTML code containing four suspicious URLs, as could be used by the method of FIG. 23.

FIG. 24B is an example of a rendering of the HTML contained in FIG. 24A, illustrating an embodiment of the method of FIG. 23.

DETAILED DESCRIPTION

The invention can be implemented in numerous ways, including as a process, an apparatus, a system, a composition of matter, a non-transitory computer readable medium such as a computer readable storage medium, or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
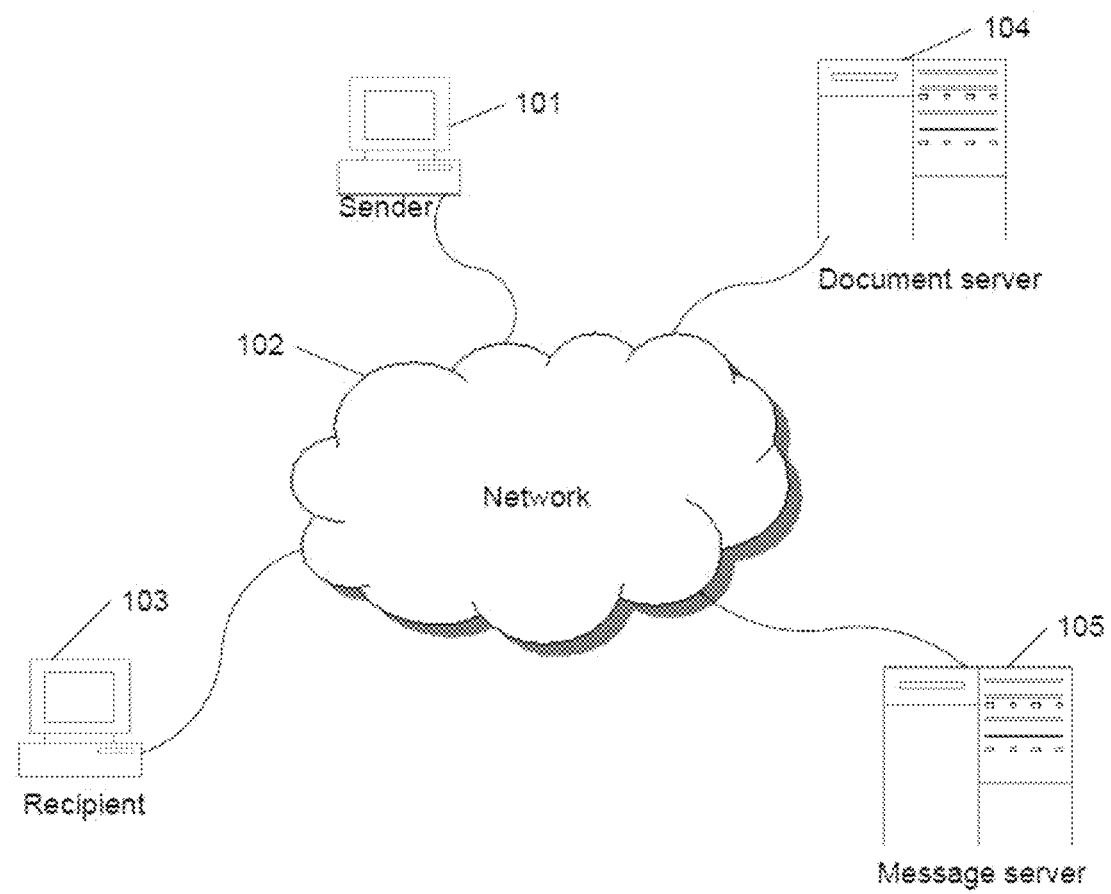
FIG. 1 is a diagram of a system for performing phishing countermeasures, according to some embodiments.

FIG. 1 is a diagram of a system for performing phishing countermeasures, according to some embodiments. In this example, a sender of a message 101 is connected to a network 102. A sender may be any device capable of sending a message, including a personal computer, PDA, or a cell phone. A sender 101 may also be a server such as a mail server receiving a message from a sender device. In some embodiments, sender 101 may be a participant in a network of computers that are controlled by an external party, such as a "bot" or "zombie" network. A message refers herein to any electronic communication that may be addressed to a user, or that may be automatically delivered to a user as a result of a subscription. Examples of a message include email, an instant message, an SMS text message, an RSS message, an Atom message, a message including streaming video, and a Bluetooth message. A sender 101 may send a phishing message through the network 102 to a recipient 103.

Phishing refers herein to any deceptive electronic communication, such as electronic communication designed to trick a recipient into revealing information or providing a benefit, such as a financial benefit, to an imposter. Examples of electronic communication include any type of electronic message, and conveying any type of electronic document. Illustrative examples of phishing include a message sent purporting to be from Paypal requiring a user to enter an account name and password for a security audit, a sweepstakes message indicating that a user has won a prize and must enter credit card information to verify identity, a faked message from a manager inviting an employee to an outing but requiring the employee's corporate password to accept or decline, a faked message from management indicating additional work hours have been approved but requiring a worker's corporate password to disavow a commitment to work, and a faked message from an online bank or stock brokerage requiring account and password information before a real or fictitious "transaction" can be confirmed or denied.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet. A recipient 103 of a message such as a phishing message may be connected to the network 102. A recipient may be any device capable of receiving a message, including a personal computer, PDA, or cell phone. A recipient may also refer herein to a user of a device capable of receiving a message, or a server transmitting a message to a recipient device. In some embodiments, phishing countermeasures may be performed by the recipient 103.

A document server 104 may be connected to the network 102. The document server 104 may be any entity capable of providing a document, such as a web server that provides a document through a protocol such as HTTP. The document server 104 may provide phishing documents. A document refers herein to any data that may be referenced by an address, including a file on a computer file system, an entry in a database table, a web page, and dynamically generated data provided by a server such as an HTTP server.

A message server 105, such as a Mail Transfer Agent (MTA) or POP or IMAP server, may be connected to the network 102. The message server 105 may provide a message to the recipient 103. In some embodiments, phishing countermeasures may be performed by the message server 105. In some embodiments, a message server 105 and recipient 103 may be within an enterprise network such as a LAN or virtual private network.

Figure 2:
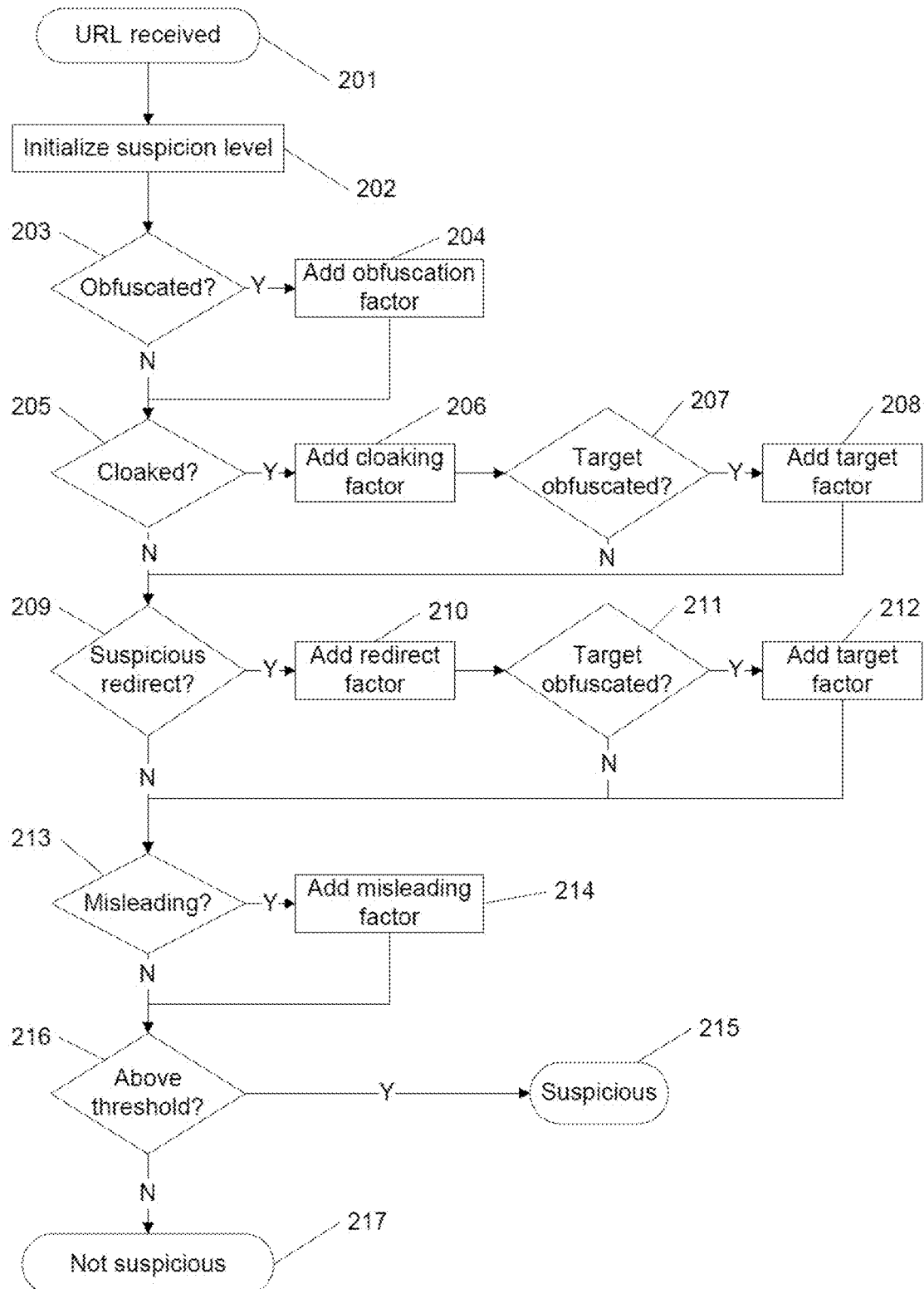
FIG. 2 is a flow diagram of a method for determining whether a URL is suspicious, according to some embodiments.

FIG. 2 is a flow diagram of a method for determining whether a URL is suspicious, according to some embodiments. A URL refers herein to any address under any scheme that permits a user to access a document via an address. One example of a URL is a Universal Record Locator as defined in IETF RFC 1738 and/or 2396 and any successors and predecessors, herein referred to as an "RFC type URL." IETF RFC 1738 and 2396 are currently available over the internet from the Internet Engineering Task Force, and are herein incorporated by reference for all purposes.

A suspicious URL refers herein to a URL that may be treated with suspicion. In some embodiments, any URL may be a suspicious URL. In other embodiments, suspicious URLs may include cloaked URLs, redirected URLs, URLs that are contained on a list of suspicious URLs, obfuscated URLs, misleading URLs, URLs originating from, contained within a document from or making reference to a site considered unsafe (for example, due to being in a high-risk security zone), misleading URLs, and/or URLs with a combination of one of more of the foregoing properties.

In this example, a URL may be received (201), for example because a link is to be displayed, or because a user has clicked on a link, or as part of an evaluation of a document containing the URL. A suspicion level may be initialized (202). A suspicion level may be any way of recording information relating to suspiciousness. One example of a suspicion level is a number. An example of initializing a numeric suspicion level is to set it to zero. Another example of a suspicion level is an enumeration of suspicious attributes. An example of initializing an enumeration-based suspicion level is to set it to an empty list. The URL may be analyzed to determine whether it is obfuscated (203). Obfuscation refers herein to disguising the contents or destination of a URL. Examples of obfuscation include using numeric IP addresses, encoding characters (for example encoding Unicode characters, such as with UTF-8 encoding, e.g. using "%61" instead of "a"), adding padding characters such as spaces or underbars before an "@" in a cloaked URL to hide a destination address, the use of characters such as "%01%00" that may cause a falsely premature termination of URL display, and adding spurious arguments to a redirect.

If the URL is determined to be obfuscated, then an obfuscation penalty factor is added to the suspicion level in this example (204). In one example, the obfuscation penalty factor is a number. In another example, obfuscation itself may be scoreboarded, for example by adding an obfuscation penalty factor for each type of obfuscation that is present, such as unnecessarily encoded characters, numeric IP addresses and padding. In another example, a characterization of the obfuscating element(s) may be added to a list.

The URL may be analyzed to determine if it is cloaked (205). Further details of this analysis are later discussed in conjunction with the remaining figures. A cloaked URL refers herein to any URL that disguises its true destination. In the example of an RFC type URL, this can be a URL that contains a username or username:password pair followed by the character "@", which has a special interpretation that is described in IETF RFC 1738, § 3.1 and IETF RFC 2396, § 3.2.2. For example, the URL http://security.ebay.com@phisher.com may be misinterpreted to refer to a web site named security.ebay.com but actually refers to a document on phisher.com. In some embodiments, any URL that disguises its true destination may be considered cloaked. In some embodiments, a URL that disguises its true destination and specifies an HTTP protocol may be considered cloaked. An HTTP protocol may be specified, for example, by the presence of "http:" or "https:" (for HTTP over SSL) in the address, or by the absence of another protocol specifier.

If the URL is determined to be cloaked (205), then a cloaking penalty factor is added to the suspicion level in this example (206). If the cloaked target is further determined to be obfuscated (207), for example if a destination host name in an RFC type URL is obfuscated, a target obfuscation penalty factor is added to the suspicion level in this example (208).

The URL may be analyzed to determine whether it is a suspicious redirect (209). Further details of this analysis are later discussed in conjunction with the remaining figures. A redirect refers herein to a URL that refers to a document that redirects to another URL, for example by providing an HTML document that contains a directive such as "<META HTTP-EQUIV="refresh" . . . >." The term "redirect" may be used herein to refer to a redirecting document, a URL that will retrieve a redirecting document, or a URL with an argument specifying an address (for example, a URL, a partially formed URL, or an identifier that may be mapped to a URL by a server) to be the target of redirection in a document that may be retrieved by the URL. For example, if http://phisher.com/redir accepts an argument "url" and generates a document that will redirect a browser to that location, then the URLs http://phisher.com/redir and http://phisher.com/redir?url=scammer.com, as well as the document returned thereby, may all be herein referred to as "redirects." The term "open redirect" refers herein to a redirect that includes an arbitrary second URL as an argument and will redirect to that second URL. For example, in the example given above, http://phisher.com/redir may be an open redirect.

If the URL is determined to be a suspicious redirect (209), a redirect penalty factor is added to the suspicion level in this example (210). If the target of a redirect is further determined to be obfuscated (211), for example if an argument in an open redirect is obfuscated, a target obfuscation penalty factor is added to the suspicion level in this example (212).

The URL may be analyzed to determine if it is misleading (213). A misleading URL refers herein to a URL associated with a misleading link. A link refers herein to an element of a document with an associated URL, for example an element of an HTML document associated with a URL through an '<A HREF=" . . . ">' tag. A misleading link refers herein to a link that is named in a manner that may indicate an associated URL other than an actual associated URL, for example a link composed of text (or an image of text) that is a well-formed URL other than the URL associated with the link.

If the URL is determined to be a misleading URL (213), a misleading penalty factor is added to the suspicion level in this example (214).

The suspicion level may be compared with a threshold (216). In some embodiments, a comparison may be performed after calculating a suspicion level. An example of calculating a suspicion level is to scoreboard one or more factors enumerated in an enumeration-based suspicion level. In some embodiments, comparing a suspicion level with a threshold may include a piecewise comparison of one or more aspects of an enumeration-based suspicion level, such as evaluating characterizations of suspicious qualities such as cloaking, misleading, redirection, and/or obfuscation and determining whether the URL is suspicious based on such evaluation(s). In some embodiments, for example as discussed in conjunction with FIG. 3, a suspicion level may be associated with the URL, and a comparison may be made prior to a decision about an action associated with the URL. In this example, if the suspicion level is above the threshold, then the URL is treated as suspicious (215); otherwise, it is treated as unsuspicious (217).

The illustrated enumeration of penalty factors is not exhaustive, and factors may be omitted and/or added in various embodiments. In addition to penalty factors, positive factors may be incorporated to effectively decrease the suspicion level of a URL prior to comparison to a suspicion threshold. For example, if a URL is contained in a message associated with a sender that has been authenticated, then an authentication factor may be incorporated into the suspicion level prior to comparing to a threshold. An example of incorporating an authentication factor into a suspicion level is to subtract it from a numeric suspicion level.

In some embodiments, penalty factors may be numbers. For example, the obfuscation penalty factor may be 1, the cloaking penalty factor may be 5, the target obfuscation penalty factor may be 2, the redirect penalty factor may be 3, the misleading penalty factor may be 3, and the authentication positive factor may be 2. A suspicion threshold may be a number, for example 5. A suspicion threshold and/or penalty and positive factor(s) may be constant, or may be configurable. For example, such values may be configured by a user or administrator, with persistent storage in a registry or other file(s). In an example of persistent storage, one or more thresholds and/or factors may be stored under settings for a web browser and/or a messaging client in a Windows registry. As another example, one or more thresholds and/or factors may be automatically calculated, for example by training of a Bayesian filter based on user feedback obtained in user interfaces that ask for approval to follow a link.

In some embodiments, 209-212 may optionally be further elaborated. For example, any redirect may be incorporated into the suspicion level, and suspicious factors of a redirect, such as a possible open redirect, obfuscation, or a misleading link associated with the redirect URL, may add additional penalty factors. In another example, multiple redirects may be followed, with an additional penalty factor being added for an additional redirection.

In some embodiments, the presence of a specific combination of characteristics in a URL may be detected and a URL with that specific combination of characteristics may be classified as suspicious, and/or may constitute a separate category of suspicious URL. A separate category of suspicious URL may be treated differently than other suspicious URLs. For example, a separate category of URL may have separate security settings determining configurable treatment, or may be unconditionally rejected, for example rejected following or during construction of a suspicion level. In a first example of a specific combination of characteristics, a redirected URL with obfuscation may constitute a separate category of URL. In a second example, a cloaked URL with spaces or other obfuscation before an "@", or encoded characters in the destination URL, may constitute a separate category. In a third example, a redirection from the destination of a cloaked URL may constitute a separate category. A redirection from the destination of a cloaked URL may be detected and handled, for example by checking, when a redirection is received, whether the initiating URL was cloaked; and disallowing the redirection if so. In a fourth example, a cloaked URL with arguments (or an argument that appears to be a possible redirection address) may constitute a separate category. In a fifth example, a redirection to a cloaked URL may constitute a separate category.

Figure 3:
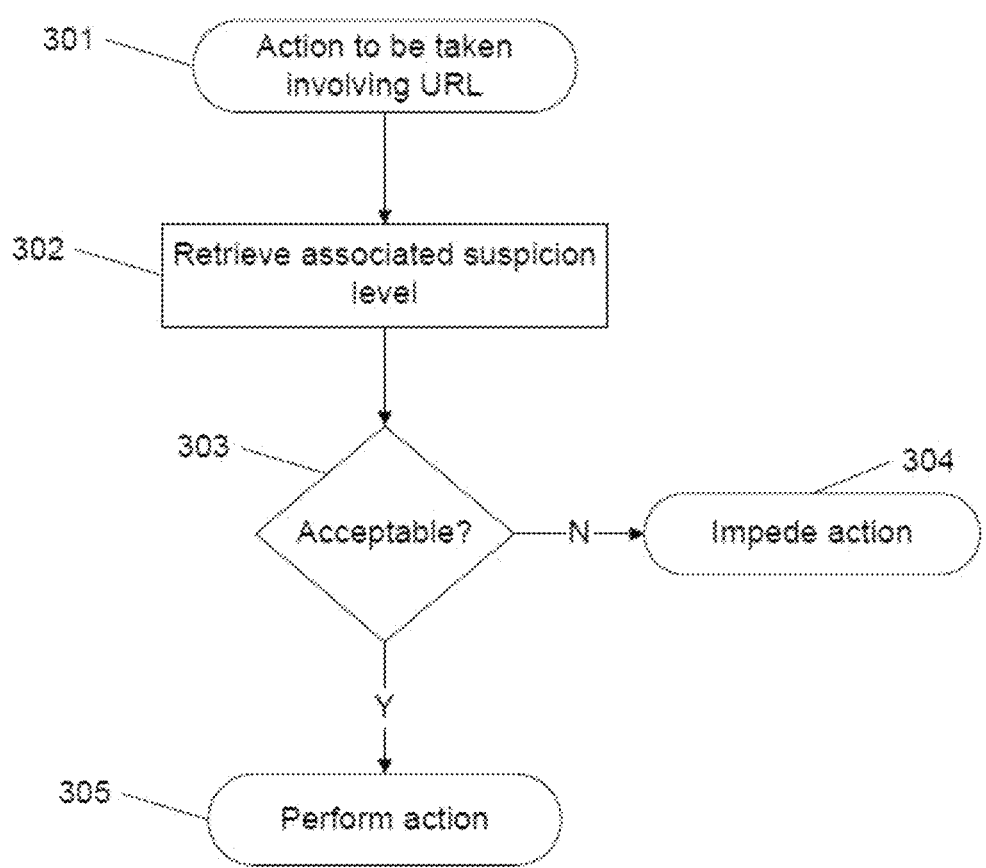
FIG. 3 is a flow diagram of a method for determining an action associated with a URL, according to some embodiments.

FIG. 3 is a flow diagram of a method for determining an action associated with a URL, according to some embodiments. In this example, an action associated with a URL is to be taken (301). An example of an action is traversing the URL, for example because a user clicked on it. Another example of an action associated with a URL is displaying a link associated with the URL. Another example of an action is an evaluation of a document containing the URL, for example an evaluation of whether the document is trustworthy.

A suspicion level associated with the URL may be retrieved (302). A suspicion level may, for example, have been calculated as discussed in conjunction with FIG. 2. It may be determined whether the suspicion level is acceptable (303). An example of determining whether the suspicion level is acceptable is to compare the suspicion level with a threshold, and determine that the suspicion level is acceptable if it is below the threshold. In some embodiments, there may be multiple thresholds. For example, a threshold for determining whether a URL is considered suspicious when displaying a link may differ from (for example, may be lower than) a threshold for determining whether a URL is considered suspicious when a user clicks on a link.

If it is determined that the suspicion level is acceptable (303), then the action is performed in this example (304). An example of performing the action is traversing the link. Another example of performing the action is displaying the link as specified in a document containing the link. Another example of performing the action is evaluating the URL as acceptable in a process of evaluating a document containing the URL.

If it is determined that the suspicion level is not acceptable (303), then the action is impeded in this example (304). An example of impeding the action is not traversing the link, or displaying a warning dialog before traversing the link. Another example of impeding the action is not displaying the link, or displaying a modified version of the link indicating that the link is suspicious. Another example of impeding the action is evaluating the URL as unacceptable in a process of evaluating the document containing the URL.

Figure 4:
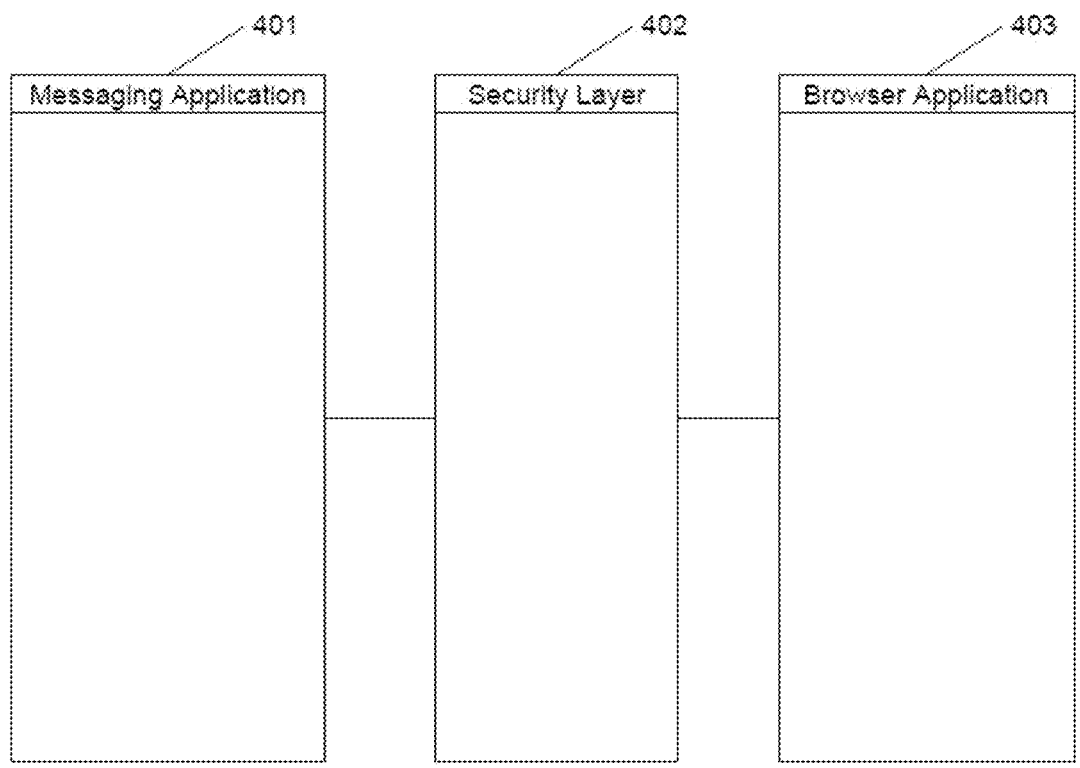
FIG. 4 illustrates three examples of places a suspicious URL may be detected, according to some embodiments.

FIG. 4 illustrates examples of places a suspicious URL may be detected, according to some embodiments. Detection of a suspicious URL may, for example, be performed as described in conjunction with FIG. 2 and/or FIG. 3. In this example, a suspicious URL may be detected in some embodiments within a messaging client 401 which permits links or URLs to be selected, for example within an email client when a user clicks on a link contained in an email, or within a messaging client 401 before or during rendering of a message. In some embodiments, a suspicious URL may be detected within a browser 403 such as a web browser, internet media player or PDF viewer (either for incoming URLs from an external source or for URLs linked from pages being displayed by the browser). In some embodiments, a suspicious URL may be detected by a security layer 402 through which URLs may be passed before they may be transmitted to a browser. A security layer may, for example, be inserted into the URL path on a computer running a Windows operating system by placing the security layer program in the Windows registry (for example in one or more keys contained at HKEY_CLASSES_ROOT\http\shell\open\ddeexec\Application and/or HKEY_CLASSES_ROOT\http\shell\open\command). In some embodiments, the messaging application 401, browser application 403 and/or security layer 402 may be components of the message recipient 103.

Suspicious URLs may be detected under various configurations. For example, suspicious URLs may be detected at all times, or only under certain circumstances, for example when received by a browser from an external source or when typed or inserted into a URL input box, or specifically when received from a messaging client. In some embodiments, an action associated with a suspicious URL, such as traversing the URL, may be permitted when accessed by clicking a link on a web page or selecting a bookmark, and disallowed when received from another source.

Figure 5:
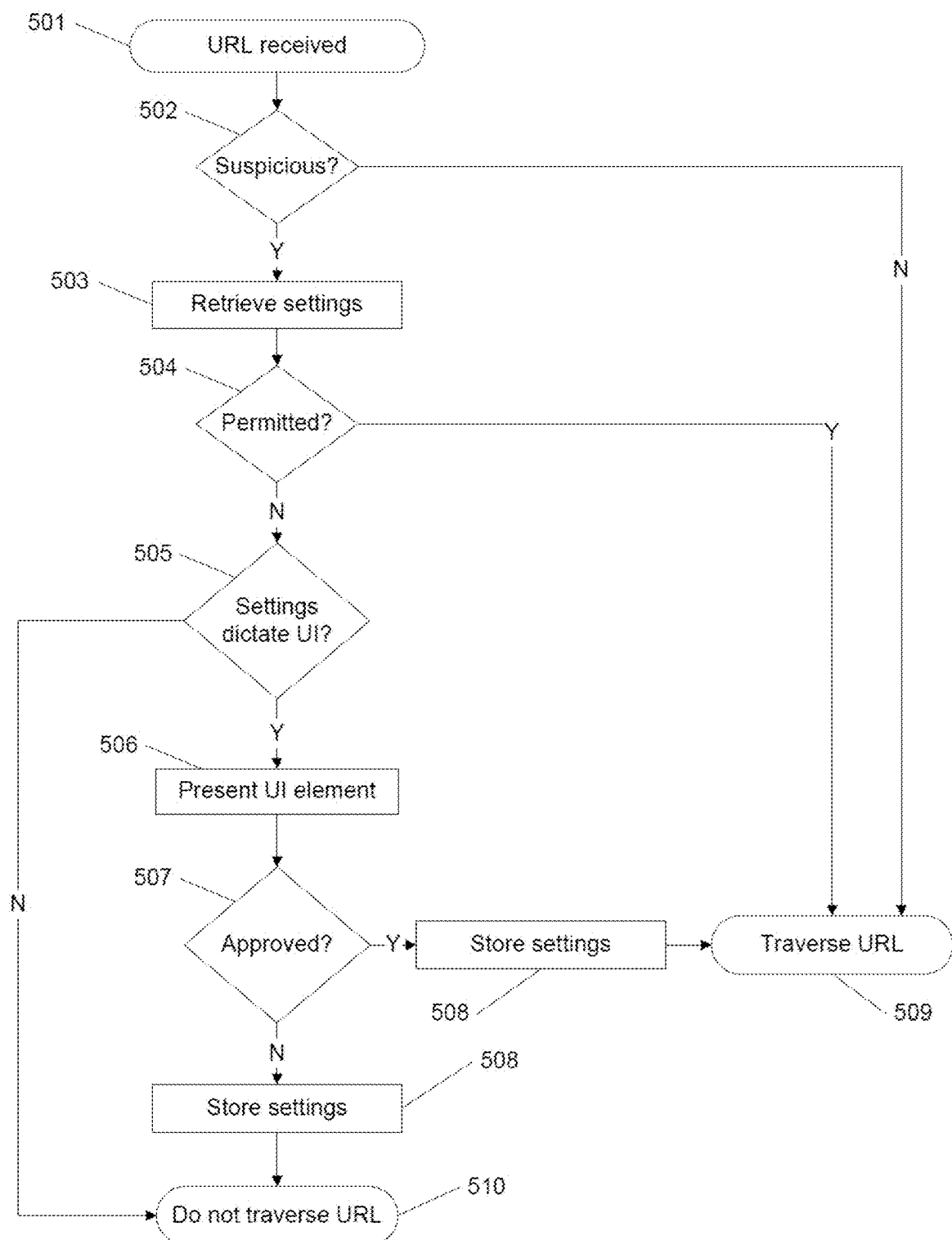
FIG. 5 is a flow diagram of a method for differential treatment of a suspicious URL, according to some embodiments.

FIG. 5 is a flow diagram of a method for differential treatment of a suspicious URL, according to some embodiments. In this example, a URL is received for processing (501). Examples of receiving a URL include a user clicking on an associated link, a user typing a URL into an input box, a user selecting a URL from a collection of one or more URLs, and a program such as a messaging client or document reader transmitting a URL to a browser.

The URL may be analyzed to determine whether it is suspicious (502). An example of determining whether a URL is suspicious is discussed in conjunction with FIG. 2. If the URL is determined to be suspicious, then one or more security settings are retrieved in this example (503). In some embodiments, security settings may include settings for one or more types of suspicious URLs and/or links, such as cloaked URLs, suspicious redirects, misleading links and URLs, and cross-site links. In some embodiments, security settings may be stored in a file or other persistent storage, for example under settings for a web browser and/or a messaging client in a Windows registry.

If the suspicious URL is permitted by the security settings (504), for example because it refers to a document in a trusted domain, or because suspicious URLs such as the one under consideration are always permitted, or if the URL was determined not to be suspicious (502), then the URL is traversed in this example (509). An example of traversing a URL is to retrieve a document to which the URL refers. If the suspicious URL is not permitted (504) and the security options dictate that no UI element be presented (505), for example if there are no relevant security settings or if the type of suspicious URL encountered is never allowed, then the URL is not traversed in this example (510). An example of not traversing the URL is to not retrieve the document. In some embodiments, an informative message may be displayed indicating why the URL was not traversed.

Figure 13:
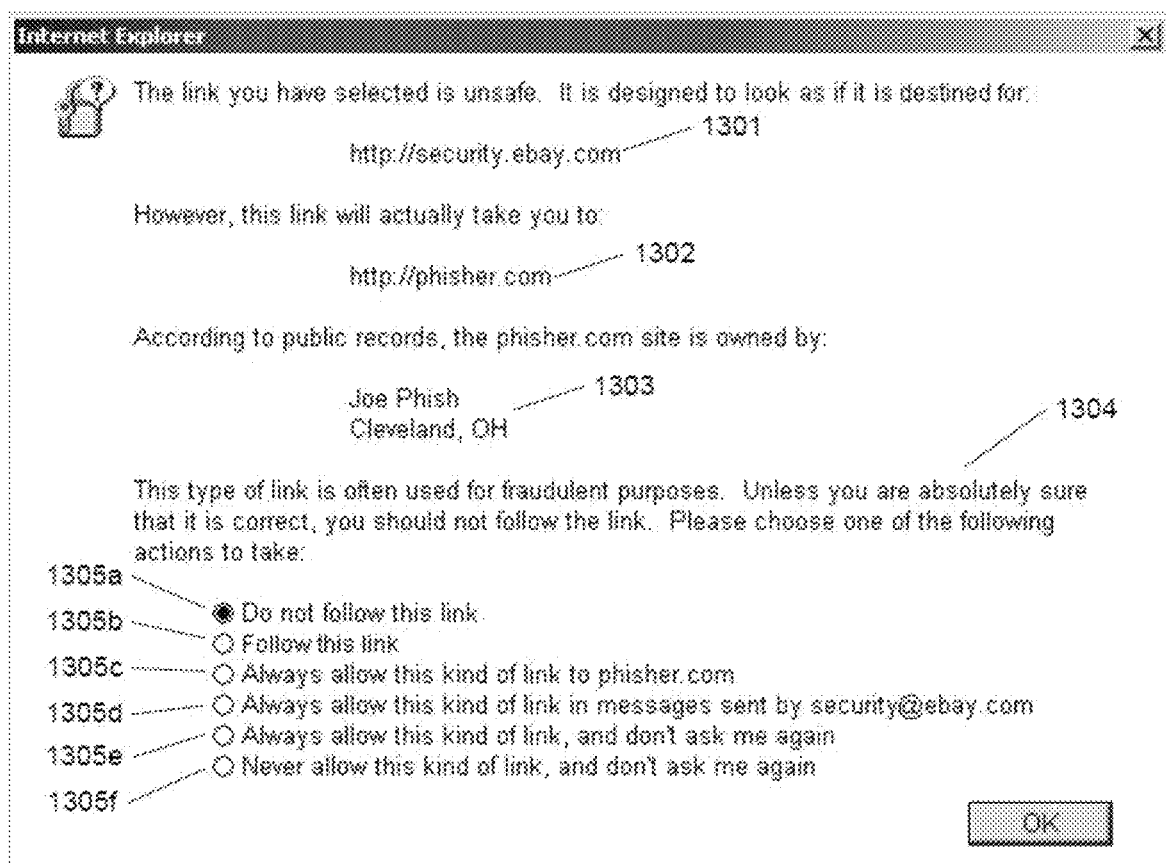
FIG. 13 is an example of a user interface element warning of a potentially unsafe URL usage, according to some embodiments.

If the security settings dictate that a UI element be presented (505), then a UI element is presented in this example (506), for example providing options such as those discussed in conjunction with FIG. 13. If the URL traversal is approved (507), then in this example, security settings that may have been changed are optionally stored (508), and the URL is traversed (509). If the URL traversal is not approved (507), then in this example, security settings that may have been changed are optionally stored (508), and the URL is not traversed (510).

Figure 6:
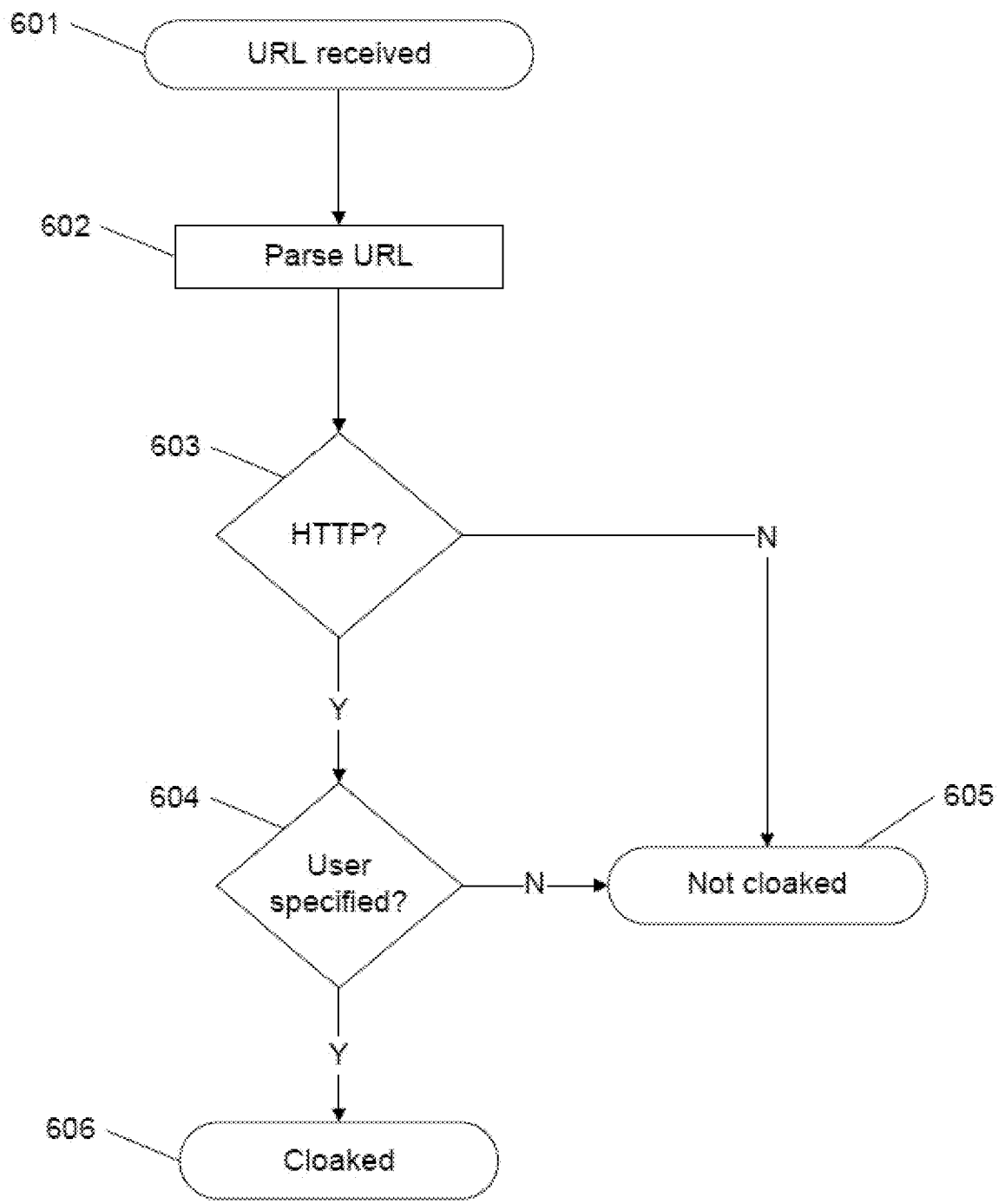
FIG. 6 is a flow diagram of a method for detecting a cloaked URL, according to some embodiments.

FIG. 6 is a flow diagram of a method for detecting a cloaked URL, according to some embodiments. In some embodiments, detection of a cloaked URL may be performed as part of a determination of whether a URL is suspicious, for example as discussed in conjunction with 205 of FIG. 2. In some embodiments, detection of a cloaked URL may be performed as the sole determining factor of whether a URL is suspicious, for example as discussed in conjunction with 802 of FIG. 8.

In this example, a URL is received for processing (601), for example because a user clicks on an associated link, or because an associated link is to be displayed, or as part of a determination of whether the URL is suspicious. The URL may be parsed (602). Examples of parsing a URL include parsing via a compiled grammar such as an LALR grammar (for example as compiled by a parser generator such as yacc), a recursive-descent parser, one or more regular expressions, and a hand-crafted ad-hoc parser. Construction of a parser for a URL is readily achievable by those skilled in the art. For example, in the case of an RFC type URL, a parser may be constructed with reference to sections 2 through 4 and Appendix A of IETF RFC 2396, "Compilers: Principles, Techniques and Tools," by Aho, Sethi and Ullman (ISBN 0-201-10088-6) and "Lex & Yacc," by Mason, Levine, and Brown (ISBN 1-56592-000-7). During or after parsing a URL, the presence of a username or username: password pair may be detected. Optionally, a protocol specifier may be detected and checked for an HTTP protocol. One example of an HTTP protocol specifier is "http." Another example of an HTTP protocol specifier is "https." Another example of an HTTP protocol specifier is the absence of a non-HTTP protocol specifier, for example in embodiments in which HTTP is a default protocol.

Figure 7:
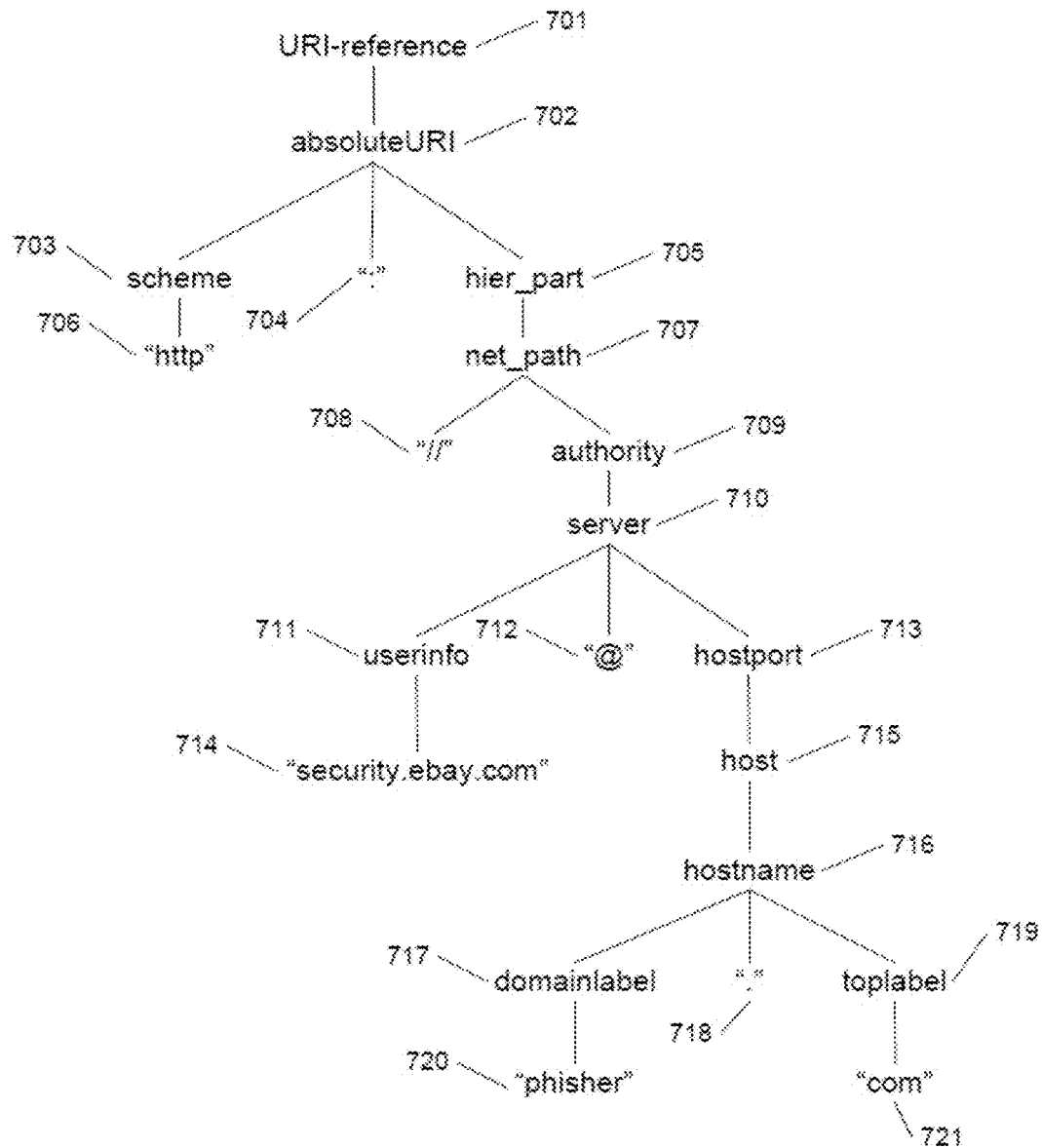
FIG. 7 is an example of a parse tree for the cloaked URL "http://security.ebay.com@phisher.com," as could be constructed by some embodiments of 602 of FIG. 6.

The example shown in FIG. 6 can be more clearly illustrated when discussed in conjunction with FIG. 7. FIG. 7 is an example of a parse tree for the cloaked URL "http://security.ebay.com@phisher.com," as could be constructed by some embodiments of 602 of FIG. 6. In this example, a parser uses the modified BNF grammar presented in IETF RFC 2396, Appendix A, and terminology therefrom is employed for illustrative purposes. The URI-reference 701 is a URL composed of an absoluteURI 702, which is composed of a scheme 703 specifying a protocol and a hierarchical part 705 specifying a location, separated by a colon 704. The scheme 703 is "http" 706, and the hierarchical part 705 is a network path 707. The network path 707 is composed of a double slash 708 and an authority 709, which refers to a server 710, which contains user information 711 consisting of the username "security.ebay.com" 714, an "@" 712, and a host/port specification 713. The host/port specification 713 specifies a host 715, which is composed of a hostname 716. The hostname 716 contains a domain label 717 consisting of "phisher" 720, a toplabel 719 consisting of "com" 721 and a separator dot "." 718. The semantics of this syntactic structure are defined in IETF RFC 2396 § 3 to mean that the document referenced by the URL is available via the HTTP protocol from phisher.com using the username "security.ebay.com" with no password, on the default port.

Using the parse tree illustrated in FIG. 7 as an example in the flow diagram of FIG. 6, once a URL has been parsed (602), an associated protocol may optionally be checked to determine whether it is an HTTP protocol (603). An example of checking the protocol is to check the scheme 703 and determine whether it is "http" 706, "https" or empty, any of which may indicate an HTTP protocol. In another example, a protocol may be checked by examining a data structure that has been populated with parsed data and determining whether an HTTP protocol is indicated. In yet another example, a protocol may be checked by calling a function that determines what protocol is specified in a URL. If the protocol is not an HTTP protocol (603), then the URL is not considered cloaked in this example (605).

If the protocol is an HTTP protocol (603), or if no protocol check is performed, then the URL is checked in this example to determine whether a user was specified (604). An example of checking a URL to determine whether a user was specified is to check to see whether any string is contained in the userinfo 711. In another example, determining whether a user was specified may include examining a data structure that has been populated with parsed data and determining whether a user is specified. In yet another example, determining whether a user was specified may include calling a function that determines what user is specified in a URL. In yet another example, determining whether a user was specified may include scanning some or all of a URL, such as an authority 709, to see if an "@" character appears anywhere before a first "/" character. In the example shown in FIG. 7, the user is "security.ebay.com" 714.

If no user is specified (604), then the URL is not considered cloaked in this example (605). If a user is specified (604), then the URL is considered cloaked in this example (606). In some embodiments, a value indicating that the URL is cloaked may be associated with the URL.

Detection of a cloaked URL may occur at any point in the parsing or processing of a parse tree, including while building a parse tree such as an abstract syntax tree, while analyzing a parse tree, while translating a parse tree into an application-specific data structure, or while analyzing or acting on an application-specific data structure.

In some embodiments, a browser or messaging client may parse URLs in a manner which does not recognize cloaked URLs. For example, the "server" nonterminal symbol in the grammar of IETF RFC 2396, Appendix A may be effectively redefined so that "@" is not an allowed component, or the grammar may be transformed so that "@" is disallowed in a "server" for HTTP-based URLs.

Figure 8:
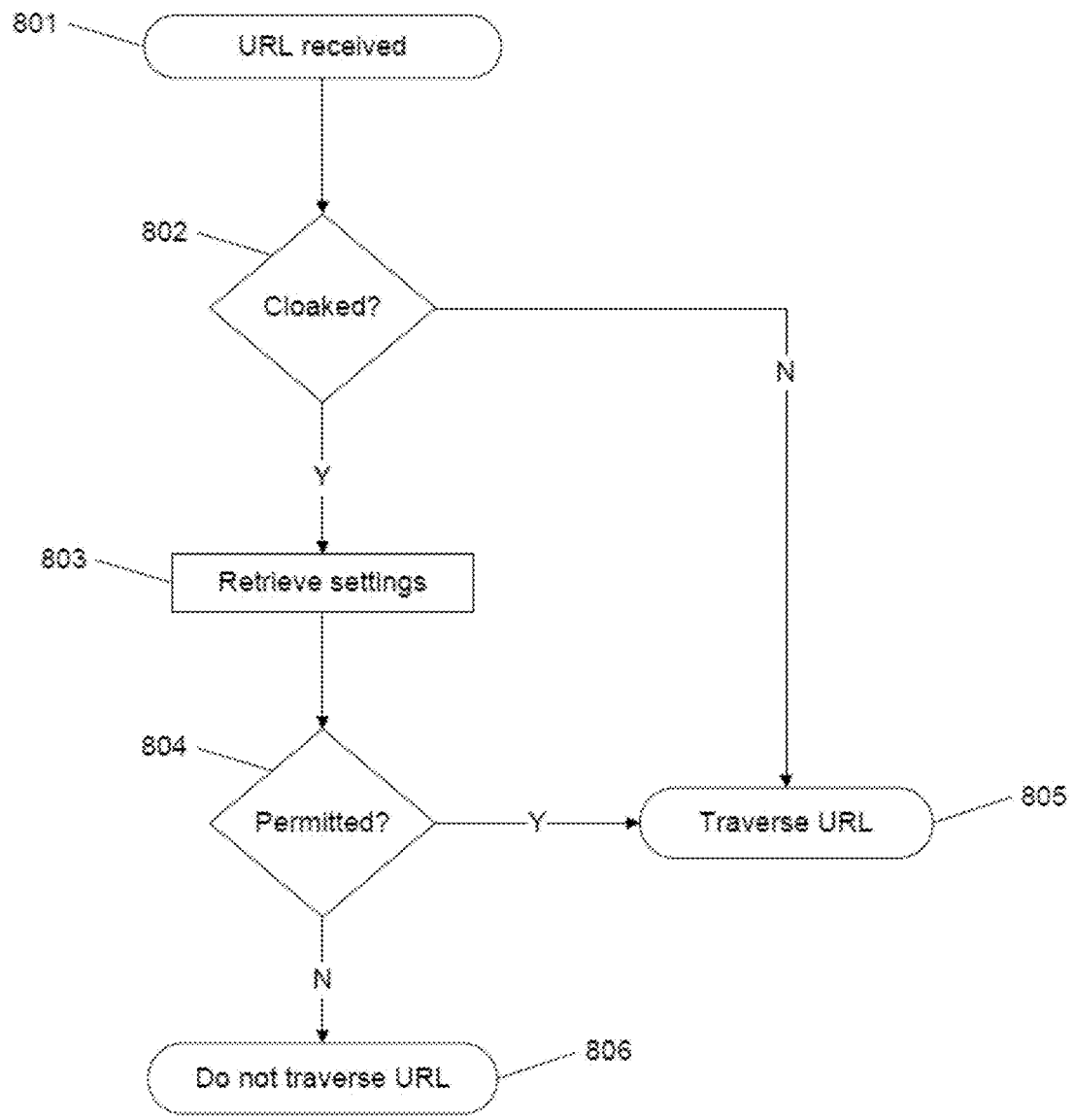
FIG. 8 is a flow diagram of a method for differential treatment of a cloaked URL, according to some embodiments, exemplifying an application of the method illustrated in FIG. 5.

FIG. 8 is a flow diagram of a method for differential treatment of a cloaked URL, according to some embodiments, exemplifying an application of the method illustrated in FIG. 5. In this example, a URL is received for processing (801), for example because a user has clicked on an associated link. The URL may be evaluated to determine whether it is cloaked (802). One example of evaluating the URL to determine whether it is cloaked is to analyze the URL, for example as described in conjunction with FIG. 6. Another example of evaluating the URL to determine whether there a value associated with the URL indicating that the URL is cloaked, for example a value associated as described in conjunction with 606 of FIG. 6. If the URL is not cloaked, then the URL is traversed in this example (805). If the URL is cloaked, then security settings are optionally retrieved in this example (803). In some embodiments, security settings may include settings specifying whether cloaked URLs should be allowed. In some embodiments, security settings may be stored in a file or other persistent storage, for example under settings for a web browser and/or a messaging client in a Windows registry. In some embodiments, security settings may be retrieved and kept available for subsequent reference without further retrieval.

If the cloaked URL is permitted by the security settings (804), for example because it refers to a document in a trusted domain, or because security settings permit cloaked URLs, then the URL is traversed in this example (805). An example of traversing the URL is to retrieve a document to which the URL refers. If the cloaked URL is not permitted (804), for example if there are no relevant security settings or if security settings do not permit cloaked URLs, then the URL is not traversed in this example (806). An example of not traversing the URL is to not retrieve a document to which the URL refers. In some embodiments, a user interface element such as a dialog box may be presented, indicating that the URL was not traversed.

Cloaked URLs may be detected under various conditions. For example, cloaked URLs may be detected at all times, or only when received by a browser from an external source, or when typed or entered into a URL input area, or specifically when received from a messaging client. In some embodiments, a cloaked URL may be treated differently depending on how it was received by a browser. For example, a cloaked URL may be permitted only when accessed by selecting a bookmark, and disallowed when received from other sources.

Figure 9:
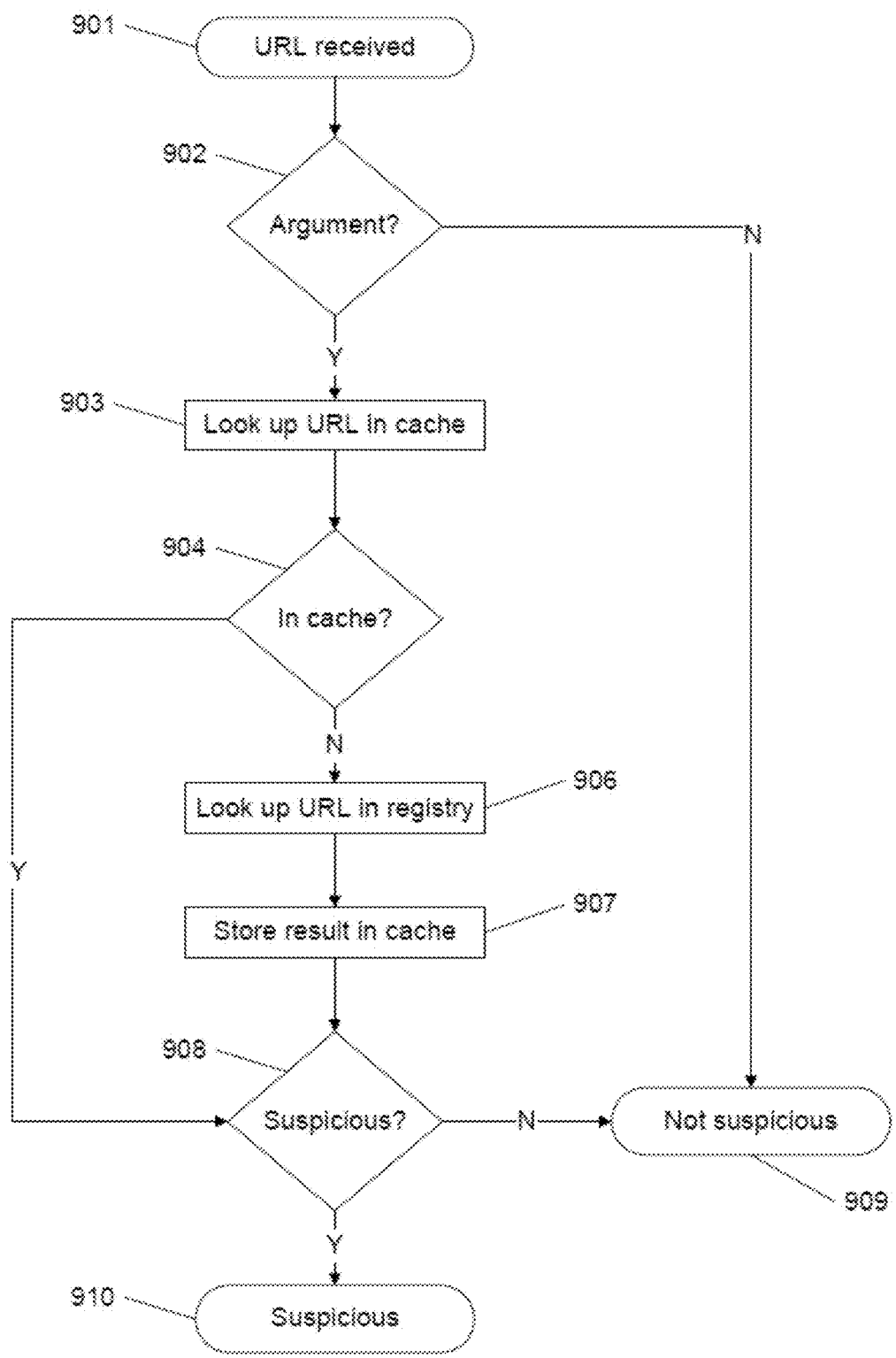
FIG. 9 is a flow diagram of a method for determining whether a URL is a suspicious redirect, according to some embodiments.

FIG. 9 is a flow diagram of a method for determining whether a URL is a suspicious redirect, according to some embodiments. In some embodiments, detection of a suspicious redirect may be performed as part of a determination of whether a URL is suspicious, for example as discussed in conjunction with 209 of FIG. 2. In this example, a URL is received for processing (901), for example because a user has clicked on an associated link, or because a document is being parsed or rendered and its links are being evaluated. The URL may optionally be checked to determine whether it has an argument (902). This check may, for example, be performed on an HTTP URL by determining whether there is text following a "?" in the URL. If it is determined that the URL does not have an argument (902), then the URL is not treated as a suspicious redirect in this example (909).

If it is determined that the URL has an argument (902), then the URL may optionally be looked up in a redirect cache (903). A redirect cache refers herein to any association of URLs with an indication of whether they are suspicious redirects or not. A redirect cache may, for example, store a stem URL (for example, a URL stripped of its argument(s)), associated with one or more boolean values corresponding to suspicious qualities. A boolean value refers herein to any value that distinguishes between two options. An example of a boolean value is a single bit. Another example of a boolean value is a variable such as an integer, which for example may distinguish between zero and non-zero (such as one). In some embodiments, a stem URL may be associated with a boolean value indicating whether the stem URL is a suspicious redirect. For example, the value 0 may indicate that an associated URL is not suspicious, and the value 1 may indicate that an associated URL is suspicious. A redirect cache may include any data structure that associates a URL with one or more associated values, for example a database or a file on a user's computer containing, for each URL listed, one line of text including the URL, followed by a space, followed by associated data, which may be nil. Looking up a URL in a redirect cache may, for example, include stripping the URL of its argument(s), if any; determining whether the stripped URL is contained in the redirect cache; and if so, retrieving the associated boolean value.

If the URL is found in a redirect cache (904), then it is determined whether the URL is suspicious in this example (908). One example of determining whether a URL is suspicious is to check one or more values associated with the URL in a redirect cache. If the URL is determined not to be suspicious (908), then the URL is not treated as a suspicious redirect in this example (909). If the URL is determined to be suspicious (908), then the URL is treated as a suspicious redirect in this example (910).

If the URL was not found in the redirect cache (904), then the URL is looked up in a redirect registry in this example (906). A redirect registry may associate a URL with an indication of one or more suspicious qualities. In some embodiments, indication of a suspicious quality may be implicit. For example, membership in a redirect registry may indicate that a URL is suspicious. A redirect registry may be any form of database in which a membership query for a URL may be performed. In one example, a redirect registry may be a file contained on the user's computer. In some embodiments, a redirect registry may be automatically updated, for example by periodic updates from an external source. In another example, a redirect registry may be maintained by a central authority and available over a network such as an intranet or the internet. In yet another example, a redirect registry may be maintained peer-to-peer, for example by allowing external interrogation of a local cache, and by performing the external lookup by interrogating the cache of trusted peers; or by using an open source peer-to-peer mechanism such as Chord.

Details of Chord are available in Dabek, Brunskill, Kaashoek, Karger, Morris, Stoica, and Balakrishnan, Building Peer-to-Peer Systems With Chord, A Distributed Lookup Service, Proceedings of the 8th Workshop on Hot Topics in Operating Systems (May 2001), source code for which is currently available over the internet from MIT.

In yet another example, a redirect registry may be maintained at an enterprise for use by computers on an intranet. Multiple redirect registry lookups may be chained, for example by considering a URL suspicious if any redirect registry classifies it as such. The result of the redirect registry lookup may optionally be stored in a redirect cache (907). If a redirect registry reported that a URL was suspicious (908), then the URL is considered a suspicious redirect in this example (910). If no redirect registry reported that the URL was suspicious (908), then the URL is not considered a suspicious redirect in this example (909).

Figure 10:
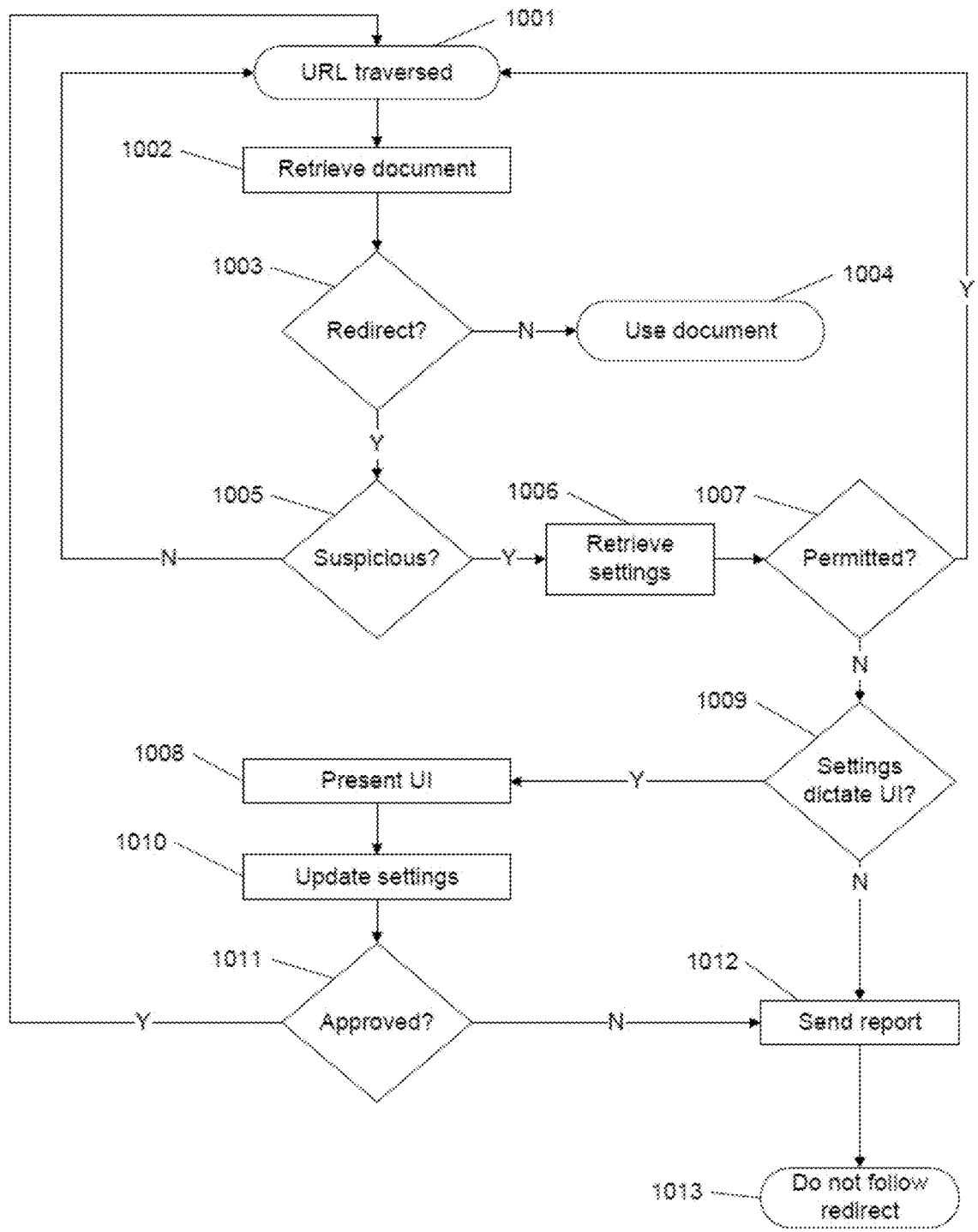
FIG. 10 is a flow diagram of a method for detecting and reporting suspicious redirects, according to some embodiments.

FIG. 10 is a flow diagram of a method for detecting and reporting suspicious redirects, according to some embodiments. In this example, a URL is traversed (1001), for example as a result of a user clicking on a link. An associated document may be retrieved (1002). The document may be checked to determine whether it is a redirect (1003). This check may, for example, be performed for an HTML document by determining whether a META tag is present in the head with an 'HTTP-EQUIV="refresh"' argument. If the document is determined not to be a redirect (1003), then the document is further processed in this example (1004). For example, the document may be rendered by a document reader such as a browser.

If the document is determined to be a redirect (1003), then it is checked to determine whether it is a suspicious redirect in this example (1005). In one example of checking to determine whether a redirect is suspicious, the URL may be checked to determine whether it is an open redirect, and may be considered suspicious if so. Checking for an open redirect may, for example, be performed by determining whether the destination of the redirection is substantially contained within the URL; and if so, it is considered to be an open redirect in this example. In some embodiments, a test for an open redirect may be performed, for example by inserting a test URL referring to a test document into a potential open redirect and attempting to retrieve a document associated with the augmented URL containing the test URL. In one example, if the retrieved document for the augmented URL is verified to be a redirect to the arbitrary URL, then the potential open redirect is determined to be an open direct in this example. In another example, if the test document is determined to be associated with the augmented URL containing the test URL, then the potential open redirect is determined to be an open redirect in this example. In another example, an open redirect may normally be suspicious, but may be considered unsuspicious if it occurs within the same domain, or if the target URL is contained in a list of "safe" locations. In yet another example, a URL may be considered suspicious if it is a redirect and contains obfuscation. In yet another example, a redirect may count as a suspicion penalty factor and a URL may be scoreboarded, for example as discussed in conjunction with FIG. 2, to determine if it should be considered suspicious. In yet another example, any cross-domain redirection may be considered suspicious.

In some embodiments, suspicious redirects, or elements of suspicious redirects, may be reported, for example to a redirect registry.

If the document is determined not to be a suspicious redirect (1005), then the redirection is followed in this example, for example by traversing the target URL (1001). If the document is determined to be a suspicious redirect (1005), then security configuration data is retrieved in this example (1006). An example of retrieving security configuration data is to retrieve data from registry settings associated with a browser or messaging client. If the suspicious redirect is permitted by security settings (1007), then the redirection is followed in this example, for example by traversing the destination URL (1001).

If the suspicious redirect is not permitted, then the security settings are checked in this example to see if a UI element is to be presented (1009). If no UI element is to be presented, then a report is optionally sent in this example (1012) indicating that the URL is a suspicious redirect. Such a report may, for example, be sent to an external authority over the internet, a local redirect registry on the user's computer, or an enterprise-wide redirect registry used by users of an intranet. The redirect is not then followed in this example (1013). If the security settings dictate that a UI element is to be presented, then a UI element, such as a dialog box, is presented in this example (1008). In some embodiments, a UI element may have options such as those discussed in conjunction with FIG. 13.

One or more security settings may be updated (1010), for example to record a change selected by a user. An update of settings may, for example, include updating a setting associated with a web browser or messaging client in a Windows registry. If the user elects to follow the redirect (1011), then the link is followed in this example, for example by traversing the target URL (1001). If the user elects not to follow the redirect (1011), or if no UI element was presented to the user (1009), then in this example, a report is optionally sent indicating that the URL is a suspicious redirect (1012), and the redirect is not followed (1013). In some embodiments, additional actions may also be taken. For example, an error may be returned.

In some embodiments, redirection chains may be followed in which multiple redirections occur and any or all such redirections (for example, all redirections, or only the first redirection, or only the last redirection) may be analyzed for suspicious characteristics.

Redirects may be detected under various conditions. For example, redirects may be detected at all times, or only when received by a browser from an external source or when typed or entered into a URL input area, or specifically when received from a messaging client. In some embodiments, a redirect may be treated differently depending on how a redirecting URL was received by a browser. For example, a redirect may be permitted when accessed by clicking a link on a web page or selecting a bookmark, and disallowed when received from another other source.

In embodiments in which a redirect cache is used, a redirect cache may be updated when a redirect is determined to be suspicious or not suspicious, for example after 1005 of FIG. 10 and/or after a user has determined whether a redirect should be followed, as discussed in conjunction with 1011.

Figure 11:
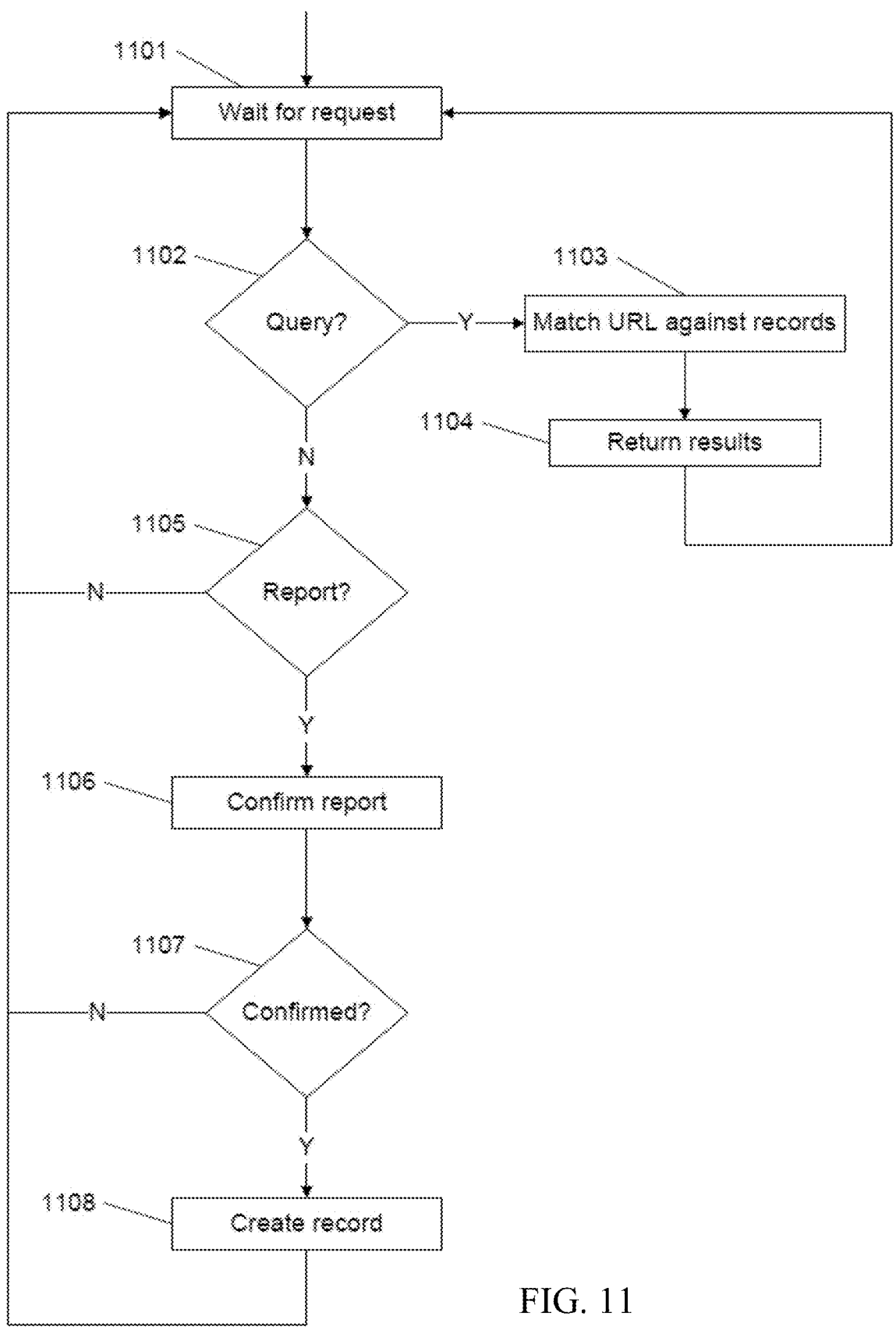
FIG. 11 is a flow diagram of a method for responding to requests to check and report suspicious documents or URLs, according to some embodiments.

FIG. 11 is a flow diagram of a method for responding to requests to check and report suspicious documents or URLs, according to some embodiments. The method of FIG. 11 may, for example, be associated with a redirect registry as discussed in conjunction with FIGS. 9 and 10. In this example, a request is awaited (1101). A request may be awaited using any of a variety of mechanisms for interprocess communication, including providing a service available via a remote procedure call such as a web service and listening for messages on a port accessible over a network such as an intranet or the internet. When a request is received, it may be checked to determine whether the request is a query (1102). If the request is a query, then the URL that is being queried is matched against stored records in this example (1103). Matching may be done using any of a variety of methods, such as stripping off any arguments from a URL (for example by removing any text including and following a "?") and checking against stored records, for example records stored in a database or flat file. Results of the query may be returned to the requester (1104). For example, if a matching record was found with an associated indication that the URL is "positive" (for example, an illegitimate or suspicious redirect), then a "positive" response is returned in this example. If a matching record was found (1103) with an associated indication that the URL is "negative" (for example, a known legitimate redirect), then a "negative" response is returned in this example. If no matching record was found (1103), then an "unknown" response is returned in this example. A response may be returned by any of a variety of mechanisms for interprocess communication, for example by returning a value through a remote procedure call mechanism and sending a response over a network such as an intranet or the internet. In some embodiments, only "positive" records may be maintained in the records, and "unknown" and "negative" may be represented by the same value.

If the request is not a query (1102), then the request is checked in this example to determine whether it is a report (1105). If the request is not a report, then the request is ignored in this example, and another request is awaited (1101). If the request is a report (1105), then the report is optionally confirmed in this example (1106). In some embodiments, confirming a report may include authenticating the reporter to ensure that the report is coming from a legitimate reporting entity, such as a browser; and rejecting known bad reporters, for example by blacklisting IP addresses from which spurious reports have been received. In some embodiments, confirming a report may include determining whether a report is accurate. In one example, all reports (or all authenticated reports) may be considered accurate unless subsequently disputed. In another example, a count may be kept of the number of times that a substantially identical URL has been reported, and a report may be considered confirmed when the number of times a substantially identical URL has been reported reaches a threshold, for example ten. In such an example, counted reports may optionally be limited to one per location, for example one per IP address. In yet another example, a report may be validated by fetching a document corresponding to a reported URL and determining whether the document contains suspicious content, for example a redirection. In yet another example, a human may review reports and confirm them manually. In some embodiments, these techniques may be combined, for example by triggering a human review when a threshold number of reports have been received.

If a report is not confirmed (1107), then another request is awaited in this example (1101). If a report is confirmed (1107), then a record is created in this example (1108). A record may be stored in any persistent or transient storage, for example in a database table or a flat file. A record may contain data contained in a report, for example a URL with an associated indication that the URL is "positive" or "negative," corresponding to the report that was confirmed. A URL in a record may be the same as a reported URL, or may be formed from the reported URL, for example by removing arguments. Arguments may be removed, for example, by removing text including and following a "?" in a URL. Another request may be awaited in this example (1101).

Figure 12:
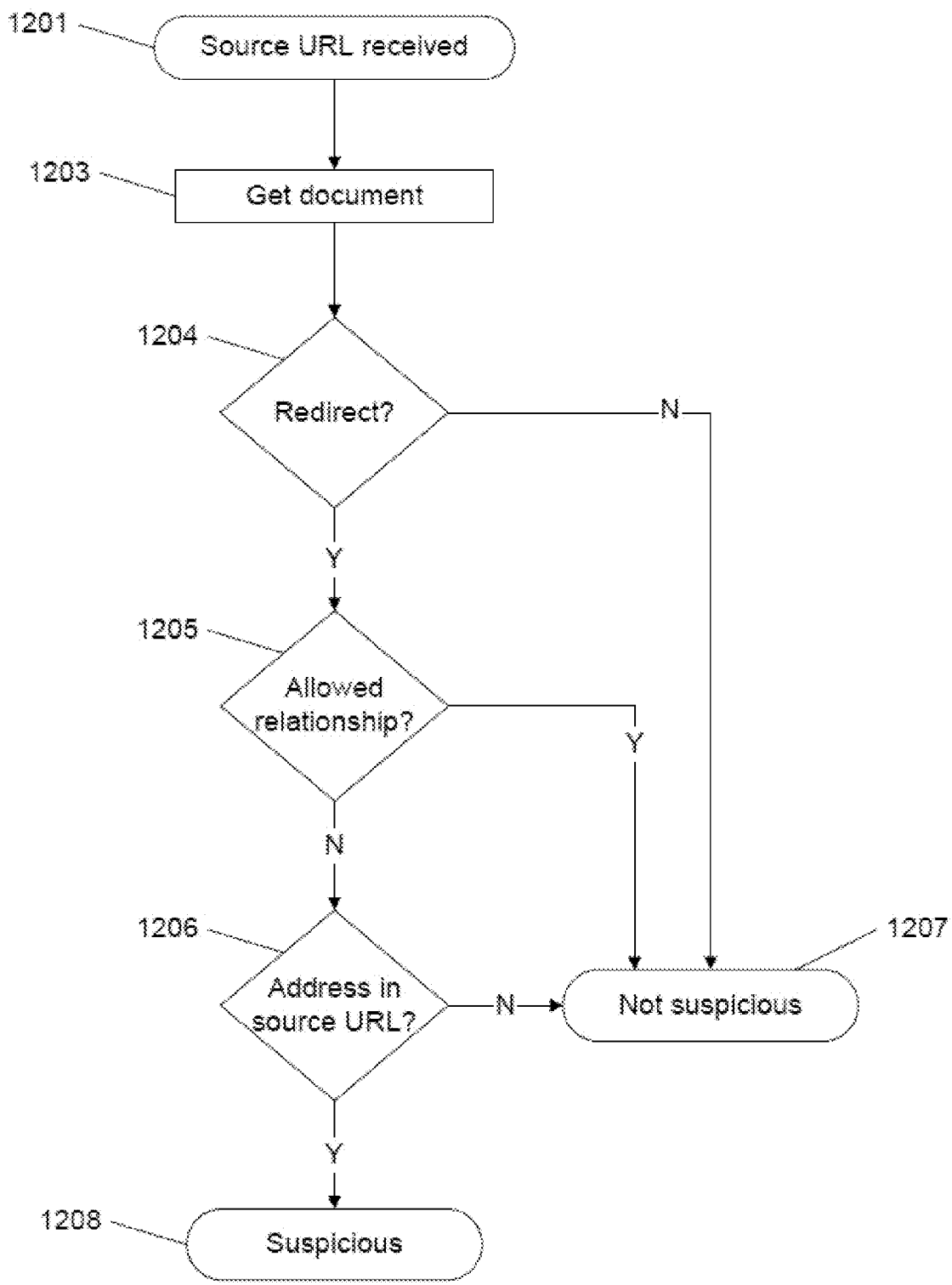
FIG. 12 is a flow diagram of a method for detecting a redirection as it occurs, according to some embodiments.

FIG. 12 is a flow diagram of a method for detecting a redirection as it occurs, according to some embodiments. In this example, a URL, herein referred to as the source URL, is received (1201). An example of receiving a source URL is when a document containing the source URL is rendered. An electronic document may be retrieved at the address specified by the source URL (1203). If the document is a redirect (1204)—for example, if an HTML document contains a '<META http-equiv="refresh" . . . >' directive—then in this example it is determined whether the relationship is allowable (1205). For example, the source URL may be checked against the target URL to determine whether the relationship is allowable. The target URL refers herein to the target of a redirect, and may be determined, for example, by extracting the value specified in the "content" of a META tag specifying 'HTTP-EQUIV="refresh"' in an HTML document. As an example of determining whether a relationship between a source URL and a target URL is allowable, redirections within the same site may be allowed, while cross-site redirects may be subjected to additional scrutiny.

If the relationship is not automatically allowable (1205), the source URL and target URL are compared in this example to see whether the target URL is substantially contained within the source URL (1206). If so, the source URL is considered suspicious in this example (1208). If the target URL is not substantially contained within the source URL (1206), or if the page was not redirected (1204) or the relationship between the source URL and target URLs is allowable (1205), then the source URL is not considered suspicious in this example (1207).

In some embodiments, a document fetched to determine whether it is a redirect, as discussed in conjunction with 1203, may be retained and returned when the document is requested.

FIG. 13 is an example of a user interface element warning of a potentially unsafe URL usage, according to some embodiments. A user element such as the illustrative dialog box depicted in FIG. 13 may, for example, be presented when an attempt is made to traverse a suspicious URL. Examples of situations in which a user interface element such as FIG. 13 may be presented are discussed in conjunction with 304 of FIG. 3, 506 of FIG. 5, 1008 of FIG. 10, 1505 of FIG. 15, 1605 of FIG. 16, and 1904 of FIG. 19.

In this example, an apparent destination 1301 of a link is shown along with an actual destination 1302 of the link and a warning 1304 about risks associated with such links. Additional information may also be included, such as the owner 1303 of the actual destination site. A selection of actions 1305*a*-1305*f* are also shown in this example. In some embodiments, presentation of a user interface element may depend on security settings and/or user preferences. For expository purposes, in this example a suspicious URL is illustrated that may appear to a user to go to http://security.ebay.com but actually refers to http://phisher.com. Examples of such a URL include the cloaked URL "http://security.ebay.com@phisher.com," a hypothetical open redirect at http://security.ebay.com that is given the URL "phisher.com" as an argument, and a misleading link named "http://security.ebay.com" that actually refers to http://phisher.com. In some embodiments, different user interface elements may be presented for different types of suspicious URLs. Some or all of the illustrated informational elements, as well as additional elements not illustrated, may be present in some embodiments.

A user interface element may present information such as an apparent destination of the link 1301 and an actual destination of the link 1302, and a warning about risks associated with such links 1304. Operations to determine the name and/or ownership of the true destination address may be performed, for example reverse DNS lookups on numeric addresses and/or WHOIS lookups, and resultant information 1303, such as the name of the registered owner of the domain, may be presented.

A UI element may offer an option to subsequently permit suspicious URLs, for example all suspicious URLs, or suspicious URLs of the same type that triggered the warning (such as cloaked URLs, redirects, suspicious redirects, misleading links, or obfuscated URLs), herein referred to as "similar suspicious URLs." Subsequent permission specified through the UI element may apply either without restrictions 1305*e* or only for the suspicious URL or destination domain that triggered the warning 1305*c*. If a suspicious URL prompting a user interaction occurs in an electronic message, there may be an option to allow similar suspicious URLs from a sender associated with the message 1305*d*. In various embodiments, such an option may be enabled for all messages, or only for messages with verified addresses. Examples of verified addresses include sender addresses of messages with cryptographic certificates matching the sender of a message, or messages verified through an email verification scheme such as SPF, Sender-ID, Domain Keys or Caller ID for Email, specifications for which are readily available to those skilled in the art.

Options may be presented, including options to reject the particular URL 1305*a*, which in some embodiments may be the default option, to traverse the particular URL 1305*b*, and/or to disallow all similar suspicious URLs 1305*f*. In some embodiments, there may be one or more options to save a selected security option and apply it in the future when a similar suspicious URL is detected. Such an option may be available separately from selected options, or may be integrated into the security options as illustrated in FIG. 13, either explicitly 1305*e*, 1305*f* or implicitly 1305*c*, 1305*d*.

In some embodiments, behavior on encountering a suspicious URL may be configurable. For example, in security settings for a web browser, there may be one or more options specifying action(s) to take when an attempt is made to traverse a suspicious URL. Such options may, for example, exist separately for each type of suspicious URL, or may group different types of suspicious URLs together. In some embodiments, security settings may include options to disallow a type of suspicious URL, warn about the presence of a type of suspicious URL on a page, warn about a type of suspicious URL when an attempt is made to follow an associated link, and/or permit a type of suspicious URL to be handled as if they were not suspicious. In some embodiments, such options may have default values corresponding to the overall security level selected, for example to disallow a type of suspicious URL by default when a "high" security level is set, to warn when a "medium" level is set, and to permit when a "low" level is set.

In some embodiments, security options may have defaults that are contextually established, such as disallowing traversal of a type of suspicious URL when in a high-risk zone such as the public internet, or from within email from an unverified or untrustworthy sender, or when traversal would lead into a high-risk zone. Similar contextually controlled values may for example allow a type of suspicious URL traversal fully within low-risk zones, such as within an intranet, from within a web page hosted on an internal LAN address (which may be determined, for example, by determining that an address is within a range assigned via DHCP), or directed into another web page hosted on another internal LAN address. In some embodiments, security settings of this nature may be configured by a user or administrator, with persistent storage in a registry or other file(s). For example, such security settings may be stored under settings for a web browser and/or a messaging client in a Windows registry.

Figure 14:
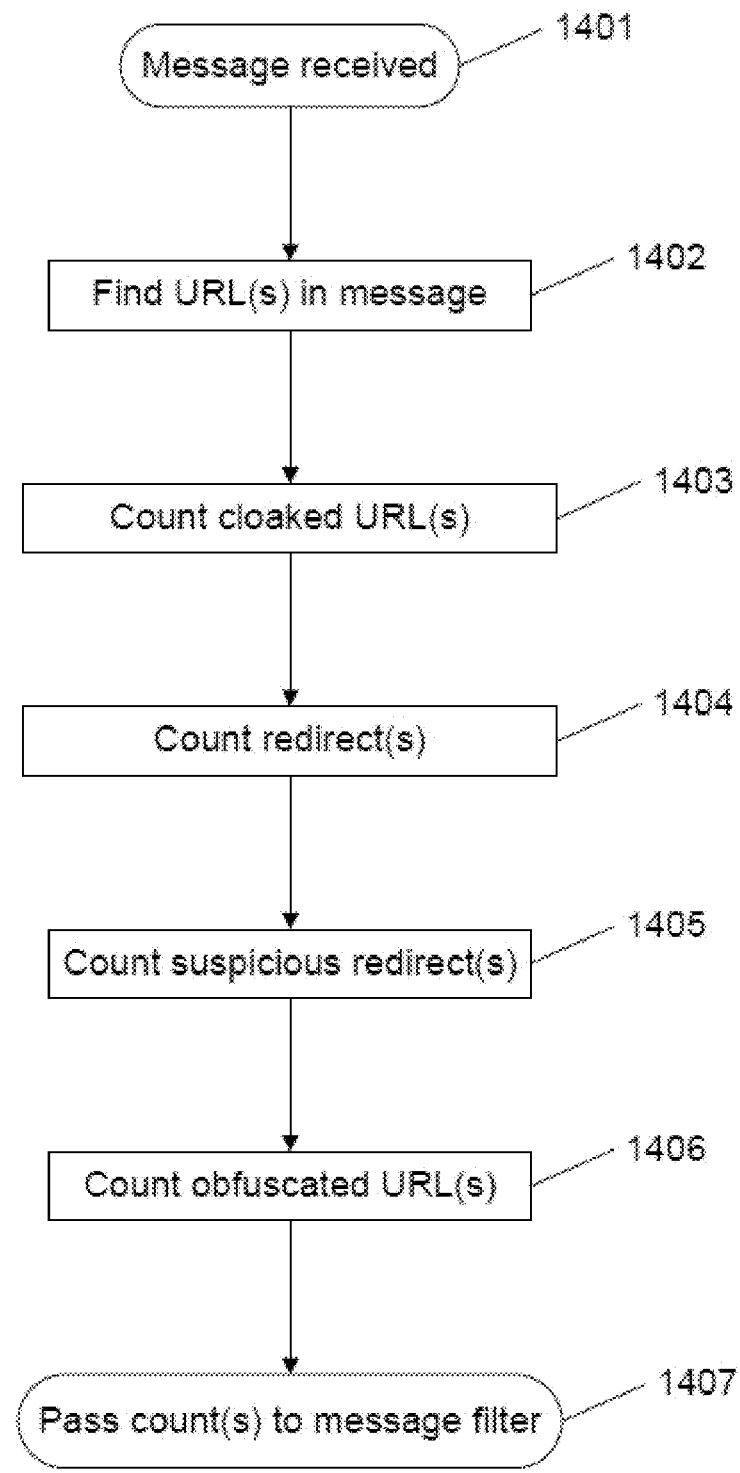
FIG. 14 is a flow diagram of a method for passing information about the presence of one or more suspicious URLs to a message filter, according to some embodiments.

FIG. 14 is a flow diagram of a method for passing information about the presence of one or more suspicious URLs to a message filter, according to some embodiments. In this example, a message filter such as a spam filter may use information about the presence of a suspicious URL as a classification factor. For example, after a message is received (1401), zero or more URLs in the message may be found (1402), for example by parsing HTML and isolating any HREF attributes. URL(s), if any, may be analyzed, and one or more counts may be created, for example for the number of cloaked URLs (1403), the number of redirects (1404), the number of suspicious redirects (1405) and the number of URLs containing obfuscation (1406). These counts may be passed to a filter (1407). Other examples of providing information about suspicious URLs to a message filter include passing boolean values for various attributes, providing a single boolean value indicating the presence or absence of a suspicious URL, providing a count of the number of suspicious URLs in a message, and providing a numeric score (for example derived by scoreboarding any suspicious URLs in a message, as discussed in conjunction with FIG. 2) of how "bad" URL(s) are in a message. Information about the presence of suspicious URLs in a message may be used by a message filter such as an adaptive text classifier or a Bayesian anti-spam classifier, for example to help determine an appropriate classification.

Figure 15:
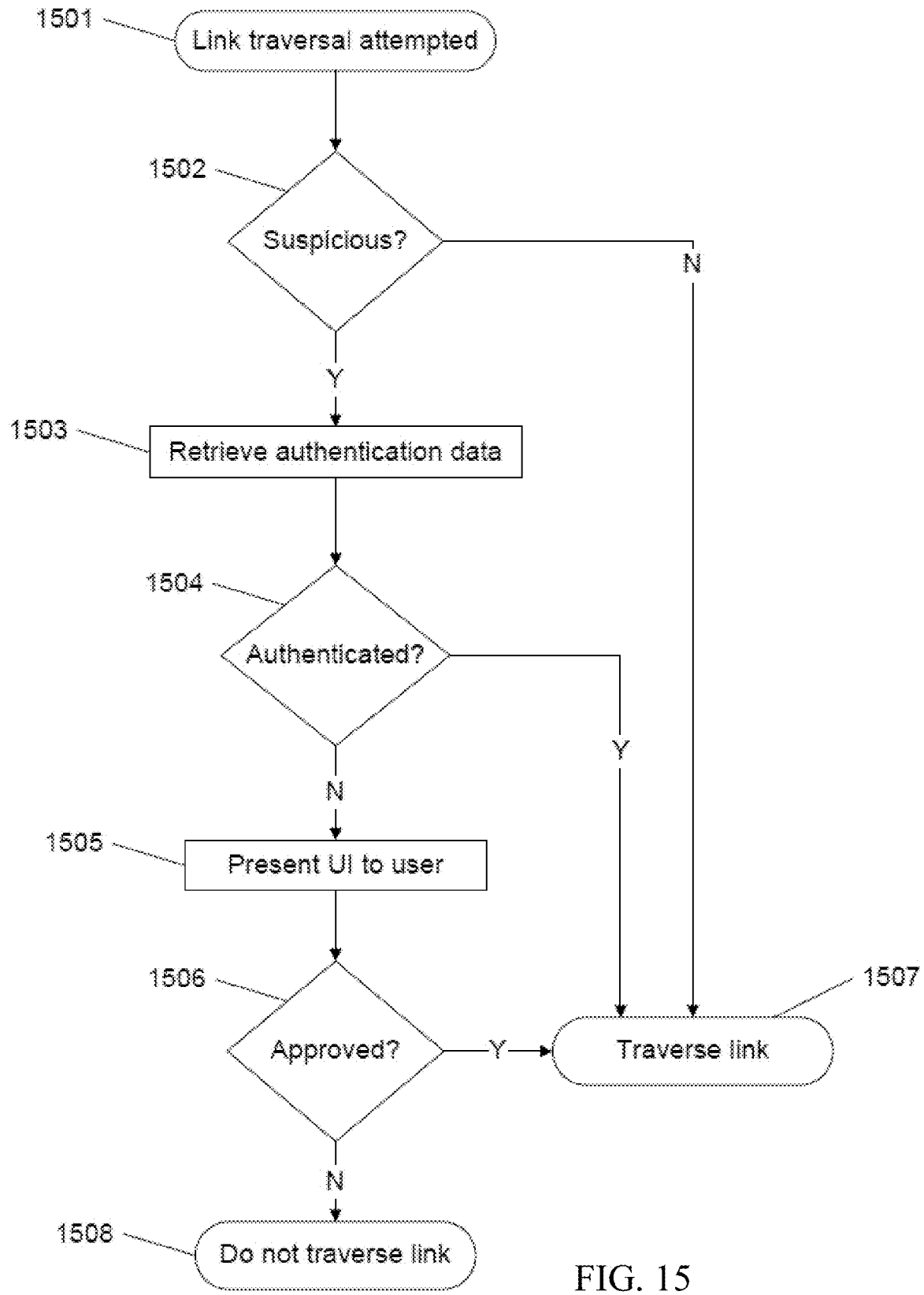
FIG. 15 is a flow diagram of a method for preferential treatment of links in authenticated communications, according to some embodiments.

FIG. 15 is a flow diagram of a method for preferential treatment of links in authenticated communications, according to some embodiments. In this example, a link traversal is attempted (1501), for example because a user has clicked on a link contained in a document such as a message. The link may be checked to determine whether it is suspicious (1502), for example as discussed in conjunction with FIG. 2. If the link is determined not to be suspicious, then it is traversed in this example (1507).

If the link is determined to be suspicious (1502), then authentication data for the message is optionally retrieved in this example (1503). Authentication data may include any data associated with authentication, including data associated with a digital signature, SPF, Sender-ID, Caller ID for Email, and Domain Keys. The message may be checked against the authentication data (1504). Checking a message against authentication data may include any method of reconciling the message against the authentication data, for example verifying that the IP address of the mail transfer agent from which the message was received is permitted to send messages on behalf of the domain in whose name the message was sent, or checking a digital signature contained in the message. In some embodiments, an entity such as the local mail transfer agent may only allow authenticated messages to be received, in which case the retrieval of authentication data (1503) and authenticity check (1504) may be omitted.

If the message is authenticated, then the link is traversed in this example (1507). If the message is not authenticated, then a UI element may optionally be presented to the user in this example (1505). An example of a UI element may include providing an option, such as in a dialog box, to approve a traversal. If the user approves the traversal (1506), then the link is traversed in this example (1507). If the user does not approve the traversal, then the link is not traversed in this example (1508). In some embodiments, all links in unauthenticated messages may be considered suspicious and/or disallowed. In some embodiments, an authenticated message may be given preferential treatment other than automatic allowance of a traversal. In one example of preferential treatment, an authenticated message may have its links treated more leniently. More lenient treatment may, for example, include integrating an authentication result into a suspicion level associated with a URL, or reducing the penalty incurred by an otherwise suspicious link (such as a misleading link, or a link associated with a suspicious URL) by a numeric factor in a scoreboarding implementation such as discussed in conjunction with FIG. 2. In another example of preferential treatment, a user interface element may be presented indicating that the message was authenticated.

Figure 16:
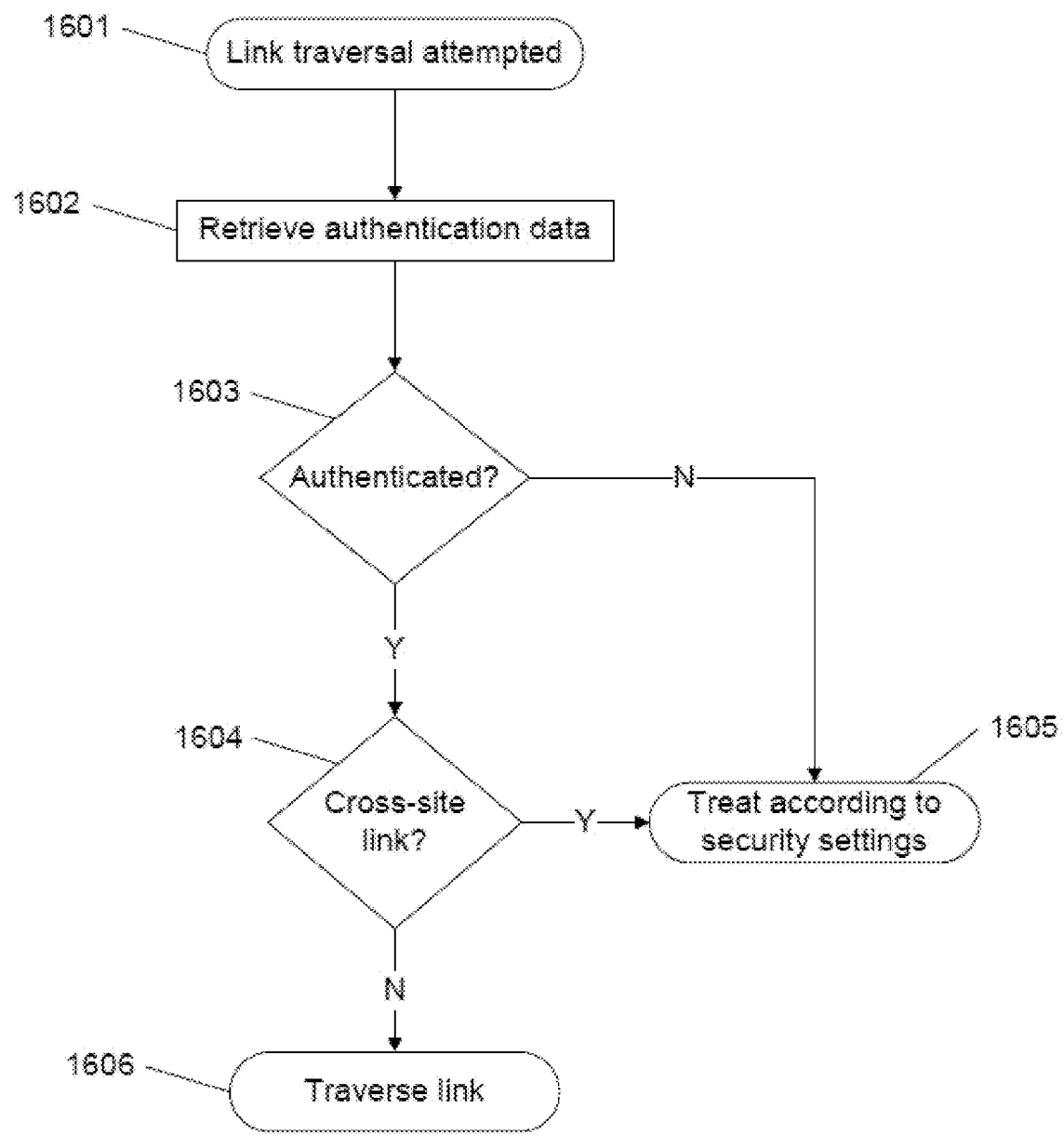
FIG. 16 is a flow diagram of another method for preferential treatment of links in authenticated communications, according to some embodiments.

FIG. 16 is a flow diagram of another method for preferential treatment of links in authenticated communications, according to some embodiments. In this example, a URL traversal is attempted (1601), for example because a user has clicked on a link. Authentication data may optionally be retrieved for the message (1602). Authentication data may include any data associated with message authentication, including data associated with a digital signature, SPF, Sender-ID, Caller ID for Email, and Domain Keys.

The message may be checked against the authentication data (1603). Checking a message against authentication data may include any method of reconciling the message against the authentication data, for example verifying that the IP address of the mail transfer agent from which the message was received is permitted to send messages on behalf of the domain in whose name the message was sent, or checking a digital signature contained in the message. In some embodiments, an entity such as the local mail transfer agent may only allow authenticated messages to be received, in which case the retrieval of authentication data (1602) and authenticity check (1603) may be omitted.

If the message is not authenticated (1603), then URL traversal is treated according to relevant security settings in this example (1605). If the message is authenticated, then the URL is optionally checked in this example to determine whether it is a cross-site link (1604). A cross-site link refers herein to any link that is associated with two or more domains or sites, for example a URL that links to a different domain or site than an originating message in which the link is contained, a cloaked URL whose target is a different domain or site than the sender of the message in which the link is contained, and/or a redirect whose target or source is a different domain or site than an originating message in which the link is contained. If the link is a cross-site link (1604), then traversal is treated according to relevant security settings in this example (1605). If the link is not a cross-site link, traversal is permitted in this example (1606). In some embodiments, a cross-site link from an authenticated message may be given preferential treatment in comparison to a cross-site link from an unauthenticated message. For example, an authenticated message may have its links treated more leniently. Examples of more lenient treatment are discussed in conjunction with FIG. 15.

Figure 17:
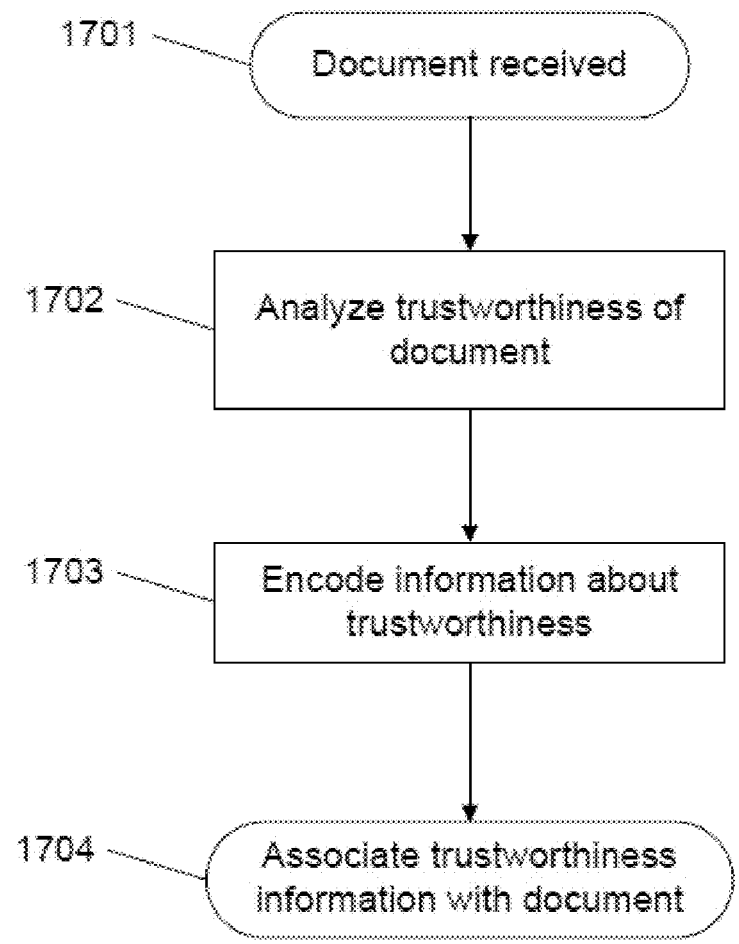
FIG. 17 is a flow diagram of a method for associating trustworthiness information with a document, according to some embodiments.

FIG. 17 is a flow diagram of a method for associating trustworthiness information with a document, according to some embodiments. In this example, a document is received (1701). One example of receiving a document is to receive a message such as an email or instant message, for example by a messaging application 401 or a spam filter. Another example of receiving a document is to retrieve a document associated with a URL, for example by a browser 403.

An analysis may be performed to determine the trustworthiness of the document (1702). One example of an analysis is a spam analysis, for example a determination of how likely a message is to be spam. An example of spam analysis is Bayesian filtering. Another example of spam analysis is a support vector machine. Another example of spam analysis is analysis of SMTP envelope information. Further illustrative details of spam analysis are discussed in conjunction with 1805 of FIG. 18. Another example of an analysis is a determination of whether a message is whitelisted, for example as discussed in conjunction with 1802 of FIG. 18. Another example of an analysis is a determination of whether a message was sent by a verified sender, for example as discussed in conjunction with 1803 of FIG. 18. Another example of an analysis is determining whether a document such as a web page came from a trusted source, such as a whitelisted domain. Another example of an analysis is determining whether a document has suspicious imagery, for example imagery associated with an entity not associated with the document.

The trustworthiness information may be encoded (1703). Encoding the information may include any way to prepare the information for transmission, for example populating a data structure with the information. The information may be associated with the document (1704). In some embodiments, associating information with a document may include populating a data structure with the document and associated information. In some embodiments, associating information with a document may include populating a separate data structure with associated information. In some embodiments, trustworthiness information associated with the document may be used by a method such as the method described in conjunction with FIG. 18.

Figure 18:
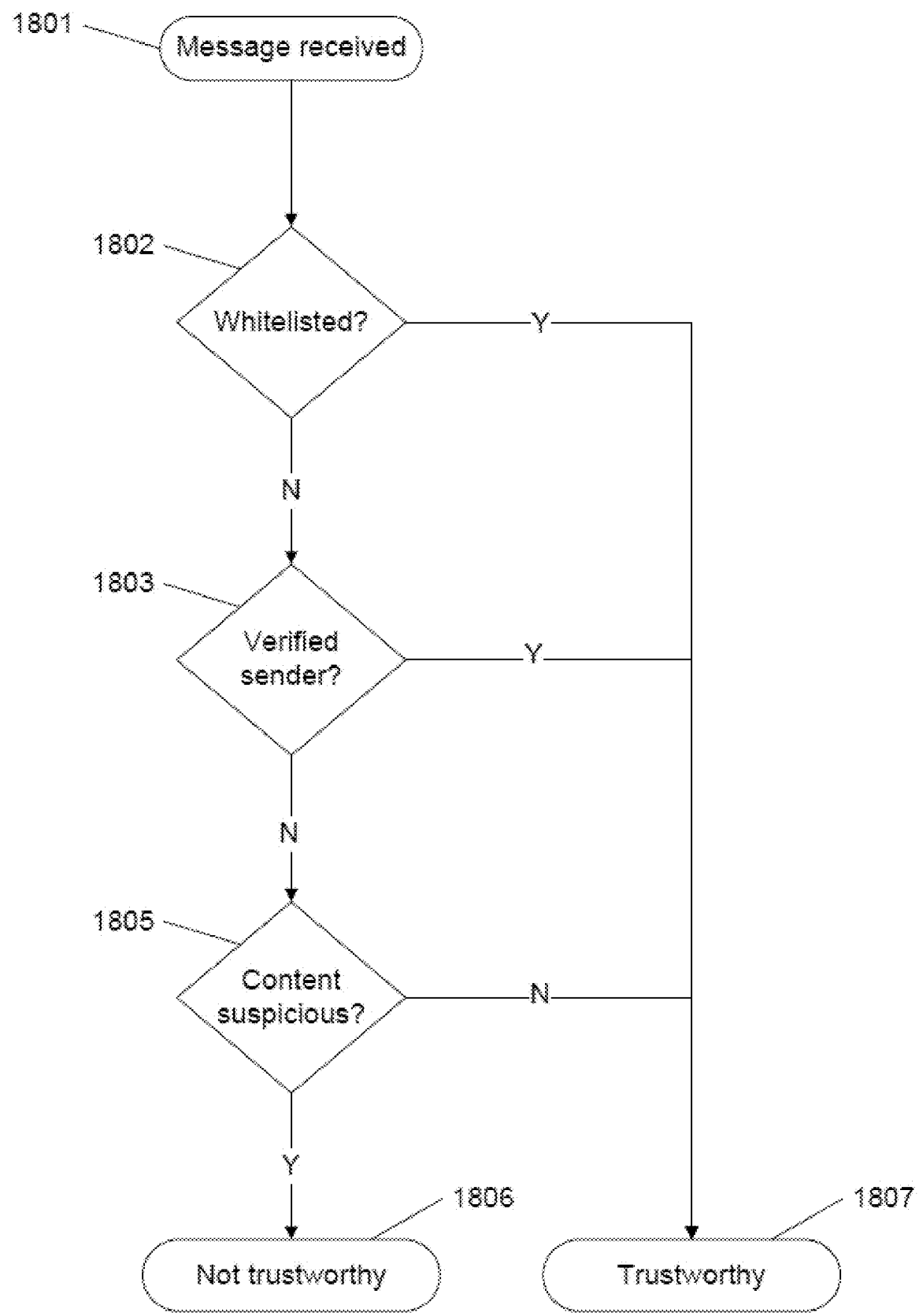
FIG. 18 is a flow diagram of a method for determining whether a message is trustworthy, according to some embodiments.

FIG. 18 is a flow diagram of a method for determining whether a message is trustworthy, according to some embodiments. In this example, a message is received (1801). One example of receiving a message is to receive it at a recipient 103, for example by a messaging application 401. Another example of receiving a message is to determine that a message's trustworthiness should be evaluated, for example because an action is being performed on the message. One example of performing an action on a message is displaying the message. Another example of performing an action on a message is traversing a link associated with the message. The message may be checked to determine whether it is whitelisted (1802). In one example of checking to determine whether a message is whitelisted, a sender associated with a message may be checked against a list of senders who are whitelisted. In another example, another recipient associated with a message may be checked against a list of correspondents who are whitelisted. In yet another example, a message received through a mailing list may be checked against a list of whitelisted mailing lists, for example by checking the header for data characteristic of a mailing list. In yet another example, a certificate associated with a message to be checked to determine whether it authorizes delivery. One example of a certificate that authorizes delivery is a certificate cryptographically signed by a certificate authority, such as the message recipient, a delegate of the message recipient, or an external certificate authority.

If it is determined that the message is whitelisted (1802), then the message is considered trustworthy in this example (1807). If it is determined that the message is not whitelisted (1802), then the message is optionally checked in this example to determine whether the sender is verified (1803). Examples of sender verification include presence of a digital signature demonstrating an identity matching the stated identity of the sender, proof that the sender is a preferred sender by reason of membership in an organization that is trusted to certify trustworthy senders, message transmission via a secure protocol that authenticates the sender, a digital signature proving that a message originated with the domain that is shown as its originator (such as Domain Keys), and validation by a technique such as SPF, Sender-ID or Caller ID for Email, which ensures that transmitting servers are authorized to handle messages from the address for which they are distributing a message. In some embodiments, sender verification may include cryptographic verification of a signature and/or retrieval of domain-related information, for example via a DNS query.

If it is determined that the message is sent by a verified sender (1803), then it is considered trustworthy in this example (1807). In some embodiments, a verified sender may be further checked to determine whether it was sent by a preferred sender, and a message from a preferred sender may be considered trustworthy. An example of a preferred sender is a member of a bonded sender program or industry association. If it is not determined that the message is sent by a verified sender (1803), then its content is optionally analyzed in this example to determine whether it is suspicious (1805). For example, a content classifier such as a Bayesian classifier may determine that a message's contents are unlikely to be spurious or unwanted, and/or an element in a message header may provide evidence that a message is not suspicious, for example evidence that the message is a reply to a message previously sent by the message recipient, such as a valid message ID in the "In-Reply-To:" field of an email. An example of a valid message ID is a well-formed message ID consistent with message IDs assigned to the user's outgoing messages; another example of a valid message ID is a message ID matching an actual message sent by the user. In some embodiments, additional requirements may be placed on valid message IDs. For example, a message ID may be required to match a message ID from an actual message previously sent by the user within a certain period of time, for example two weeks.

In some embodiments, previously generated information about the content of the message may be retrieved. An example of associating information about the content of a message with the message is discussed in conjunction with FIG. 17.

If the content is determined not to be suspicious (1805), then the message is considered trustworthy in this example (1807). If the content is determined to be suspicious (1805), then the message is considered untrustworthy in this example (1806).

In other embodiments, trustworthiness may be evaluated in terms of the presence or absence of one or more factors such as those enumerated above, the number of factors present, or scoreboarding in which a combination of points assigned to each factor can be computed. For example, whitelist checking (1802) may be combined with sender verification (1803) so that only a message that is both verified and whitelisted is considered trustworthy without regard to content analysis. In some embodiments, steps of this analysis may be performed earlier, with results retained. In one example, content analysis may be performed by a spam filter, and a result of the spam filter analysis may be associated with a message. In another example, it may be determined whether the sender of a message is whitelisted, or verified, and this information may be associated with the message. An associated result may later be retrieved and used to assist in determining the trustworthiness of a message.

Figure 19:
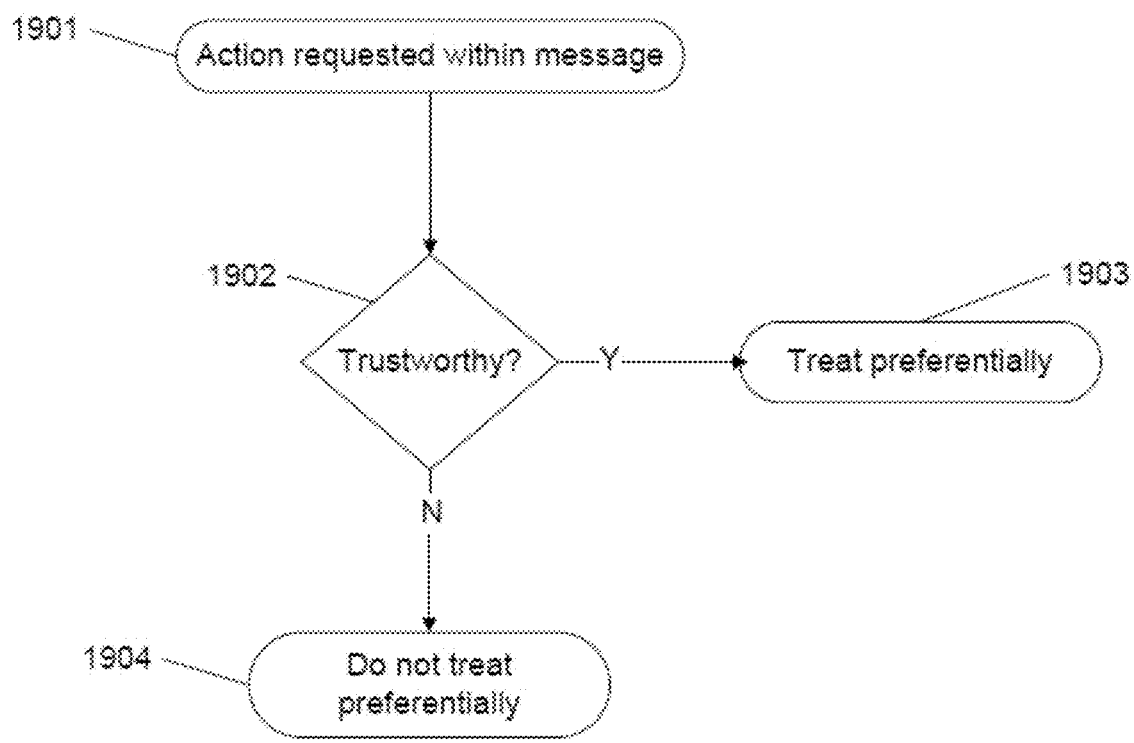
FIG. 19 is a flow diagram of a method for preferential treatment of content in a trustworthy message, according to some embodiments.

FIG. 19 is a flow diagram of a method for preferential treatment of content in a trustworthy message, according to some embodiments. In this example, an action is requested on a message (1901). Examples of an action performed on a message include displaying a message, attempting to traverse a link in a message, and attempting to submit a form contained in a message. It may be determined whether the message is trustworthy (1902). Trustworthiness may, for example, be determined as discussed in conjunction with FIG. 18. In some embodiments, trustworthiness of a message may previously have been determined, and a trustworthiness determination associated with the message may be retrieved. In some embodiments, trustworthiness of one message may increase the evaluated trustworthiness of a related message. For example, a related message may be from the same sender, from the same domain, or from the same top level domain, such as ".mil," ".com," ".gov," ".edu," ".tv," ".za," ".ch," etc. In some embodiments, lack of trustworthiness of one message may diminish the evaluated trustworthiness of a related message.

If the message is determined to be trustworthy (1902), then the action is performed preferentially in this example (1903). Preferential treatment for a trustworthy message may be any treatment more lenient than a corresponding non-preferential treatment for an untrustworthy message. Examples of preferential treatment for an action on a trustworthy message include allowing a link traversal with a warning, allowing a link traversal without a warning, allowing traversal of a link associated with a suspicious URL, allowing a form submission, rendering HTML when a message is viewed, fetching and rendering referenced imagery from external servers and allowing a script (for example, a Javascript script or a VB script) to run when a message is viewed. If a message is not considered trustworthy (1902), then the action is not performed preferentially in this example (1904). Examples of not performing an action preferentially, corresponding to the preferential performances enumerated above, include not allowing a link traversal, warning when a link traversal is attempted, disallowing traversal of a link associated with a suspicious URL, disallowing a form submission, not rendering HTML when a message is viewed, not retrieving referenced embedded imagery from external servers, and not allowing a script to run when a message is viewed. In some embodiments, not rendering HTML when a message is viewed may include rendering plain text associated with the message. In some embodiments, not rendering HTML when a message is viewed may include rendering a modified version of the HTML, such as plain text corresponding to one or more parts of the HTML.

In some embodiments, when a non-binary trustworthiness metric is calculated, preferential treatment for various actions such as those enumerated above may be based on a single trustworthiness threshold, or on varying trustworthiness thresholds for different actions. For example, HTML email may be rendered for any sender whose return address or domain is verified, while form submissions may be permitted only from messages whose sender is both verified and on a whitelist.

Figure 20:
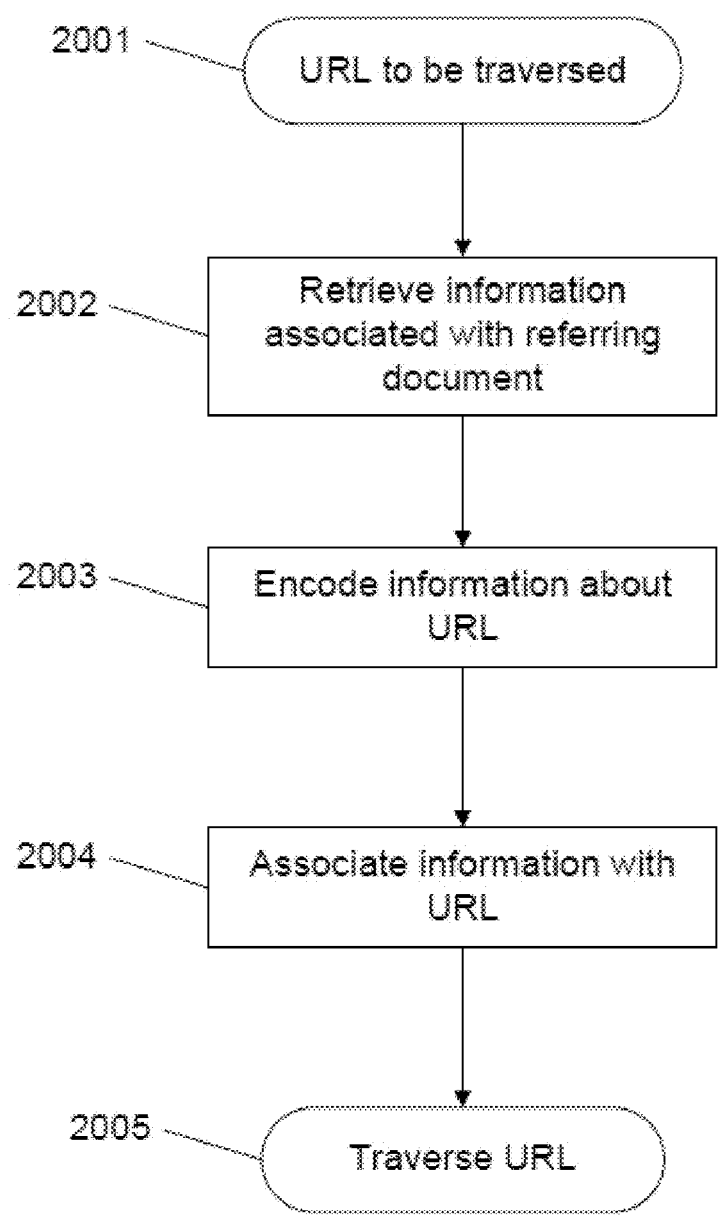
FIG. 20 is a flow diagram of a method for associating trustworthiness information with a URL, according to some embodiments.

FIG. 20 is a flow diagram of a method for associating trustworthiness information with a URL, according to some embodiments. The method of FIG. 20 may, for example, be used to inform a document reader such as a browser of an initial degree of trustworthiness associated with a document referred to by a URL. In this example, a URL is to be traversed (2001), for example because a user has clicked on a link associated with the URL. Information about a referring document may be retrieved (2002). A referring document refers in this context to a document containing the URL, or a link associated with the URL. Information about the referring document may include information about the trustworthiness of the referring document. Examples of information about trustworthiness of a document include a spam analysis indicating a likelihood that the document was spam; information about whether a sender of a message was whitelisted or verified, for example as discussed in conjunction with 1802 and 1803 respectively of FIG. 18; and information associated with the trustworthiness of a document, for example as discussed in conjunction with FIGS. 17 and 18.

Information associated with the URL and/or an associated link may be encoded (2003). An example of information associated with a URL is information about whether the URL was suspicious, for example as discussed in conjunction with FIG. 2. In some embodiments, information about the suspiciousness of a URL may include a suspicion level. In some embodiments, information about the suspiciousness of a URL may include a binary suspiciousness determination. In some embodiments, information about the suspiciousness of a URL may include information about one or more suspicious qualities, such as cloaking, redirection, obfuscation or misleading. Encoding the information may be any way of preparing the information for transmission, for example creating and populating a data structure with the information. Information about a referring document and/or information about the URL may be associated with the URL (2004). In some embodiments, associating information with a URL may include populating a data structure with the URL and associated information. In some embodiments, associating information with a URL may include populating a separate data structure with associated information. The URL may be traversed (2005), for example by providing the URL and associated information to a document reader such as a browser 403.

Figure 21:
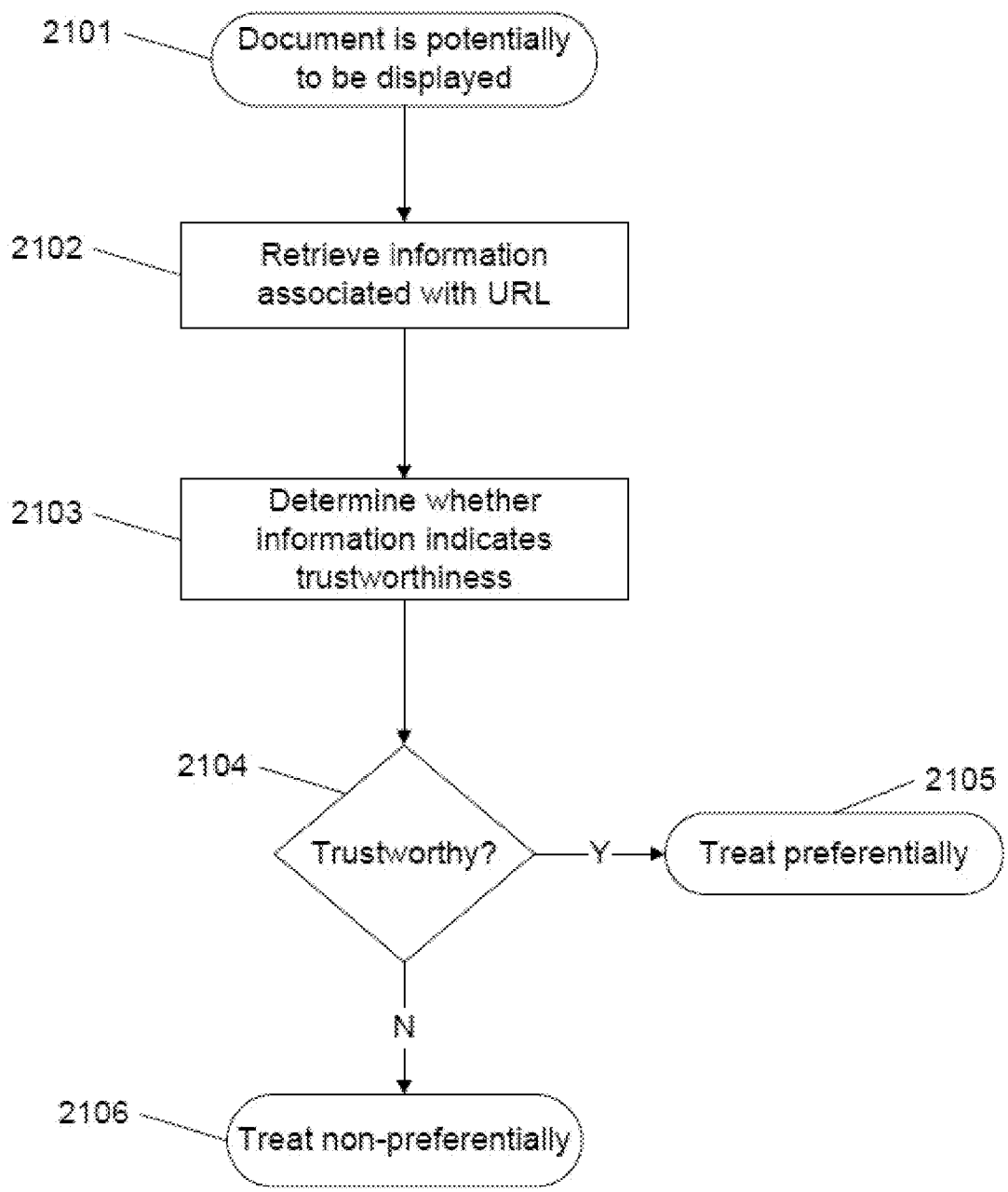
FIG. 21 is a flow diagram of a method for differential treatment of a document based on previously gathered information, according to some embodiments.

FIG. 21 is a flow diagram of a method for differential treatment of a document based on previously gathered information, according to some embodiments. The method of FIG. 21 may, for example, be employed by a document reader such as a browser 403. In this example, a document associated with a URL is potentially to be displayed (2101). Information associated with the URL may be retrieved (2102). In some embodiments, the information may have been generated and associated as discussed in conjunction with FIG. 20. It may be determined whether the information indicates trustworthiness (2103). An example of determining trustworthiness is to determine whether the information indicates that the URL was suspicious, and determine that the information indicates untrustworthiness if so. Another example of determining trustworthiness is to determine whether a referring document was possibly spam, and determine that the information indicates untrustworthiness if so. Another example of determining trustworthiness is to determine whether a referring document was a message from a trusted source such as a whitelisted sender, or a document from a trusted source such as a whitelisted domain, and determining that the information indicates trustworthiness if so.

If it is determined that the information indicates trustworthiness (2104), then the document is treated preferentially in this example (2105). One example of treating the document preferentially is to render the document. Another example of treating the document preferentially is to allow form data submission from the document. Another example of treating the document preferentially is to allow a script such as a Javascript to run in the document. If it is determined that the information does not indicate trustworthiness (2104), then the document is not treated preferentially in this example (2106). One example of not treating the document preferentially is to present a warning message in a user interface element. Another example of not treating the document preferentially is to not render the document, or to render the document in a manner other than specified in the document. Another example of not treating the document preferentially is to not permit form data submission from the document. Another example of not treating the document preferentially is to not allow a script such as a Javascript script to run in the document.

Figure 22:
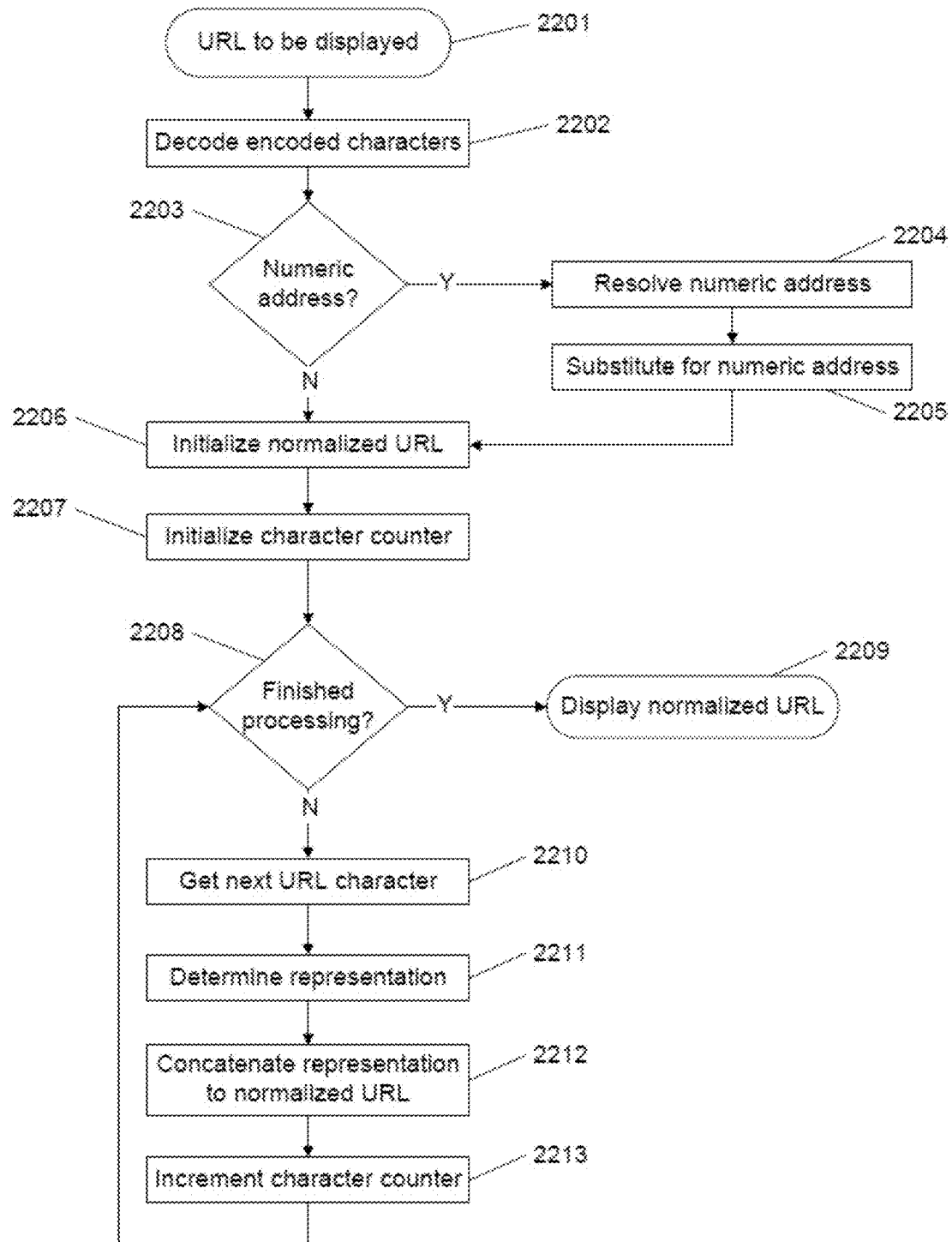
FIG. 22 is a flow diagram of a method for normalizing a URL, according to some embodiments.

FIG. 22 is a flow diagram of a method for normalizing a URL, according to some embodiments. Normalizing a URL refers herein to standardizing character encoding used in a URL. In this example, a URL is to be displayed (2201). Examples of situations in which a URL is to be displayed include presenting a URL in an address bar of a browser, or a UI element that may situationally display a URL, such as a status area or mouseover popup. One or more encoded characters may be decoded (2202). An encoded character may be any obfuscated character. An example of an encoded character is a Unicode character such as a UTF-8, UTF-16 or UTF-32 encoded character, for example encoded using an encoding of the form "%xx", wherein xx refers to a hexadecimal number. An example of decoding an encoded character is to convert the encoded character to its decoded equivalent, such as a single character corresponding to a numeric code such as a UTF-8 code, and storing the result in a character array. In some embodiments, such decoding may be performed on any character. In some embodiments, such decoding may be performed only on a subset of possible characters, for example printable non-whitespace characters. In this example, characters, letters and common symbols may be decoded, but not spaces, tabs, and other whitespace characters. In some embodiments, non-encoded characters such as whitespace characters may be encoded, for example by substituting a UTF-8 code for a non-encoded character.

It may optionally be determined whether the URL contains a numeric address (2203). If the URL contains a numeric address such as an IP address, then the address is resolved in this example (2204). An example of resolving an address is to perform a reverse DNS lookup. If address resolution is successful, then a resolved address such as a domain name is substituted for the numeric address in this example (2205). A character array for a normalized URL may be initialized (2206). A character counter may be initialized to point to the beginning of the URL (2207).

It may be determined whether another character in the URL remains to be processed (2208). If all characters in the URL have been processed, then the normalized URL is displayed in this example (2209). An example of displaying a normalized URL is to render it on the screen. Another example of displaying a normalized URL is to return it to a caller or module that may display it. If another character in the URL remains to be processed (2208), then the next character is examined in this example (2210).

A normalized representation for the next character may be determined (2211). As an example of determining a normalized representation for a character, a mapping such as an array may be kept in which ranges of character values are associated with a bit indicating whether a character in that range should be displayed as printed, or translated to another character (for example for displaying a space as an elevated dot), or displayed as numerically encoded. A character may be encoded to its numeric representation (e.g. Unicode or ASCII) and the range in which it falls may be checked to determine the method used for display. In some embodiments, only character code ranges which should be encoded (or unencoded) may be stored, and the normalized form for a character of a URL may be derived from the presence or absence of a range incorporating the character in a list of ranges. A normalized representation may be concatenated to the normalized URL (2212). The character counter may be incremented (2213) and it may be determined whether processing is complete (2208).

Figure 23:
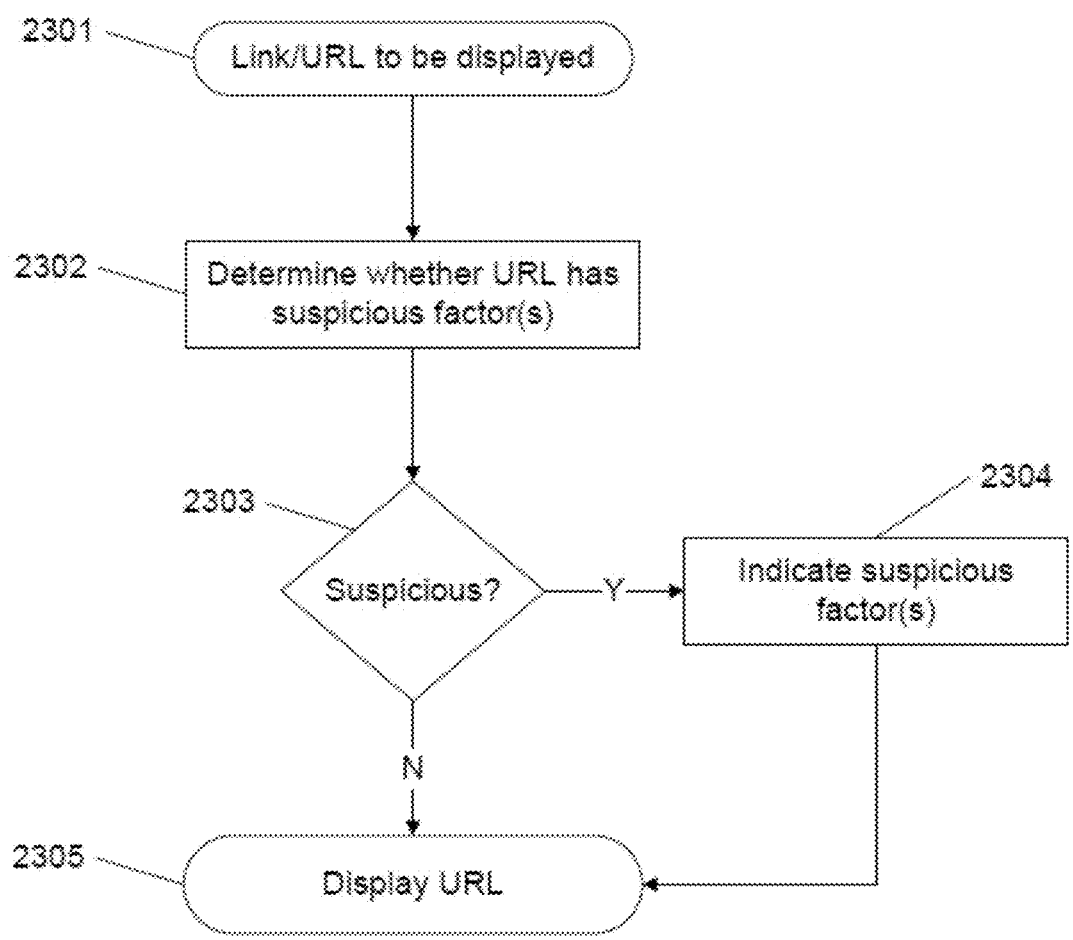
FIG. 23 is a flow diagram of a method for displaying one or more suspicious factors of a link and/or URL, according to some embodiments.

FIG. 23 is a flow diagram of a method for displaying one or more suspicious factors of a link and/or URL, according to some embodiments. In this example, a link and/or URL is to be displayed (2301). An example of a reason a link may be displayed is because a document is being rendered and the link is associated with the document. An example of a reason a URL may be displayed is because a user has performed an action causing a URL to be displayed, such as mousing over a link associated with the URL. It may be determined whether a URL, for example a URL to be displayed or a URL associated with a link to be displayed, has a suspicious factor (2302). An example of determining whether a URL has a suspicious factor is to evaluate whether the URL has factors such as cloaking, obfuscation, misleading, and/or cross-site linking. Such a determination may be made, for example, as discussed in conjunction with FIG. 2, wherein the suspicion level is an enumeration of suspicious attributes.

If it is determined that the URL has a suspicious factor (2303), then one or more suspicious factors are indicated in this example (2304). Indication of a suspicious factor may include any indication that a URL may be suspicious. In some embodiments, an indication may be audible, for example playing a warning noise. In some embodiments, an indication may be visual. One example of a visual indication is an icon corresponding to a suspicious factor. Examples of icons corresponding to suspicious factors are shown in FIG. 24B. In some embodiments, a single indication, such as an icon, may be provided indicating that a URL is suspicious. In some embodiments, a URL with multiple suspicious factors may have multiple indications, such as icons, of various suspicious factors. In some embodiments, a document element linked to a suspicious URL (for example, via an HREF as illustrated in FIG. 24A) may be deactivated and accompanied by a version of the URL that includes an indication of a suspicious factor. In some embodiments, a document element linked to a suspicious URL may be modified to include an indication of a suspicious factor, and optionally an indication of the actual destination of the URL, for example as illustrated in FIG. 24B. In some embodiments, an indication of a suspicious factor may include animation, such as animation of an icon. In some embodiments, an indication of a suspicious factor may be hidden (or exposed) through user action, such as moving a pointing device such as a mouse over a URL.

In some embodiments, indication of a suspicious factor may be combined with URL normalization, for example as described in conjunction with FIG. 22. Examples of combining an indication of a suspicious factor with normalization include normalizing portions of a URL with suspicious factors indicated, and displaying a URL in normalized format when an indication of a suspicious factor is hidden.

FIG. 24A is an example of HTML code containing four suspicious URLs, as could be used by the method of FIG. 23. In this example, one URL is a cloaked anonymous URL 2401, one is a cloaked URL with a password 2402, one is a suspicious redirect 2403, and one is a misleadingly named link 2404. All of these document elements 2401, 2402, 2403, 2404 have an actual destination of "phisher.com."

FIG. 24B is an example of a rendering of the HTML contained in FIG. 24A, illustrating an embodiment of the method of FIG. 23. In this example, the link associated with the cloaked anonymous URL 2409 is rendered with a user icon and an indication of the actual destination of the cloaked URL, "phisher.com." The link associated with the cloaked URL with a password 2410 is rendered with a user icon with a superimposed key and an indication of the destination of the cloaked URL. The link associated with the suspicious redirect 2411 is rendered with an arrow, showing the destination of the redirect. The misleading link is rendered with a pair of sunglasses, showing the actual destination of the link. The illustrated indications of suspicious factors in URLs 2409, 2410, 2411, 2412 show elements linked to a suspicious URL being replaced by a representation including an indication of suspicious factors in a rendering of a containing document.

Figure 25:
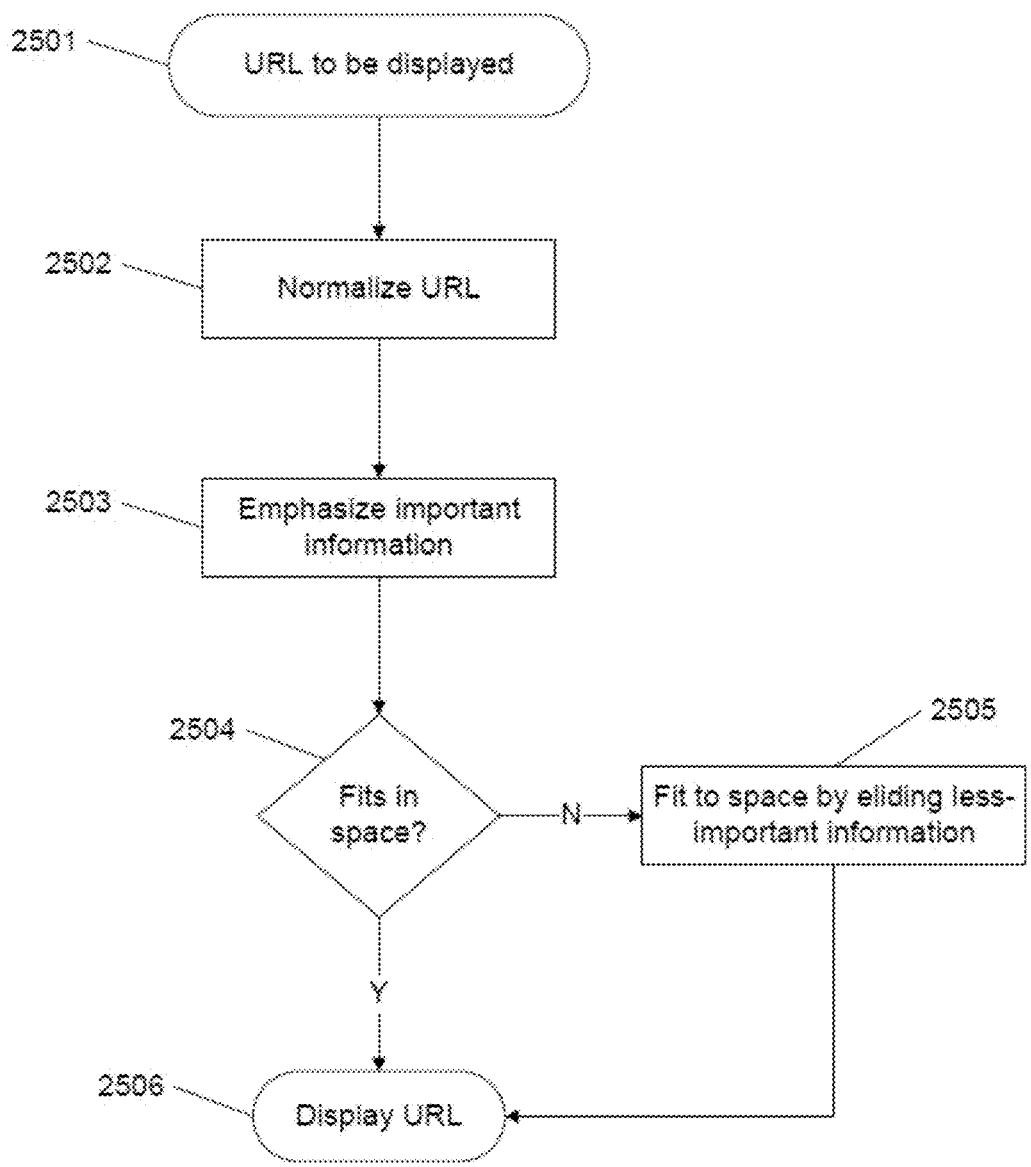
FIG. 25 is a flow diagram of a method for distinctive display of a URL, according to some embodiments.

FIG. 25 is a flow diagram of a method for distinctive display of a URL, according to some embodiments. In this example, a URL is to be displayed (2501). Examples of situations in which a URL is to be displayed include presenting a URL in an address bar of a browser, and a mouseover popup, status bar or other UI element designed to display a URL, either invariably or situationally. The URL may optionally be normalized (2502), for example as described in conjunction with FIG. 22.

Important information in the URL may optionally be emphasized (2503). Important information in the URL refers in this context to information that may contain important information about the actual destination of a URL. Potential examples of important information in a URL include a destination domain, subdomain(s) and/or path of a cloaked URL, a possible target of a suspicious redirect, special characters such as "@" and/or "?", a filename, argument(s), and some select characters of a URL. Examples of some select characters of a URL include the last n characters (for example, 20) of a URL, one or more blocks of readable characters from a URL, and some pseudo-randomly selected characters from a URL. In some embodiments, determining important information may include parsing a URL to determine important constituent components. Important information in a URL may be emphasized in any way that is visually discernable. Examples of emphasis include modifying the font style (for example, using a bold font) and modifying the font color (for example, using blue). In some embodiments, different types of elements may be emphasized differently. For example, a domain name may be colored blue, while an argument may be colored red.

It may be determined whether the URL fits in a provided display space (2504). An example of a provided display space is a status bar or a URL bar. One example of determining whether a URL fits in a display space is to determine whether the length of the URL, in characters, exceeds a threshold number of characters associated with the display space. Another example of determining whether a URL fits in a display space is to determine a number of pixels required to render the URL, for example by rendering the URL into a buffer or by counting the widths of individual characters and optionally subtracting kerning factors, and comparing the required number of pixels with a number of pixels associated with the display space.

If it is determined that the URL display does not fit into the provided display space (2504), then the URL is modified in this example to fit into the provided display space (2505). A URL may be modified by eliding less-important information. An example of eliding information is to replace information with an indication that information is not being displayed, for example an ellipsis such as " . . . " In some embodiments, less-important information may be determined by determining less-important structural elements of a URL. Potential examples of less-important structural elements in a URL include a username and/or password in a cloaked URL, a complete textual elaboration of a scheme specifier such as http:// or ftp://, arguments other than possible redirect targets, and elements not previously determined to be important. In some embodiments, determining less-important information may include parsing a URL to determine less-important constituent components. In some embodiments, one part of an element may be determined to be less important than another part of the element. For example, leading and/or trailing characters of an element may be considered to be more important than central characters, or the first characters of an element may be considered to be more important than the last characters. In some embodiments, information in a URL may be rated according to importance, and may be elided based on its rating. For example, the least important remaining information may be successively removed until the URL fits in a provided display area.

In some embodiments, when information associated with a URL has been elided, a UI element may be provided through which an entire URL may be viewed. For example, a "URL" element of a context-sensitive menu (for example, accessed via a right mouse click) may provide submenus for a cloaked URL displaying "Username and password," "Destination" and "Arguments" submenus referring to the username:password component, central URL component and arguments components respectively; and may provide submenus from a redirect displaying "Redirect Link," "Destination," and "Arguments" submenus referring to the location of the redirect, the destination thereof and arguments components respectively. In some embodiments, an arguments component may further have submenus showing <name,value> pairs for one or more arguments included in the URL.

In some embodiments, emphasizing important information (2503) and eliding less-important information (2505) may be combined. For example, a URL may be parsed to determine its constituent components. A destination site name may be displayed, optionally emphasized such as with a bold blue font, in a manner that ensures important information will be legible, for example by always displaying up to the last n characters of the site name (for example, 20) and inserting an ellipsis such as " . . . " in the event there are more than n characters; displaying a first part of a possible redirect argument, optionally emphasized using a color such as red, with an ellipsis following it if space does not permit the display of the entire redirect component; and displaying username:password and argument information only as space permits (for example, by displaying a first part of the username:password information before the central URL component, with an ellipsis following it if space does not permit the display of the entire username:password component; and by displaying a last part of the arguments following the central URL component, with an ellipsis preceding it if space does not permit the display of the entire argument component). In this example, a redirect argument may, for example, be detected as described in conjunction with FIG. 9.

If it is determined that the URL fits in a provided display space (2504), or if the URL has been modified to fit in a provided display space (2505), then the URL, optionally including emphasized more-important information and/or elided less-important information, is displayed in this example (2506). One example of displaying the URL is to render it on a display device such as a screen. Another example of displaying the URL is to provide it to a caller or module that may display it.

In some embodiments, distinctive URL display may be combined with an indication of a suspicious factor as described in conjunction with FIG. 23, for example by displaying an icon indicative of a suspicious factor of a URL.

Figures 26A, 26B:
FIG. 26A is an example of HTML code containing an obfuscated cloaked URL, as could be displayed by the method of FIG. 25.
FIG. 26B is an example of a rendering of the HTML contained in FIG. 26A, illustrating an embodiment of the method of FIG. 25.

FIG. 26A is an example of HTML code containing an obfuscated cloaked URL, as could be displayed by the method of FIG. 25. In this example, the HTML code contains an obfuscated cloaked URL 2601. This URL contains many space characters after the username "security.e-bay.com" and before "@phisher.com."

FIG. 26B is an example of a rendering of the HTML contained in FIG. 26A, illustrating an embodiment of the method of FIG. 25. In this example, a cursor 2606 is over a link 2605 corresponding to the obfuscated cloaked URL 2601. The URL display area 2607 displays a URL. In this example, spaces have been converted to elevated dots via normalization as described in conjunction with 2502 of FIG. 25, less important elements of the URL (in this case, padding) have been reduced to the ellipsis " . . . " as described in conjunction with 2505 of FIG. 25, and the destination of the URL "phisher.com" has been emphasized with bold font in blue as described in conjunction with 2503 of FIG. 25.

Figure 27:
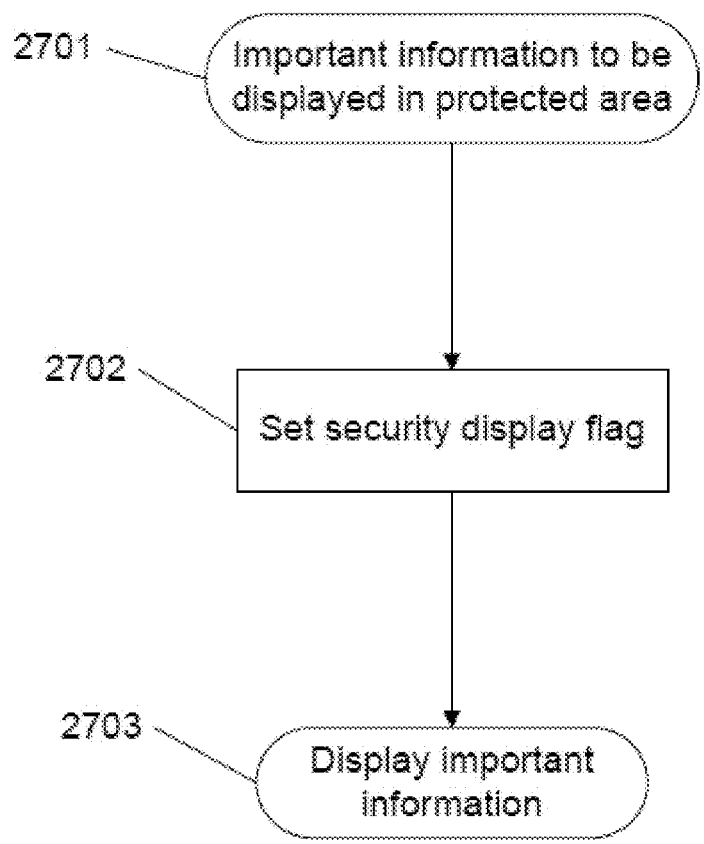
FIG. 27 is a flow diagram of a method for protecting important information in a display area, according to some embodiments.

FIG. 27 is a flow diagram of a method for protecting important information in a display area, according to some embodiments. An example of important information is a URL, for example an unprocessed URL, a normalized URL as discussed in conjunction with FIG. 22, a URL with an indication of one or more suspicious factors as discussed in conjunction with FIG. 23, or a URL with important information emphasized and/or unimportant information elided, as discussed in conjunction with FIG. 25. In some embodiments, any URL may be considered important, or may be considered important in a situation such as a display due to a mouseover. In some embodiments, a URL may be considered important information only if it is suspicious (for example as discussed in conjunction with FIG. 2). In some embodiments, only certain types of URL information may be considered important. Examples of types of URL information that may be considered important include the destination URL of a link to a cloaked, obfuscated and/or redirected location, and the URL of a cross-site link.

In this example, important information is to be displayed in a display area (2701). An example of a display area is a status area of an information rendering application such as a web browser. Another example of a display area is a floating textbox displayed as the result of mousing over a link. An example of an action that could cause important information to be displayed in a display area is a mouse cursor being positioned over a link. Another example of an action that could cause important information to be displayed in a display area is moving a cursor over an image map. In such an example, the actual destination of the map, if clicked at the current position, may be displayed as important information, and the display of other information, such as an underlying URL attached to the image map through an <A HREF=" . . . "> tag, may be suppressed.

A security display flag associated with the protected display area may be set (2702). An example of setting a security display flag is to set it to the value 1. Another example of setting a security display flag is to create a flag and associate it with the protected display area. In some embodiments, a scripting language such as Javascript may be precluded from changing the value of such a security display flag. The important information may be displayed (2703). In some embodiments, the important information may be processed before displaying. Examples of processing the information include normalizing a URL as discussed in conjunction with FIG. 22, indicating one or more suspicious factors associated with a URL as discussed in conjunction with FIG. 23, and emphasizing relatively important information and/or eliding relatively unimportant information, as discussed in conjunction with FIG. 25.

Figure 28:
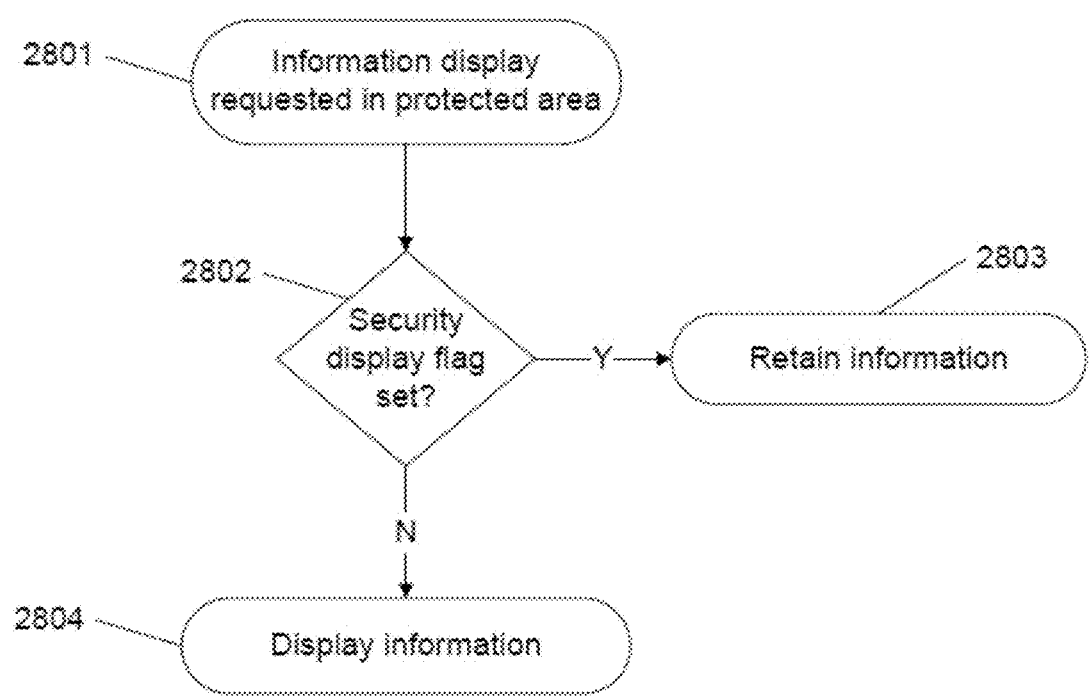
FIG. 28 is a flow diagram for processing a request to display information in a protected display area, according to some embodiments.
Figures 30A, 30B:
FIG. 30A is an example of HTML code as could be used by the methods of FIGS. 27, 28 and 29.
FIG. 30B is an example of a rendering of the HTML contained in FIG. 30A, illustrating an embodiment of the method of FIGS. 27 and 28.

FIG. 28 is a flow diagram for processing a request to display information in a protected display area, according to some embodiments. In this example, a request is received to display information in a display area that may be protected (2801). An example of a request to display information is an attempt by a script such as a Javascript to display text in the "window.status" area. An example of a Javascript script attempting to display text in the "window.status" area is shown in FIG. 30A. It may be determined whether a security display flag associated with the protected display area is set (2802). An example of determining whether a security display flag is set is to determine whether the flag has the value 1. Another example of determining whether a security display flag associated with the display area is set is to determine whether there is a security display flag associated with the display area.

If it is determined that a security display flag associated with the display area is set (2802), then the information for which a display request was received is optionally retained in this example (2803). An example of retaining information is to store it in a memory associated with the display area. If it is determined that no security display flag associated with the display area is set (2802), then the information is displayed in this example (2804).

Figure 29:
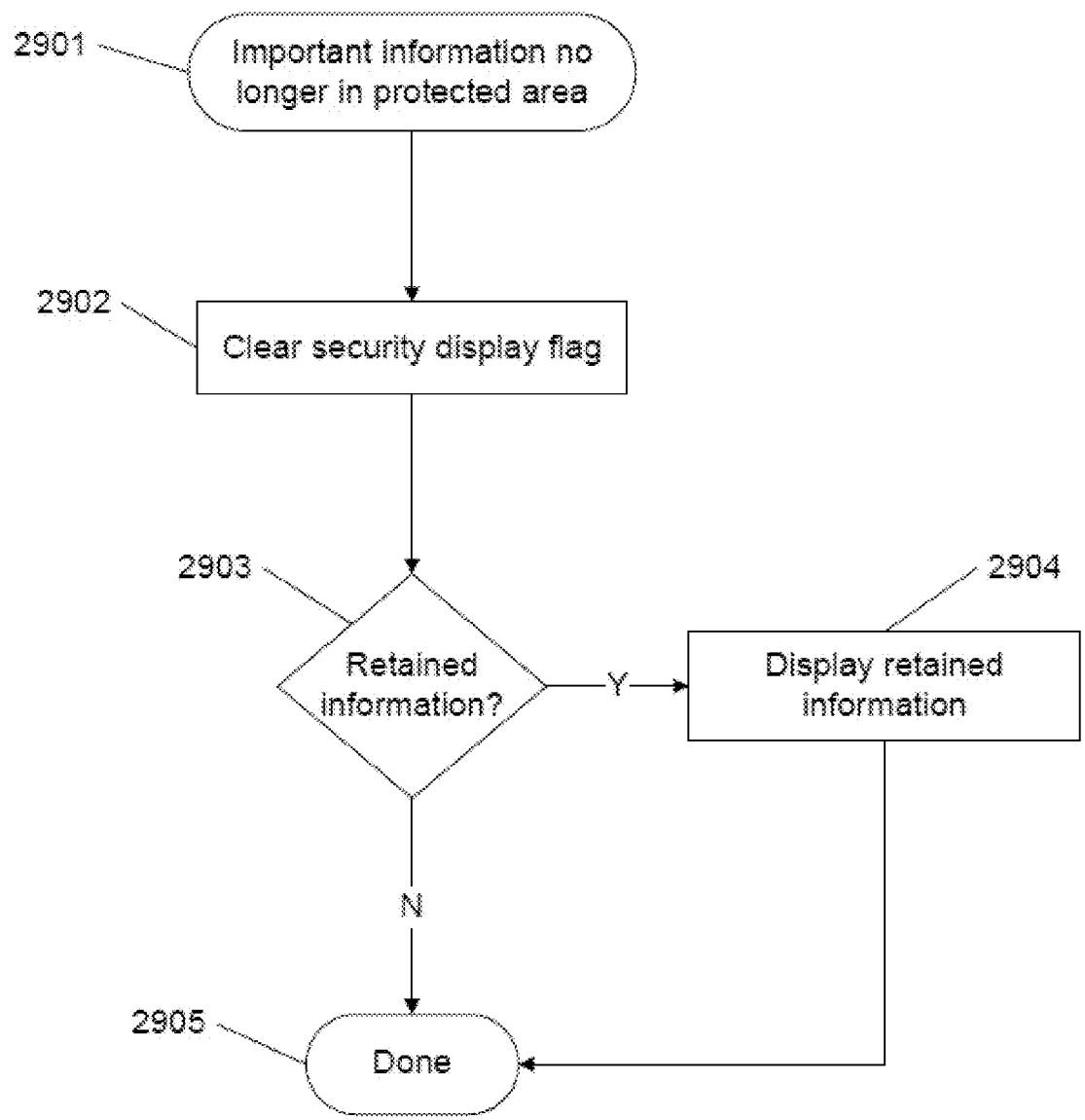
FIG. 29 is a flow diagram of a method for un-protecting a display area, according to some embodiments.

FIG. 29 is a flow diagram of a method for un-protecting a display area, according to some embodiments. In this example, important information is no longer to be displayed in a protected display area (2901). Important information may, for example, have previously been displayed in the display area as discussed in conjunction with FIG. 27. An example of a reason that important information may no longer be displayed in a display area is a mouse cursor positioned over a link being moved off the link.

A security display flag associated with the display area may be cleared (2902). One example of clearing a security display flag is to set it to the value 0. Another example of clearing a security display flag is to disassociate it from the display area. It may be determined whether there is retained information associated with the display area (2903). An example of retained information is information that was retained as discussed in conjunction with 2803 of FIG. 28. If it is determined that there is retained information associated with the display area (2903), then the retained information is displayed in this example (2904).

FIG. 30A is an example of HTML code as could be used by the methods of FIGS. 27, 28 and 29. In this example, the HTML code contains a cloaked URL 3001. A Javascript script 3002, that will be invoked when a mouse cursor is positioned over the link, contains a directive to overwrite a display area associated with "window.status" with the string "Click here to enter security information" 3003.

FIG. 30B is an example of a rendering of the HTML contained in FIG. 30A, illustrating an embodiment of the method of FIGS. 27 and 28. In this example, a cursor 3008 is positioned over a link 3007 corresponding to the cloaked URL 3001. A status area 3009 displays a URL. In this example, the URL is displayed, despite the Javascript script 3002 that has directed the browser to display the string "Click here to enter security information" 3003. As discussed in conjunction with 2701 of FIG. 27, the URL may be displayed because a cursor was positioned over an associated link 3007, and/or because the URL 3001 is cloaked. In this example, an information display request from the Javascript may have occurred and been suppressed and optionally retained, as discussed in conjunction with FIG. 28.

Figure 31:
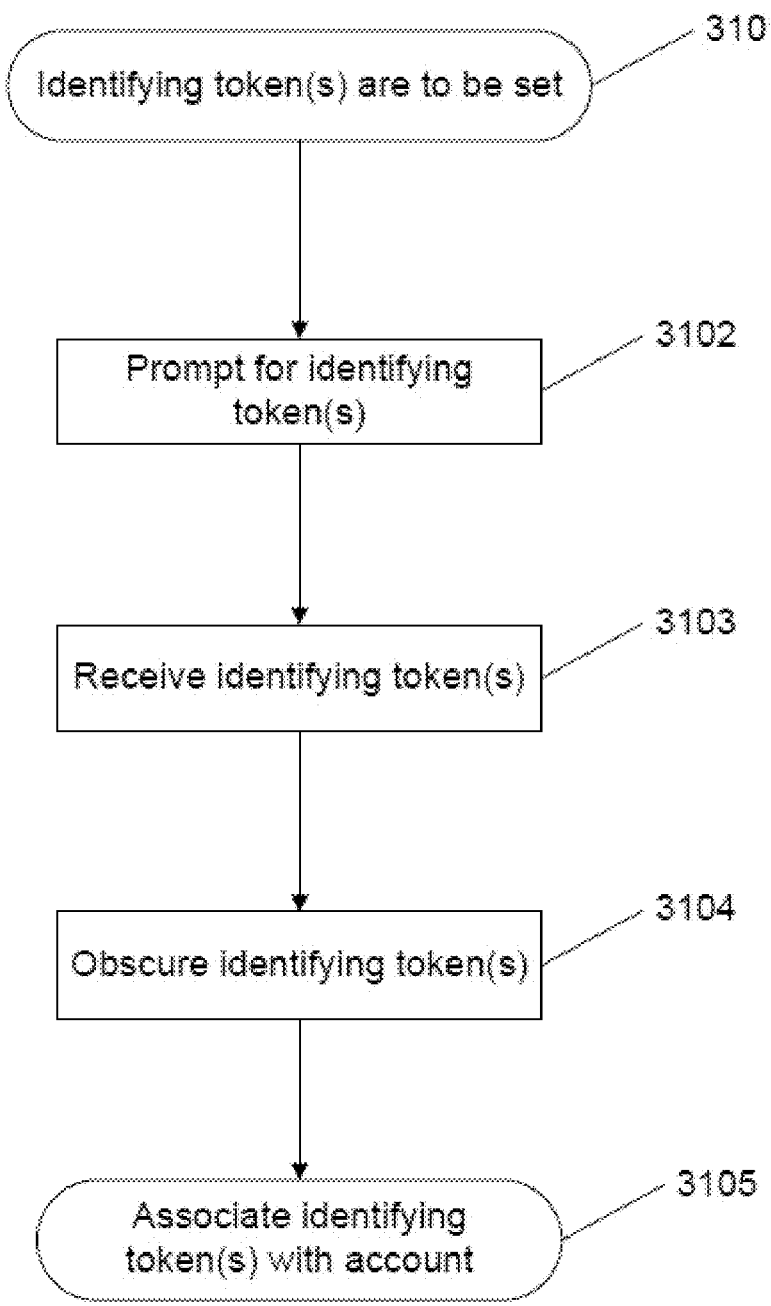
FIG. 31 is a flow diagram of a method for receiving one or more identifying tokens, according to some embodiments.

FIG. 31 is a flow diagram of a method for receiving one or more identifying tokens, according to some embodiments. An identifying token refers herein to any identifiable token that may be used to promote trust in a message. In various embodiments, an identifying token may be human-recognizable and/or machine-recognizable. Examples of a human-recognizable identifying token include a textual string, an image, and a sound. Examples of a machine-recognizable identifying token include a number, a string, and cryptographic information such as a key that may be used in a hash or cryptographic signature. In this example, one or more identifying tokens for a message originator are to be set (3101). An example of a circumstance under which an identifying token may be set is when a new account is being established, for example an account with a message originator such as a financial institution or e-commerce vendor. Another example of a circumstance under which an identifying token may be set is when account preferences are updated. In some embodiments, an identifying token may be specific to a correspondent. In some embodiments, an identifying token may be used by a token association service, which may associate tokens for one or more message originators. In some embodiments, a token association service may maintain a single identifying token for a message recipient, the number of message originators notwithstanding. In some embodiments, a token association service may maintain separate identifying tokens for two or more message originators associated with a recipient.

In some embodiments, a single identifying token may be specific to a message recipient. In some embodiments, two identifying tokens may be specific to a message recipient, wherein one identifying token, referred to herein as a primary identifying token, may be obscured in messages, and one identifying token, referred to herein as a secondary identifying token, may not be obscured in messages.

A prompt may optionally be provided for one or more identifying tokens (3102). An example of a prompt for an identifying token is a user interface such as a dialog box. In some embodiments, a prompt may include a selection of one or more identifying tokens from which a choice may be made. Examples of identifying tokens that may be offered include a collection of images, account number, account name, full name, randomly generated information such as a random word or phrase, and template-driven information such as prompting for a place of birth, mother's maiden name, high school, or other personal information. In some embodiments, a prompt may include a way for an identifying token to be user-supplied, for example by providing an input area in which an identifying token may be input, or the capability to browse a storage device for an image and upload the image. In some embodiments, a single identifying token may be prompted for. In some embodiments, a primary and secondary identifying token may be prompted for. In some embodiments, a prompt may include an instruction indicating that subsequent message(s) from the message originator, such as emails and/or telephone calls, will include the identifying token, and that messages not including the identifying token may be regarded as illegitimate.

One or more identifying tokens may be received (3103). An example of receiving an identifying token is to receive a selection from among a predetermined set of identifying tokens. Another example of receiving an identifying token is to receive a user-specified identifying token. In some embodiments, a single identifying token may be received. In some embodiments, a primary and secondary identifying token may be received. In some embodiments, a primary identifying token be obscured before it is received, for example as described in conjunction with FIG. 32.

One or more identifying tokens, such as a primary identifying token, may optionally be obscured (3104). An example of obscuring an identifying token is to provide an identifying token to a token obscuring component, for example a component using an obscuring method as described in conjunction with FIG. 32. In some embodiments, a token obscuring component may be on a remote computing device such as a client device. In such embodiments, a remote token obscuring component may be communicated with using mechanisms such as a remote procedure call or a Javascript script and/or ActiveX component provided in a document such as a web page.

The token(s) may be associated with an account (3105), for example by storing the token(s), or a reference to one or more token identifiers, associated with account preference information.

Figure 32:
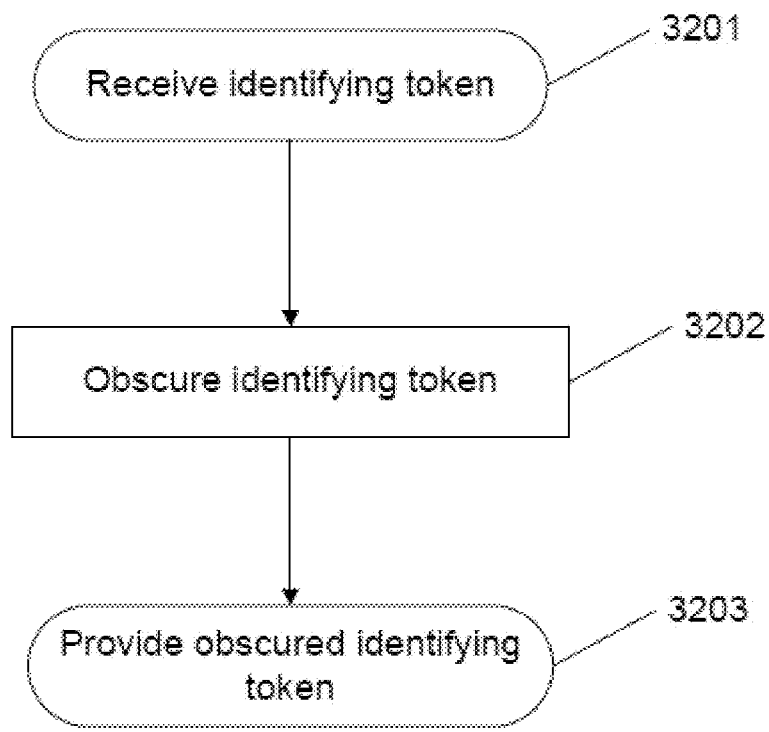
FIG. 32 is a flow diagram of a method for obscuring an identifying token, according to some embodiments.

FIG. 32 is a flow diagram of a method for obscuring an identifying token, according to some embodiments. In this example, an identifying token is received (3201). An example of receiving an identifying token is for a user to select an identifying token, for example as described in conjunction with 3102 of FIG. 34. Another example of receiving an identifying token is to receive it from a remote component, for example as described in conjunction with 3104 of FIG. 31. In some embodiments, the identifying token may be a primary identifying token. In some embodiments, information relating to an expected message sender, such as a sender messaging address or originating domain, may be associated with the identifying token.

The identifying token may be obscured (3202). In some embodiments, obscuring the token may be performed using information kept secret and/or information associated with an aspect of an expected sender of a message with which the identifying token may be associated. An aspect of an associated sender, such as a sender address or an originating domain, may be received and associated with the identifying token. An example of obscuring a token using a combination of secret information and sender information is to encrypt the token using a key that includes both a secret and the address or domain name of the expected sender. Such encryption may be performed using any encryption known to those skilled in the art, for example a symmetric encryption such as DES, AES or Blowfish.

The obscured identifying token may be provided (3203). An example of providing the obscured identifying token is to pass it back to a caller, such as a token selector. Another example of providing the obscured identifying token is to transmit it to a remote caller, for example a remote caller as described in conjunction with 3104 of FIG. 31.

Figure 33:
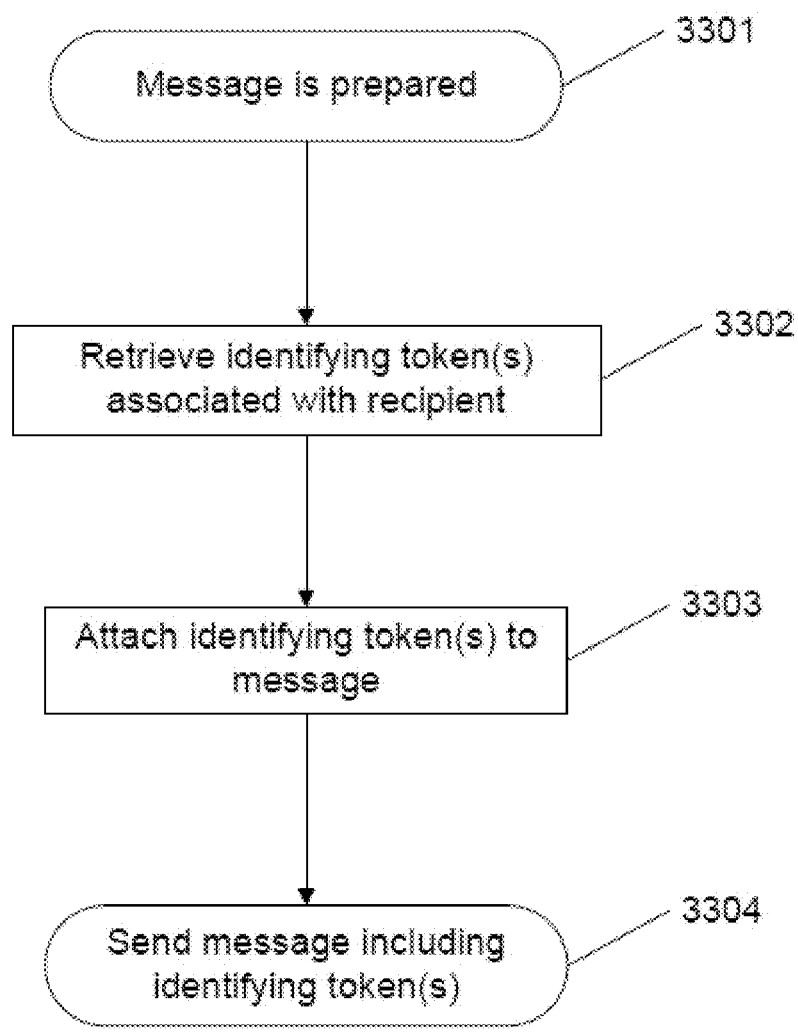
FIG. 33 is a flow diagram of a method for sending a message with one or more associated identifying tokens, according to some embodiments.

FIG. 33 is a flow diagram of a method for sending a message with one or more associated identifying tokens, according to some embodiments. In this example, a message may be prepared (3301). Examples of a message include an email, an instant message, a postal mailing, and a telephone call script. In various embodiments, a message may be prepared specifically for a user, for example an invoice, or may be a mass-mailing that will be sent to multiple customers. In some embodiments, preparing a message may include receiving the message from a message originator, for example by a token association service. In such embodiments, a message originator or an affiliate of a message originator, such as a bulk emailing service, may prepare a message and transmit it to a token association service. The token association service may determine that the message is authorized by the message originator to go to the recipient, for example by verifying a cryptographic signature on the message, or by authenticating a communications session and receiving one or more messages to one or more recipients during the authenticated communications session. Ways to authenticate a communications session are well known to those skilled in the art.

One or more identifying tokens associated with an intended recipient may be retrieved (3302). An identifying token may, for example, have been associated with the recipient as described in conjunction with FIG. 31. In some embodiments, a single identifying token may be retrieved. In some embodiments, a primary and secondary identifying token may be retrieved. The identifying token(s) may be associated with the message (3303). One example of associating an identifying token with a message is to incorporate the identifying token into the message, for example including a textual token at the beginning or end of a message, or including an image in a message, for example using MIME encoding. Another example of associating an identifying token with a message is to incorporate a reference to an identifying token, for example as described in conjunction with FIG. 35. The message may be sent (3304). In some embodiments, a message may be sent in batch mode, for example after multiple messages have been generated and associated with identifying tokens associated with their respective recipients.

Figure 34:
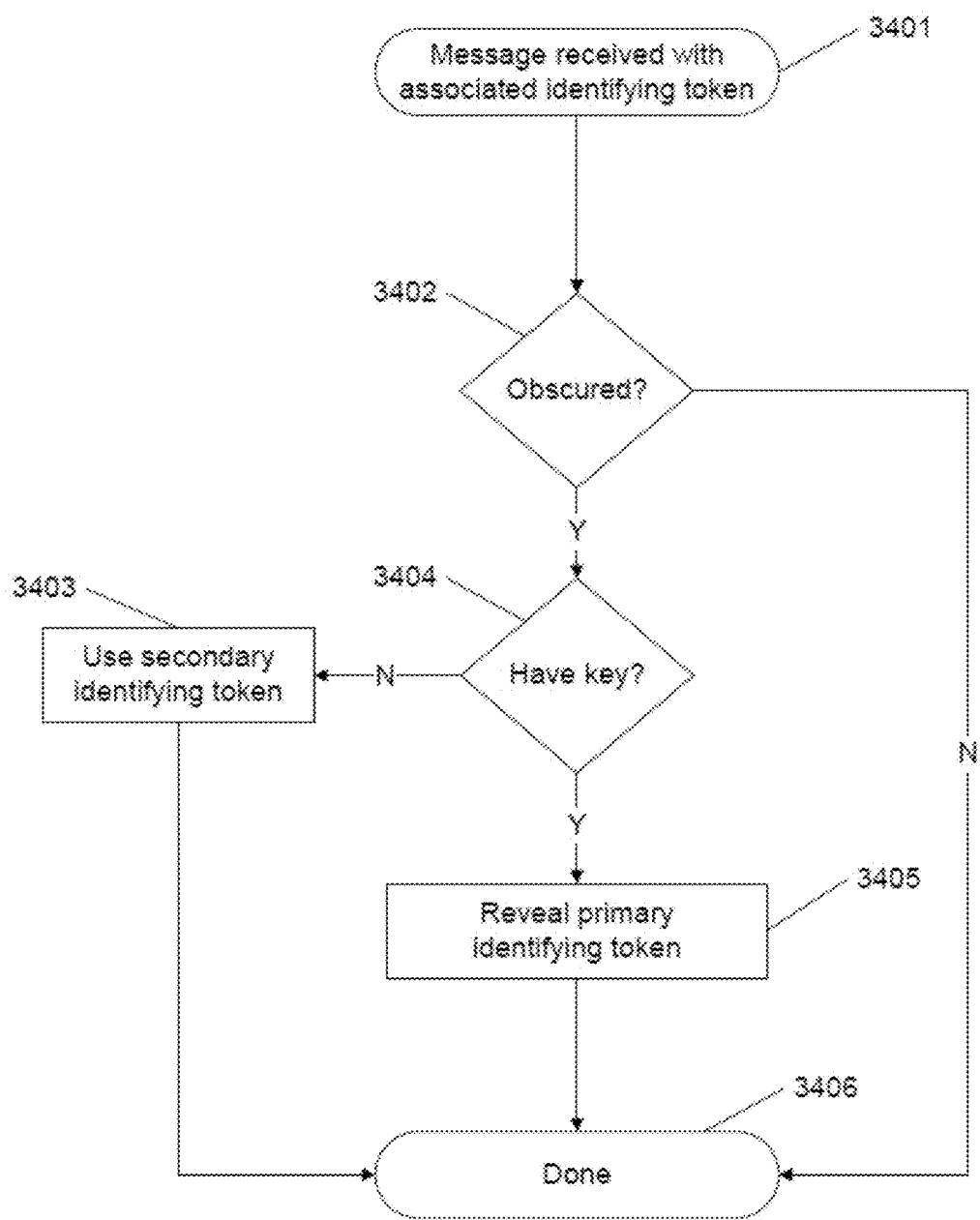
FIG. 34 is a flow diagram of a method for processing a primary and optional secondary identifying token, according to some embodiments.

FIG. 34 is a flow diagram of a method for processing a primary and optional secondary identifying token, according to some embodiments. In this example, a message with an associated identifying token is received (3401), for example by a messaging client, a messaging server, or a proxy layer between a messaging client and a messaging server. It may be determined whether the identifying token is obscured (3402). If it is determined that the identifying token is obscured (3402), then it is determined whether a key is available for revealing the obscured (primary) identifying token (3404). An example of a situation in which a key may be available is when a computing device containing a secret key associated with the primary identifying token, such as a computing device belonging to the creator of the primary identifying token, is being used. An example of a situation in which a key may not be available is when a computing device not containing a secret key associated with the primary identifying token, such as a public computer or a computer belonging to someone other than the creator of the primary identifying token, is used.

If it is determined that a key is available (3404), then the primary identifying token is revealed in this example (3405). In some embodiments, a primary identifying token may be revealed using information kept secret and/or information associated with an aspect of a sender of the message. An example of revealing a primary identifying token using a combination of secret information and sender information is to decrypt the token using a key that includes both a secret and the address or domain name of the sender. Such decryption may be performed using any encryption known to those skilled in the art, for example a symmetric encryption such as DES, AES or Blowfish. The primary identifying token may be used. An example of using the primary identifying token is to display the primary identifying token when the message is rendered. Another example of using the primary identifying token is to alter the message so the revealed identifying token is displayable.

If it is determined that a key is not available (3404), then the secondary identifying token, if any, is used in this example (3403). An example of using the secondary identifying token is to display the secondary identifying token when a containing message is rendered. Another example of using the secondary identifying token is to alter the message so the secondary identifying token is displayable.

Figure 35:
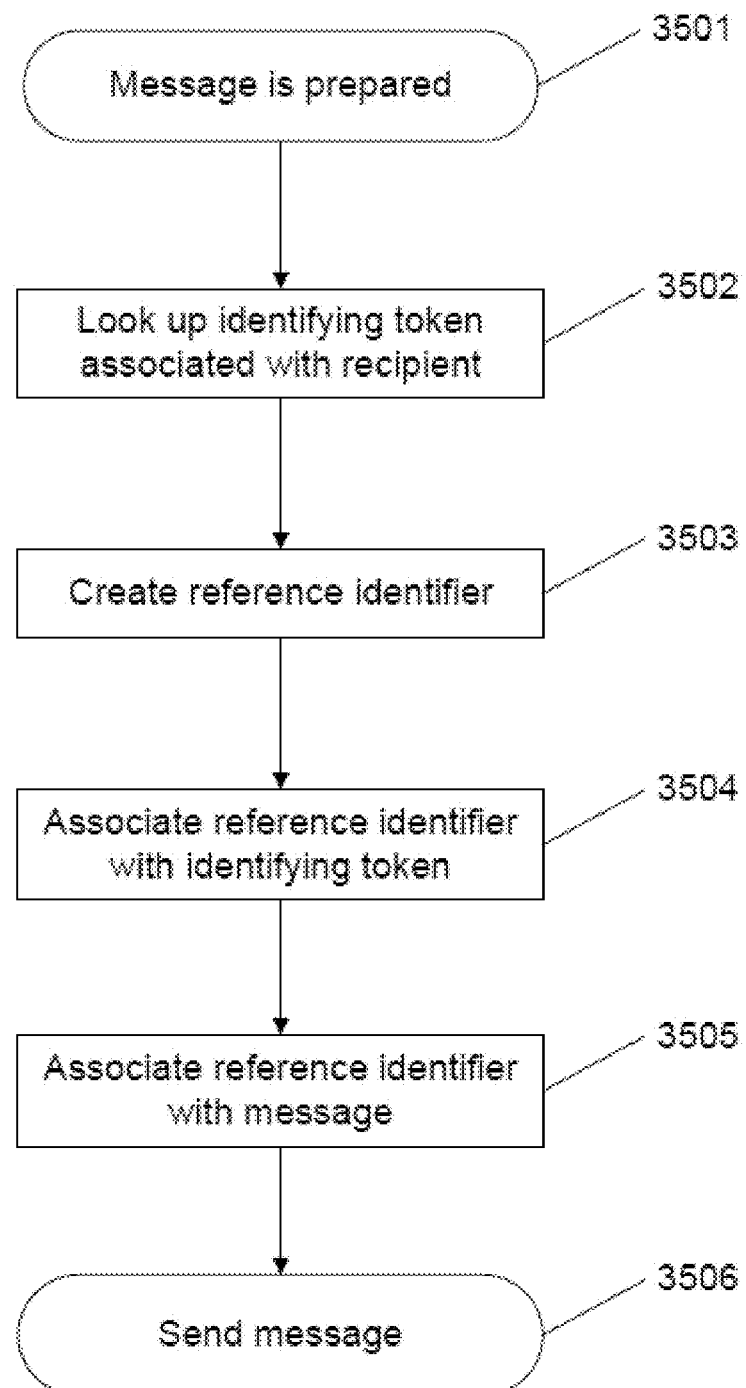
FIG. 35 is a flow diagram of a method for temporarily associating an identifying token with a message, according to some embodiments.

FIG. 35 is a flow diagram of a method for temporarily associating an identifying token with a message, according to some embodiments. In this example, a message may be prepared (3501). Examples of a message include an email, an instant message, a postal mailing, and a telephone call script. In various embodiments, a message may be prepared specifically for a user, for example an invoice, or may be a mass-mailing that will be sent to multiple customers. In some embodiments, preparing a message may include receiving the message from a message originator, for example by a token association service. In such embodiments, a message originator or an affiliate of a message originator, such as a bulk emailing service, may prepare a message and transmit it to a token association service. The token association service may determine that the message is authorized by the message originator to go to the recipient, for example by verifying a cryptographic signature on the message, or by authenticating a communications session and receiving one or more messages to one or more recipients during the authenticated communications session. Ways to authenticate a communications session are well known to those skilled in the art.

An identifying token associated with a message recipient may be determined (3502). An example of determining an identifying token associated with a message recipient is to look up account information associated with the message recipient. In some embodiments, an identifying token may have been associated with a message recipient as described in conjunction with FIG. 31. In some embodiments, an identifying token may be created on the fly, for example by creating an image from a textual identifying token. A reference identifier may be created (3503). In some embodiments, a reference identifier may include a randomly generated component. The reference identifier may be associated with the identifying token (3504). An example of associating a reference identifier with an identifying token is to create a mapping in a database that is keyed on the reference identifier and contains a reference, such as a filename, to the associated identifying token.

The reference identifier may be associated with the message (3505). An example of associating a reference identifier with a message is to include an <IMG> or <A> tag in HTML content in a message such as an email, with an argument that refers to the reference identifier on a server with direct or indirect access to the mapping to an identifying token. Examples of tags with a reference identifier include tags of the form <IMG SRC="host:program?arg=ref"> and <A HREF="host:program?arg=ref">, wherein host refers to a server, program refers to a computer program on the server that has access to the mapping, arg refers to an argument used to specify a reference identifier, and ref is the reference identifier. The message with the associated reference identifier may be sent to a recipient (3506). In some embodiments, a server storing an instance of an identifying token may remove the identifying token and/or invalidate an associated reference identifier after a predetermined criterion has been met, and/or may deny access based on previous accesses, for example as described in conjunction with FIG. 36.

Figure 36:
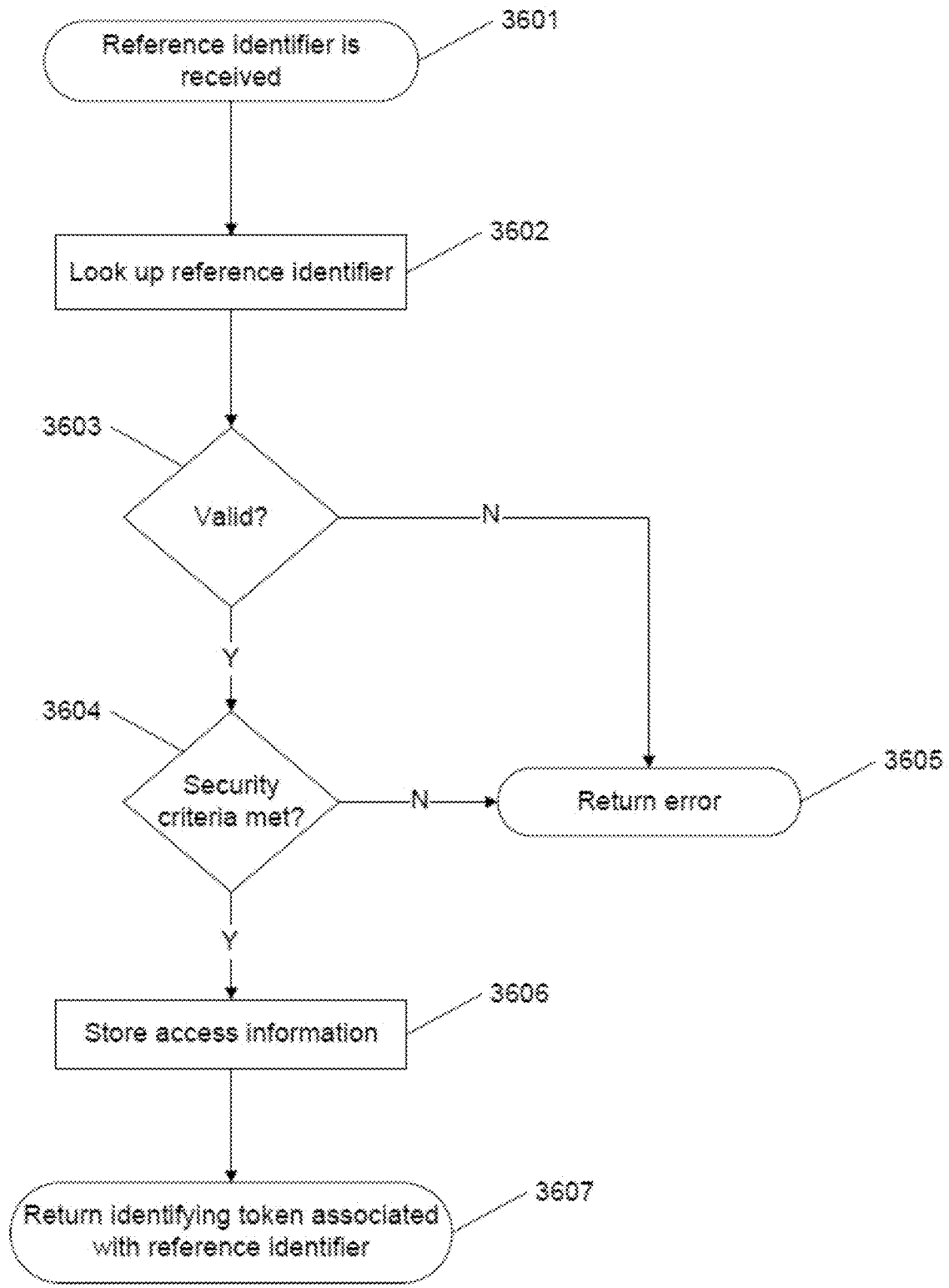
FIG. 36 is a flow diagram of a method for providing an identifying token, according to some embodiments.

FIG. 36 is a flow diagram of a method for providing an identifying token, according to some embodiments. In this example, a reference identifier is received (3601). An example of receiving a reference identifier is for a server to receive a reference identifier, for example because a client has received or rendered a message with an associated message identifier, such as a message constructed as discussed in conjunction with FIG. 35. The reference identifier may be looked up (3602). An example of looking up a reference identifier is to use the reference identifier as a key to obtain associated data from a data store such as a database.

It may be determined whether the reference identifier is valid (3603). One example of determining whether a reference identifier is valid is to determine whether it is present in a data store. Another example of determining whether a reference identifier is valid is to determine whether it has been marked as invalid, for example because a security criterion has previously been unmet. If it is determined that the reference identifier is not valid (3603), then an error is returned in this example (3605). One example of returning an error is to return a result indicating that the identifying token does not exist. Another example of returning an error is to return a spurious identifying token, such as an image or text indicating that a security violation has occurred.

If it is determined that the reference identifier is valid (3603), then one or more security criteria are checked in this example (3604). One example of a security criterion is a maximum period of time after sending a message or creating a reference identifier, such as one week. Another example of a security criterion is a maximum period of time after the first time a reference identifier is used to access an identifying token, such as one week. Another example of a security criterion is a maximum number of times a reference identifier may be used to access an identifying token, such as three. Another example of a security criterion is the presence of an acceptable cookie from a requestor. Another example of a security criterion is a restriction that only a machine consistent with the first machine to reference an identifying token using a reference identifier, for example a machine with the same IP address as the first accessing machine, may be permitted to access the identifying token using the reference identifier. If one or more security criteria are not met (3604), then an error is returned in this example (3605).

If security criteria are met (3604), then access information is optionally stored in this example (3606). An example of storing access information is to store the time of the access. Another example of storing access information is to increment a count of the number of accesses. Another example of storing access information is to provide a cookie to a requestor. Another example of storing access information is to store address information associated with a requestor, such as an IP address. An identifying token associated with the reference identifier may be returned (3607). An example of returning an identifying token is to transmit the identifying token to a requestor. In some embodiments, the requestor may render the identifying token.

Figure 37:
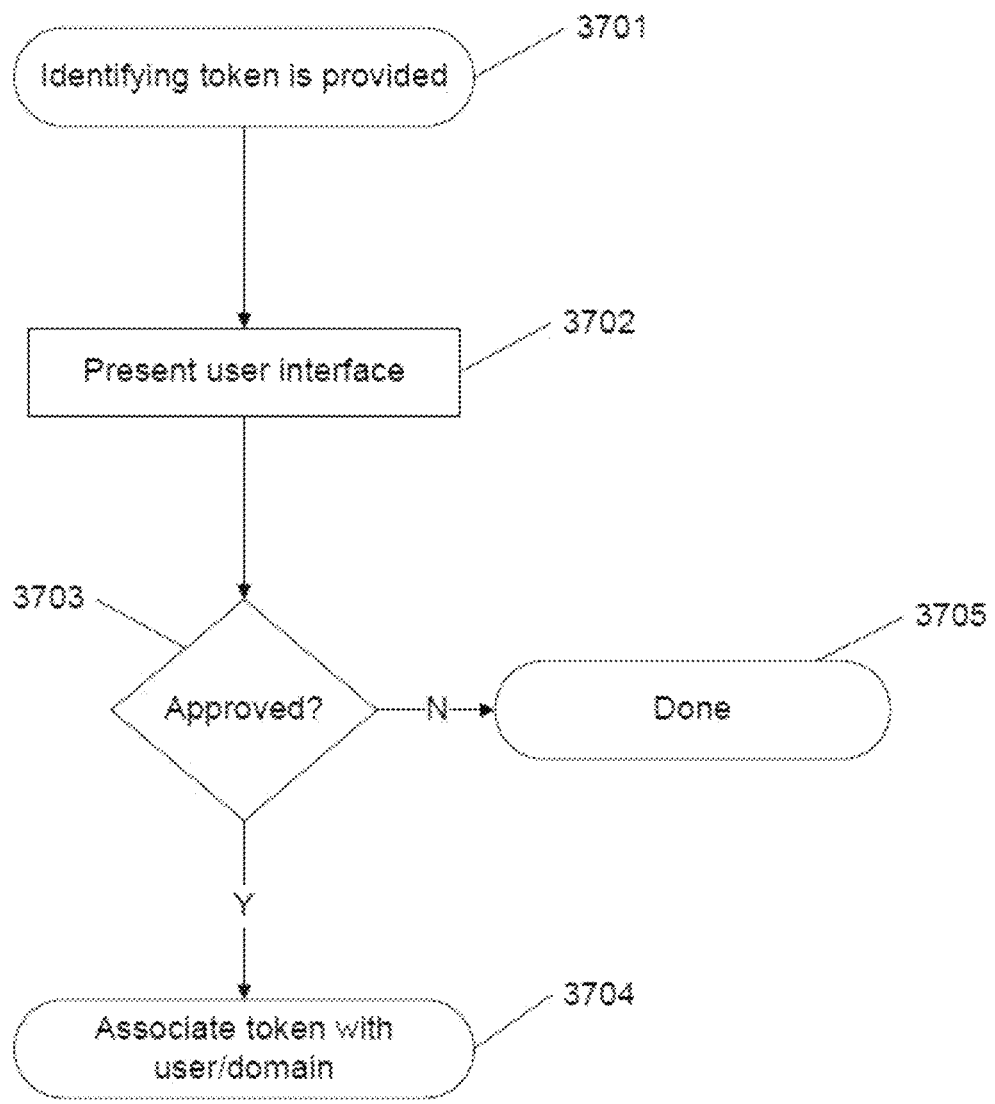
FIG. 37 is a flow diagram of a method for dissemination of an identifying token, according to some embodiments.

FIG. 37 is a flow diagram of a method for dissemination of an identifying token, according to some embodiments. In some embodiments, the method of FIG. 37 may be performed by a browsing and/or messaging client. In this example, an identifying token is provided (3701). An example of a way a token may be provided is that a user may provide a messaging address such as an email address to a correspondent, for example via a web site. The correspondent, for example via code such as a Javascript script and/or ActiveX component associated with a web page provided by the web site, may provide a token to a browsing client. Another example of a way a token may be provided is that a message containing the token may have been processed as legitimate. An example of processing a message as legitimate is whitelisting the sender of the message. Another example of processing a message as legitimate is receiving a directive from a user indicating that a message is non-spam. Another example of processing a message as legitimate is processing user actions associated with a message that indicate the message is legitimate, such as viewing the message without deleting the message, or paging through an entire message.

A user interface may optionally be presented (3702), which may provide an opportunity to approve or decline acceptance of the identifying token. If the identifying token is declined (3703), then processing is complete in this example (3705). If the identifying token is accepted (3703), then the identifying token is associated with a sender or domain (3704). An example of a domain with which to associate the identifying token is the domain of a web site being visited. An example of a sender with which to associate the identifying token is a sender specified in information associated with the identifying token. In some embodiments, an identifying token associated with a sender or domain may be used as described in conjunction with FIG. 38.

Figure 38:
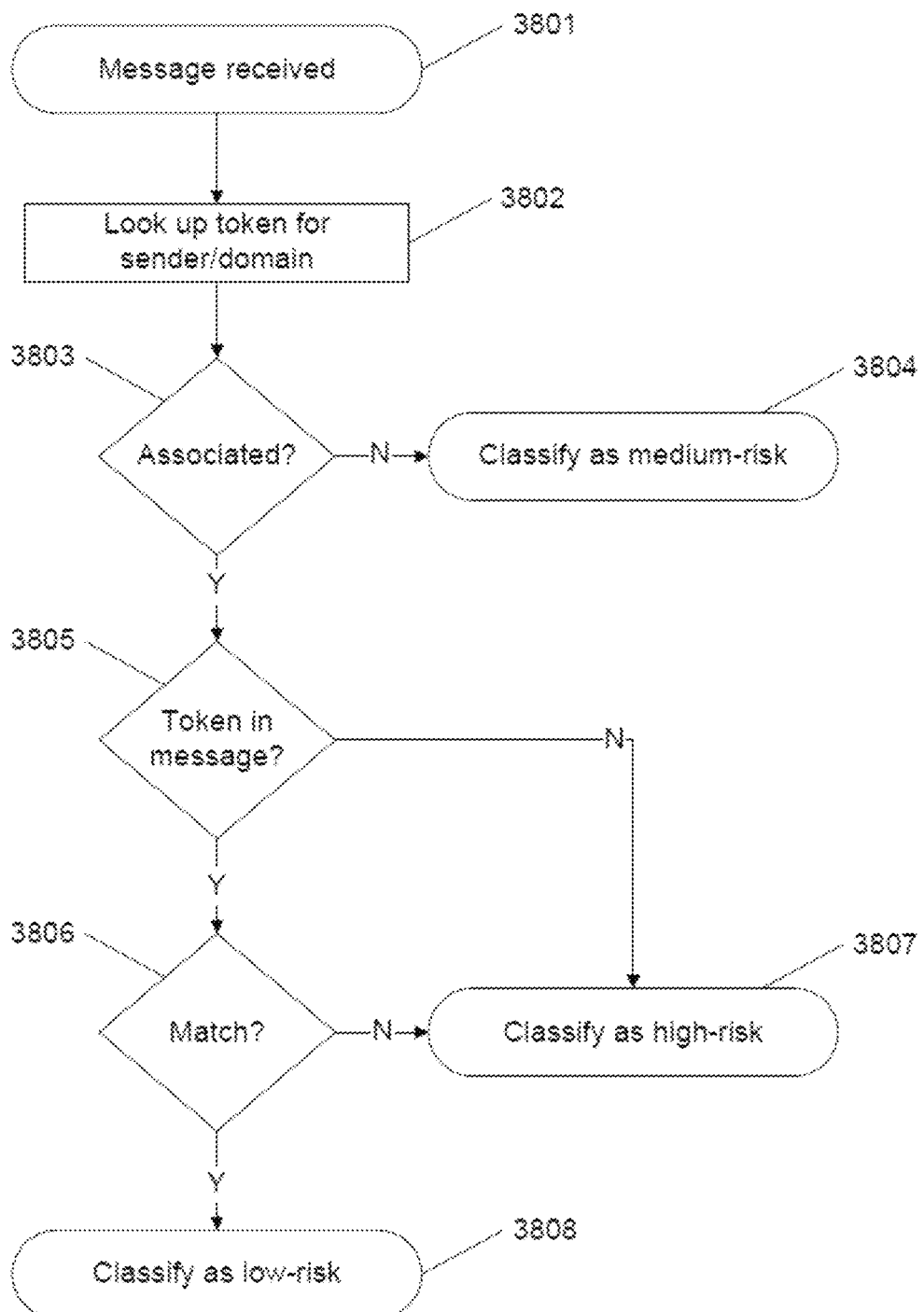
FIG. 38 is a flow diagram of a method for automatically processing a message containing an identifying token, according to some embodiments.

FIG. 38 is a flow diagram of a method for automatically processing a message containing an identifying token, according to some embodiments. In this example, a message is received (3801). An example of receiving a message is to receive a message at a messaging client or server. An identifying token associated with the address and/or domain of a sender of the message may optionally be looked up (3802). In some embodiments, such as embodiments in which cryptographically signed tokens are used, lookup and/or verification of association may be omitted. If an identifying token is not associated with the sender and/or domain (3803), then the message is classified as presenting a medium security risk in this example (3804). In some embodiments, classification as a medium security risk may subsequently be used to determine how to render and/or allow interactions with the message. For example, rendering may be performed non-preferentially as described in conjunction with FIG. 21, and/or an action associated with the message may be impeded as described in conjunction with FIG. 19.

If a stored token was found (3803), then the message is checked in this example to determine whether it included an identifying token (3805), and if so, if the identifying token matches the identifying token associated with the sender or domain (3806). In some embodiments, a message token may be a literal. In some embodiments, an identifying token may be a cryptographic element, for example a digital signature. An example of determining whether a cryptographic message token matches a stored identifying token is to determine whether a signature associated with a message may be decrypted with a stored identifying token (for example a public key).

If an identifying token was not associated with the message (3805), or if the identifying token associated with the message does not match an identifying token associated with the sender or domain (3806), then the message is classified as presenting a high security risk in this example (3805). In some embodiments, classification as a high security risk may subsequently be used to determine how to render and/or allow interactions with the message. For example, rendering may be performed non-preferentially as described in conjunction with FIG. 21, and/or an action associated with the message may be impeded as described in conjunction with FIG. 19. In another example, the message may be automatically discarded or quarantined, and/or any links contained therein may be disabled. In some embodiments, the message may be displayed with a prominent warning indicating that it appears to be fraudulent.

If the identifying token associated with the message is determined to match an identifying token associated with a sender or domain (3806), then the message is classified as presenting a low security risk in this example (3808). In some embodiments, classification as a low security risk may subsequently be used to determine how to render and/or allow interactions with the message. For example, rendering may be performed preferentially as described in conjunction with FIG. 21, or an action associated with the message may be unimpeded as described in conjunction with FIG. 19.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a screen;
   a memory comprising instructions;
   one or more processors in communication with the memory and configured to execute the instructions to facilitate:
      receiving a Hyper Text Markup Language (HTML) email, wherein the HTML email includes a link associated with an address;
      receiving a user input corresponding to selection of the link associated with the address;
      determining that the address would not fit in an address bar of a browser displayed on the screen; and
      based on the determination that the address would not fit in the address bar of the browser, displaying, in the address bar of the browser, a first element of the address and at least part of a second element of the address, wherein the first element of the address corresponds to a domain component of the address, wherein the second element of the address comprises one or more components of the address other than the domain component, and wherein displaying at least part of the second element of the address comprises displaying a first portion of the second element of the address and an ellipsis indication representing a second portion of the second element of the address;
   wherein the display of the first element of the address is visually distinguished from the display of the first portion of the second element of the address.

2. The system of claim 1, wherein the HTML email further includes information corresponding to an embedded image; and
  wherein the one or more processors are further configured to execute the instructions to facilitate:
    determining whether the HTML email is trustworthy, wherein determining whether the HTML email is trustworthy comprises performing spam analysis to determine whether to classify the HTML email as spam, wherein the spam analysis is based at least in part on a sender of the HTML email; and
    based on the HTML email being classified as spam, displaying a modified version of the HTML email on the screen, wherein the displayed version of the HTML email does not include the embedded image.

3. The system of claim 2, wherein performing spam analysis comprises:
  identifying the sender of the HTML email; and
  determining whether the sender of the HTML email is associated with a whitelist.

4. The system of claim 3, wherein the one or more processors are further configured to execute the instructions to facilitate:
  retrieving domain-related information by performing a domain name system (DNS) query on a domain associated with the sender of the HTML email; and
  based on the domain-related information, determining whether the sender of the HTML email is trustworthy.

5. The system of claim 2, wherein determining whether the HTML email is trustworthy further comprises:
  determining whether content of the HTML email is trustworthy.

6. The system of claim 5, wherein determining whether the content of the HTML email is trustworthy comprises:
  detecting the link in the HTML email; and
  determining whether a uniform resource locator (URL) associated with the first link is suspicious.

7. The system of claim 6, wherein the one or more processors are further configured to execute the instructions to facilitate:
  based on the URL associated with the link being suspicious, displaying a user interface element for warning of potentially unsafe URL usage after receiving the user input for selecting the link.

8. The system of claim 7, wherein the user interface element comprises a first option for rejecting the URL or a second option for allowing access to the URL.

9. The system of claim 7, wherein the user interface element is displayed based on a security setting.

10. The system of claim 6, wherein the displayed version of the HTML email comprises a modified version of the link.

11. The system of claim 6, wherein the one or more processors are further configured to execute the instructions to facilitate:
  determining whether the URL indicates a destination different from an actual destination corresponding to the link;
  displaying, based on determining that the URL indicates a different destination, a notification to the user identifying the actual destination for the URL; and
  displaying a selectable graphical element for enabling the user to proceed to the actual destination for the URL.

12. The system of claim 6, wherein determining whether the URL associated with the link is suspicious comprises:
  determining whether the link is obfuscated or cloaked;
  determining whether an electronic document associated with the link is suspicious; or
  determining whether a domain associated with the link is suspicious.

13. The system of claim 2, wherein the displayed version of the HTML email is displayed in plain text, and wherein the plain text corresponds to one or more parts of the HTML email.

14. The system according to claim 2, wherein displaying the modified version of the HTML email includes displaying the link;
  wherein the one or more processors are further configured to execute the instructions to facilitate: based on a mouse cursor being positioned over the link, displaying a uniform resource locator (URL) associated with the link.

15. The system according to claim 14, wherein the one or more processors are further configured to execute the instructions to facilitate: based on the mouse cursor being moved off the link, ceasing to display the URL associated with the link.

16. The system according to claim 2, wherein displaying the modified version of the HTML email on the screen comprises:
  displaying the modified version of the HTML email on the screen without retrieving the embedded image from an external server.

17. A method comprising:
  receiving, by a computer, a Hyper Text Markup Language (HTML) email, wherein the HTML email includes a link associated with an address;
  receiving, by the computer, a user input corresponding to selection of the link associated with the address;
  determining, by the computer, that the address would not fit in an address bar of a browser displayed on a screen of the computer; and
  based on the determination that the address would not fit in the address bar of the browser, displaying, by the computer, in the address bar of the browser, a first element of the address and at least part of a second element of the address, wherein the first element of the address corresponds to a domain component of the address, wherein the second element of the address comprises one or more components of the address other than the domain component, and wherein displaying at least part of the second element of the address comprises displaying a first portion of the second element of the address and an ellipsis indication representing a second portion of the second element of the address;
  wherein the display of the first element of the address is visually distinguished from the display of the first portion of the second element of the address.

18. The method of claim 17, wherein the HTML email further includes information corresponding to an embedded image; and
  wherein the method further comprises:
    determining, by the computer, whether the HTML email is trustworthy, wherein determining whether the HTML email is trustworthy comprises performing spam analysis to determine whether to classify the HTML email as spam, wherein the spam analysis is based at least in part on a sender of the HTML email; and
    based on the HTML email being classified as spam, displaying, by the computer, a modified version of the HTML email on a screen of the computer, wherein the displayed version of the HTML email does not include the embedded image.

19. The method of claim 18, wherein performing spam analysis comprises:
- identifying, by the computer, the sender of the HTML email; and
- determining, by the computer, whether the sender of the HTML email is associated with a whitelist.

20. The method of claim 19, further comprising:
- retrieving, by the computer, domain-related information by performing a domain name system (DNS) query on a domain associated with the sender of the HTML email; and
- based on the domain-related information, determining, by the computer, whether the sender of the HTML email is trustworthy.

21. The method of claim 18, wherein determining whether the HTML email is trustworthy further comprises:
- determining, by the computer, whether content of the HTML email is trustworthy.

22. The method of claim 21, wherein determining whether the content of the HTML email is trustworthy comprises:
- detecting, by the computer, the link in the HTML email; and
- determining, by the computer, whether a uniform resource locator (URL) associated with the link is suspicious.

23. The method of claim 22, further comprising:
- based on the URL associated with the link being suspicious, displaying, by the computer, a user interface element for warning of potentially unsafe URL usage after receiving the user input for selecting the link.

24. The method of claim 23, wherein the user interface element comprises a first option for rejecting the URL or a second option for allowing access to the URL.

25. A non-transitory computer-readable medium storing processor-executable instructions, wherein the processor-executable instructions, when executed, facilitate:
- receiving a Hyper Text Markup Language (HTML) email, wherein the HTML email includes information corresponding to an embedded image;
- determining whether the HTML email is trustworthy, wherein determining whether the HTML email is trustworthy comprises performing spam analysis to determine whether to classify the HTML email as spam, wherein the spam analysis is based at least in part on a sender of the HTML email;
- based on the HTML email being classified as spam, displaying a modified version of the HTML email on a screen, wherein the displayed version of the HTML email does not include the embedded image;
- receiving a user input corresponding to selection of a link associated with an address;
- determining that the address would not fit in an address bar of a browser displayed on the screen; and
- based on the determination that the address would not fit in the address bar of the browser, displaying, in the address bar of the browser, a first element of the address and at least part of a second element of the address, wherein the first element of the address corresponds to a domain component of the address, wherein the second element of the address comprises one or more components of the address other than the domain component, and wherein displaying at least part of the second element of the address comprises displaying a first portion of the second element of the address and an ellipsis indication representing a second portion of the second element of the address;
- wherein the display of the first element of the address is visually distinguished from the display of the first portion of the second element of the address.

* * * * *